United States Patent
Wang et al.

(10) Patent No.: US 12,459,940 B2
(45) Date of Patent: Nov. 4, 2025

(54) OXAZOLE COMPOUND AS MULTI-TARGETED INHIBITOR OF IRAK4 AND BTK

(71) Applicant: SHANGHAI FOSUN PHARMACEUTICAL INDUSTRIAL DEVELOPMENT CO., LTD., Shanghai (CN)

(72) Inventors: Jianfei Wang, Shanghai (CN); Haizhong Tan, Shanghai (CN); Jie Li, Shanghai (CN); Yang Zhang, Shanghai (CN); Jian Li, Shanghai (CN); Shuhui Chen, Shanghai (CN)

(73) Assignee: Shanghai Fosun Pharmaceutical Industrial Development Co., Ltd., Shanghai (CN)

(*) Notice: Subject to any disclaimer, the term of this patent is extended or adjusted under 35 U.S.C. 154(b) by 798 days.

(21) Appl. No.: 17/625,599

(22) PCT Filed: Jul. 10, 2020

(86) PCT No.: PCT/CN2020/101369
§ 371 (c)(1),
(2) Date: Jan. 7, 2022

(87) PCT Pub. No.: WO2021/004533
PCT Pub. Date: Jan. 14, 2021

(65) Prior Publication Data
US 2022/0267322 A1    Aug. 25, 2022

(30) Foreign Application Priority Data

Jul. 10, 2019 (CN) .......................... 201910619602.8
Dec. 6, 2019 (CN) .......................... 201911240843.8
May 28, 2020 (CN) .......................... 202010470469.7

(51) Int. Cl.
C07D 471/04    (2006.01)
A61P 35/00     (2006.01)

(52) U.S. Cl.
CPC ............ *C07D 471/04* (2013.01); *A61P 35/00* (2018.01)

(58) Field of Classification Search
CPC .............................. A61P 35/00; C07D 471/04
See application file for complete search history.

(56) References Cited

U.S. PATENT DOCUMENTS

| | | | |
|---|---|---|---|
| 10,160,753 B2 * | 12/2018 | Gummadi et al. ... | C07D 413/14 |
| 2016/0326151 A1 | 11/2016 | Gummadi et al. | |
| 2016/0340366 A1 | 11/2016 | Gummadi et al. | |
| 2018/0201609 A1 | 7/2018 | Gummadi et al. | |

FOREIGN PATENT DOCUMENTS

| | | |
|---|---|---|
| CN | 106456619 A | 2/2017 |
| CN | 106458982 A | 2/2017 |
| CN | 108026065 A | 5/2018 |
| CN | 110835338 A | 2/2020 |
| JP | 2017502088 A | 1/2017 |
| JP | 2017505337 A | 2/2017 |
| JP | 2018524372 A | 8/2018 |
| WO | WO-2005016928 A1 | 2/2005 |
| WO | WO-2018178947 A2 | 10/2018 |
| WO | WO-2020035020 A1 | 2/2020 |

OTHER PUBLICATIONS

Oct. 12, 2020 International Search Report issued in International Patent Application No. PCT/CN2020/101369.
Oct. 12, 2020 Written Opinion of the International Searching Authority issued in International Patent Application No. PCT/CN2020/101369.
Zhulun Wang et. al.—"IRAK-4 Inhibitors for Inflammation" Current Topics in Medicinal Chemistry, vol. 9, Nr:8, pp. 724-737 May 1, 2009.
Jul. 19, 2022, Chinese Office Action issued in Chinese Patent Application No. 2020800477531.
Jun. 9, 2023 the Extended European Search Report issued in European Patent Application No. EP20836225.1.
Jan. 12, 2023 2nd Chinese Office Action issued in Chinese Patent Application No. 202080047753.1.
Mar. 14, 2023 Notice of Reasons for Refusal issued in Japanese Patent Application No. JP2022-500996.

* cited by examiner

*Primary Examiner* — Scarlett Y Goon
*Assistant Examiner* — Samantha Lynn Schachermeyer
(74) *Attorney, Agent, or Firm* — Morgan, Lewis & Bockius LLP

(57) ABSTRACT

Provided are a class of multi-targeted inhibitors of IRAK4 and BTK, and the use thereof in preparing a drug for treating IRAK4- and BTK-related diseases. The present invention specifically relates to the compounds represented by formula (II), isomers thereof or pharmaceutically acceptable salts thereof.

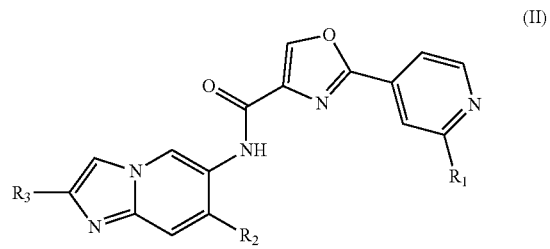

18 Claims, 2 Drawing Sheets

Note: p.o. refers to oral, OD refers to once a day, D1-D18 refers to day 1 to day 18.

OXAZOLE COMPOUND AS MULTI-TARGETED INHIBITOR OF IRAK4 AND BTK

CROSS-REFERENCE TO RELATED APPLICATIONS

This application is a U.S. National Phase Application under 35 U.S.C. 371 of International Application No. PCT/CN2020/101369, filed on Jul. 10, 2020, which claims the benefit of Chinese Patent Application No. 201910619602.8, filed on Jul. 10, 2019, Chinese Patent Application No. 201911240843.8, filed on Dec. 6, 2019, and Chinese Patent Application No. 202010470469.7, filed on May 28, 2020. The entire disclosures of the above applications are incorporated herein by reference.

TECHNICAL FIELD

The present disclosure relates to a class of multi-targeted inhibitors of IRAK4 and BTK, and a use thereof in the preparation of a medicament for treating IRAK4- and BTK-related diseases. The present disclosure specifically relates to a compound represented by formula (II), an isomer thereof or a pharmaceutically acceptable salt thereof.

PRIOR ART

Interleukin-1 receptor-associated kinase 4 (IRAK4) is a serine/threonine-specific protein kinase, a member of the tyrosine like kinase (TLK) family, and a key node in the innate immune response involving interleukin-1, 18, 33 receptors and Toll-like receptors. After binding with interleukin receptor or Toll-like receptor, extracellular signal molecules recruit to form MyD88: IRAK4: IRAK1/2 multiprotein complex, leading to phosphorylation of IRAK1/2 and mediating a series of downstream signal transduction, thus activating p38, JNK and NF-κB signaling pathways, and finally leading to the expression of proinflammatory cytokines. Clinicopathological studies have shown that individuals with IRAK4 mutation have a protective effect on chronic lung disease and inflammatory bowel disease. IRAK4 deficiency itself is non-lethal, individuals can survive to adulthood, and the risk of infection decreases with age. Therefore, IRAK4 has become an important therapeutic target, which can be widely used in the treatment of inflammatory diseases, immune diseases, tumor diseases and other diseases. As shown in the following figure, BAY-1830839 and BAY-1834845 are small molecule IRAK4 inhibitors developed by Bayer Company, at present, clinical research on immune and tumor diseases has been carried out.

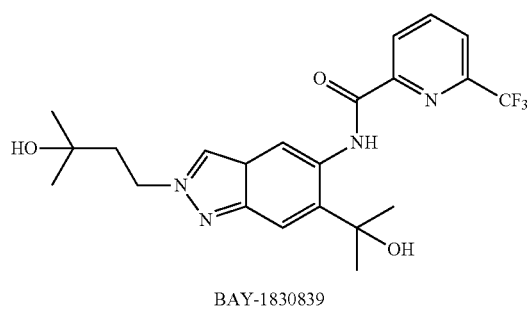

BAY-1830839

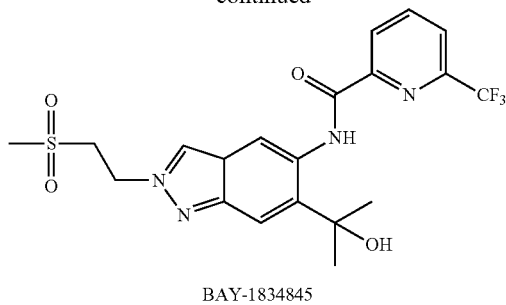

BAY-1834845

Activated B-cell-like diffuse large B-cell lymphoma (ABC-DLBCL) is a highly invasive and poorly prognostic DLBCL, which is usually characterized by abnormalities of B-cell receptor (BCR) pathway and myeloid-like differentiation factor 88 (MyD88) pathway, which further leads to the continuous activation of nuclear factor κB protein (NF-κB) signaling pathway. CD79 mutation is a common abnormal mutation in BCR pathway, and BTK inhibitors such as Ibrutinib can inhibit the abnormal activation of NF-κB signaling pathway caused by CD79 mutation, thus inhibiting the proliferation of ABC-DLBCL cells. The abnormal MyD88 pathway is mainly $MyD88^{L265P}$ point mutation, which accounts for about 30%, IRAK4 inhibitors can effectively block the abnormally activated MyD88 signaling pathway and further block the abnormal activation of the NF-κB pathway. However, ABC-DLBCL patients with $MyD88^{L265P}$ mutations have a poor response to BCR inhibitors due to abnormal MyD88 signaling pathway, and a large number of research data from Bayer, Nimbus and AstraZeneca indicate that the combination of IRAK4 inhibitor and BTK inhibitor can significantly improve the in vivo efficacy of Ibrutinib in ABC-DLBCL xenotransplantation animal model. If the abnormality of BCR pathway and MyD88 pathway can be effectively inhibited at the same time, it will be a more effective way to treat ABC-DLBCL, therefore, developing RAK4 and BTK dual-target inhibitors can obtain double benefits in blocking NF-κ(B pathway, which is a very efficient and effective strategy in terms of therapeutic mechanism and provides a potentially effective new therapeutic method for ABC-DLBCL patients.

CONTENT OF THE PRESENT INVENTION

The present disclosure provides a compound represented by formula (II), an isomer thereof or a pharmaceutically acceptable salt thereof,

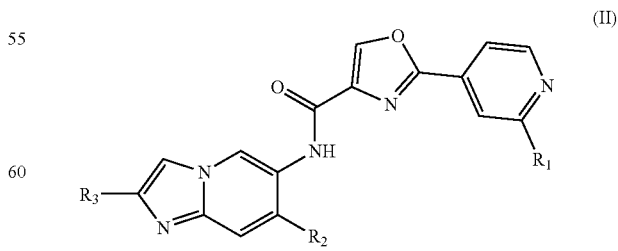

(II)

wherein,
$R_1$ is selected from H, F, Cl, Br, I, OH, $NH_2$, CN, $C_{1-6}$ alkyl, cyclopropyl and —C(=O)—$NH_2$, wherein the $C_{1-6}$ alkyl, cyclopropyl and —C(=O)—NH$_2$ are optionally substituted by 1, 2 or 3 R$_a$;

R$_2$ is selected from thienyl, phenyl, pyridyl, cyclopropyl, cyclohexyl and

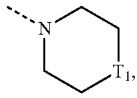

wherein the thienyl, phenyl, pyridyl, cyclopropyl, cyclohexyl and

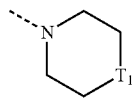

are optionally substituted by 1, 2, 3, 4 or 5 R$_b$;

T$_1$ is selected from CH$_2$, NH and O;

R$_3$ is selected from $C_{1-6}$ alkyl, wherein the $C_{1-6}$ alkyl is optionally substituted by 1, 2 or 3 R$_c$;

R$_a$ is each independently selected from F, OH, NH$_2$ and CN;

R$_b$ is each independently selected from H, D, F, Cl, Br, I, OH, NH$_2$, CN, $C_{1-3}$ alkyl, COOH, —C(=O)—$C_{1-3}$ alkyl, —C(=O)—O—$C_{1-3}$ alkyl and —C(=O)—NH$_2$, wherein the OH, NH$_2$, $C_{1-3}$ alkyl, —C(=O)—$C_{1-3}$ alkyl and —C(=O)—O—$C_{1-3}$ alkyl and —C(=O)—NH$_2$ are optionally substituted by 1, 2 or 3 R;

R$_c$ is each independently selected from F, OH, NH$_2$, CN, CH$_3$, COOH and —SO$_2$CH$_3$;

R is each independently selected from F, OH, NH$_2$ and CH$_3$.

The present disclosure provides a compound represented by formula (II), an isomer thereof or a pharmaceutically acceptable salt thereof,

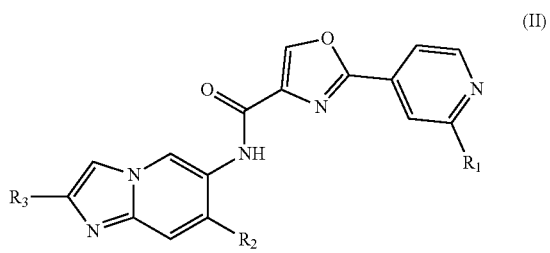

(II)

wherein,

R$_1$ is selected from H, F, Cl, Br, I, OH, NH$_2$, CN, $C_{1-6}$ alkyl and cyclopropyl, wherein the $C_{1-6}$ alkyl and cyclopropyl are optionally substituted by 1, 2 or 3 R$_a$;

R$_2$ is selected from thienyl, phenyl, pyridyl, cyclopropyl, cyclohexyl and

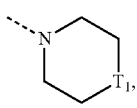

wherein the thienyl, phenyl, pyridyl, cyclohexyl and

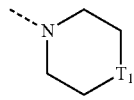

are optionally substituted by 1, 2, 3, 4 or 5 R$_b$;

T$_1$ is selected from CH$_2$, NH and O;

R$_3$ is selected from $C_{1-6}$ alkyl, wherein the $C_{1-6}$ alkyl is optionally substituted by 1, 2 or 3 R$_c$;

R$_a$ is each independently selected from F, OH, NH$_2$ and CN;

R$_b$ is each independently selected from H, D, F, Cl, Br, I, OH, NH$_2$, CN, $C_{1-3}$ alkyl, —C(=O)—$C_{1-3}$ alkyl and —C(=O)—O—$C_{1-3}$ alkyl, wherein the OH, NH$_2$, $C_{1-3}$ alkyl, —C(=O)—$C_{1-3}$ alkyl and —C(=O)—O—$C_{1-3}$ alkyl are optionally substituted by 1, 2 or 3 R;

R$_c$ is each independently selected from F, OH, NH$_2$, CN, CH$_3$, COOH and —SO$_2$CH$_3$;

R is each independently selected from F, OH, NH$_2$ and CH$_3$.

In some embodiments of the present disclosure, the R$_1$ is selected from H, F, Cl, Br, I, OH, NH$_2$, CN, $C_{1-3}$ alkyl, cyclopropyl and —C(=O)—NH$_2$, wherein the $C_{1-3}$ alkyl, cyclopropyl and —C(=O)—NH$_2$ are optionally substituted by 1, 2 or 3 R$_a$, and the other variables are as defined in the present disclosure.

In some embodiments of the present disclosure, the R$_1$ is selected from H, F, Cl, Br, I, OH, NH$_2$, CN, $C_{1-3}$ alkyl and cyclopropyl, wherein the $C_{1-3}$ alkyl and cyclopropyl are optionally substituted by 1, 2 or 3 R$_a$, and the other variables are as defined in the present disclosure.

In some embodiments of the present disclosure, the R$_1$ is selected from CN, CH$_3$, CF$_3$,

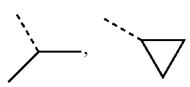

and —C(=O)—NH$_2$, and the other variables are as defined in the present disclosure.

In some embodiments of the present disclosure, the R$_1$ is selected from CN, CH$_3$, CF$_3$,

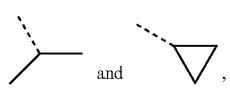

and the other variables are as defined in the present disclosure.

In some embodiments of the present disclosure, the R$_b$ is each independently selected from H, D, F, Cl, Br, I, OH, NH$_2$, CN, CH$_3$, CH$_2$CH$_3$, CH$_2$CH$_2$CH$_3$, CH(CH$_3$)$_2$, COOH,

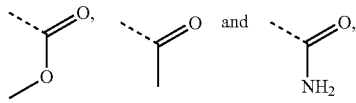

wherein the OH, NH$_2$, CH$_3$, CH$_2$CH$_3$, CH$_2$CH$_2$CH$_3$, CH(CH$_3$)$_2$,

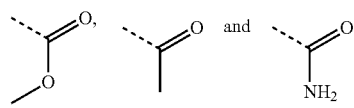

are optionally substituted by 1, 2 or 3 R, and the other variables are as defined in the present disclosure.

In some embodiments of the present disclosure, the $R_b$ is each independently selected from H, D, F, Cl, Br, I, OH, $NH_2$, CN, $CH_3$, $CH_2CH_3$, $CH_2CH_2CH_3$, $CH(CH_3)_2$, COOH,

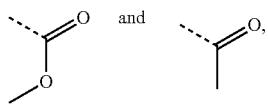

wherein the OH, $NH_2$, $CH_3$, $CH_2CH_3$, $CH_2CH_2CH_3$, $CH(CH_3)_2$,

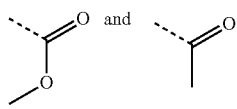

are optionally substituted by 1, 2 or 3 R, and the other variables are as defined in the present disclosure.

In some embodiments of the present disclosure, the $R_b$ is each independently selected from H, D, F, Cl, OH, $OCH_3$, CN, $CH_3$, $CH_2OH$, $CH_2NH_2$, COOH,

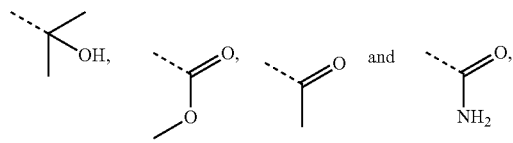

and the other variables are as defined in the present disclosure.

In some embodiments of the present disclosure, the $R_2$ is selected from thienyl, phenyl, pyridyl, cyclopropyl, cyclohexyl

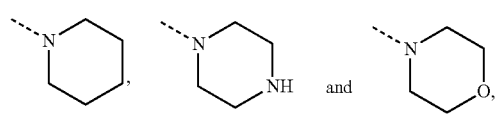

wherein the thienyl, phenyl, pyridyl, cyclopropyl, cyclohexyl,

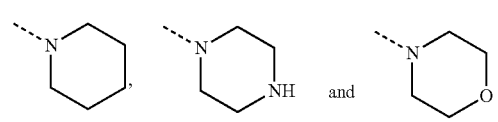

are optionally substituted by 1, 2, 3, 4 or 5 $R_b$, and the other variables are as defined in the present disclosure.

In some embodiments of the present disclosure, the $R_2$ is selected from

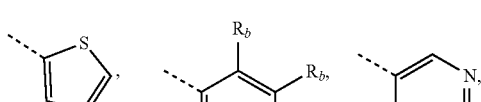

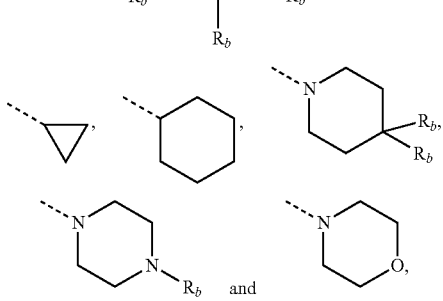

and the other variables are as defined in the present disclosure.

In some embodiments of the present disclosure, the $R_2$ is selected from

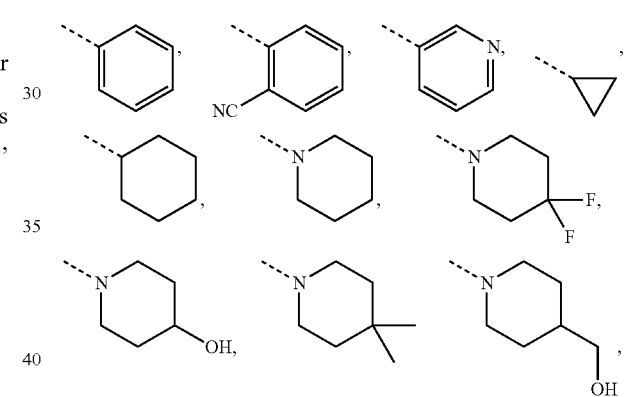

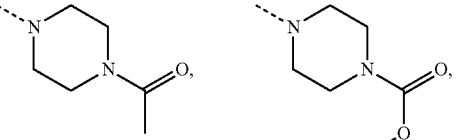

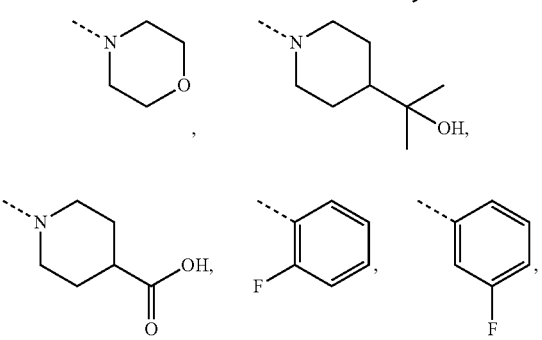

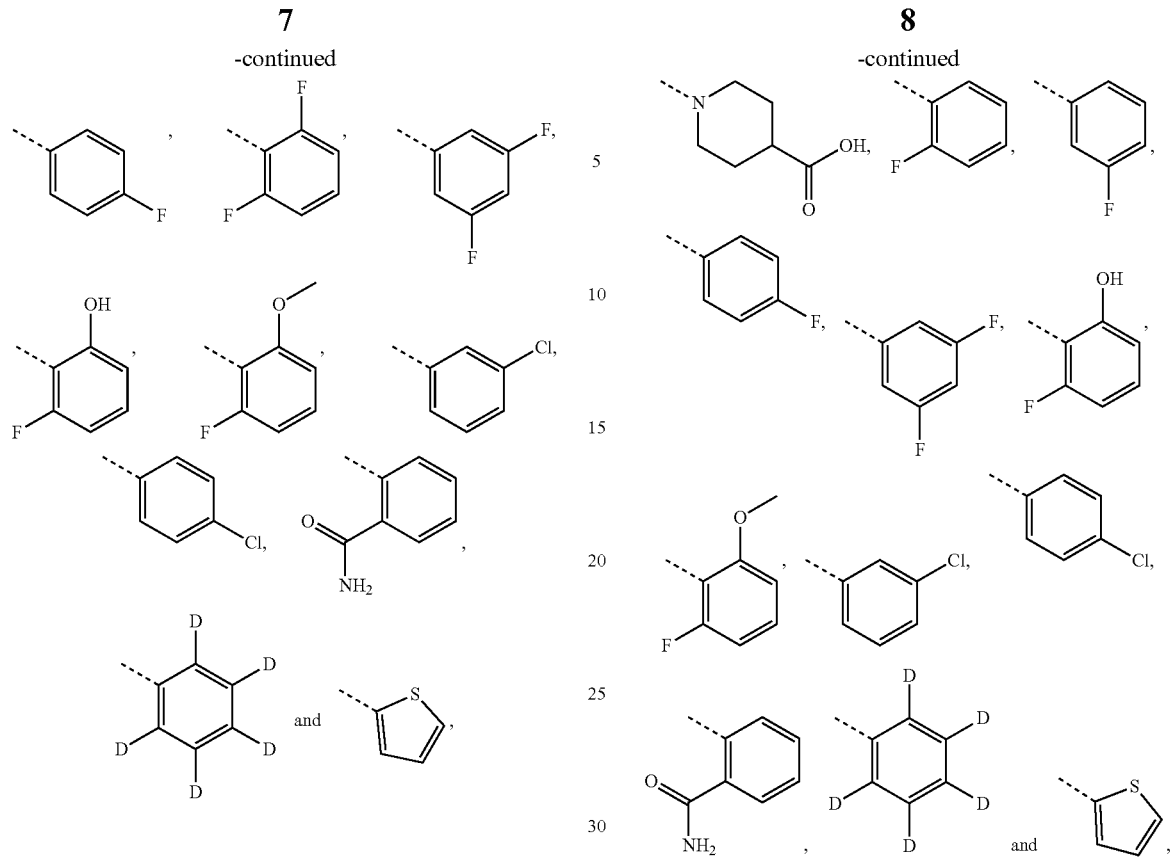

and the other variables are as defined in the present disclosure.

In some embodiments of the present disclosure, the $R_2$ is selected from

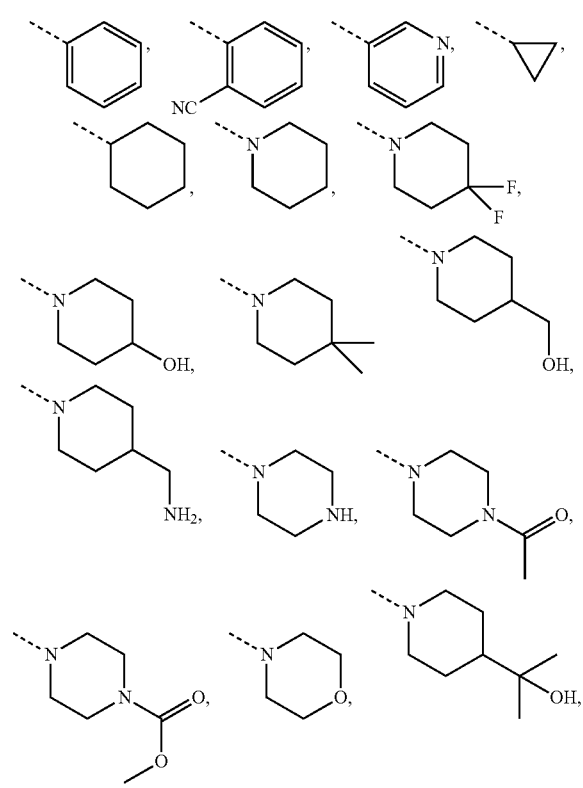

and the other variables are as defined in the present disclosure.

In some embodiments of the present disclosure, the $R_3$ is selected from $C_{2-5}$ alkyl, wherein the $C_{2-5}$ alkyl is optionally substituted by 1, 2 or 3 $R_c$, and the other variables are as defined in the present disclosure.

In some embodiments of the present disclosure, the $R_3$ is selected from $CH_2CH_3$, $CH_2CH_2CH_3$, $CH(CH_3)_2$, $CH_2CH_2CH_2CH_3$, $CH_2CH(CH_3)_2$ and $CH_2CH_2CH(CH_3)_2$, wherein the $CH_2CH_3$, $CH_2CH_2CH_3$, $CH(CH_3)_2$, $CH_2CH_2CH_2CH_3$, $CH_2CH(CH_3)_2$ and $CH_2CH_2CH(CH_3)_2$ are optionally substituted by 1, 2 or 3 $R_c$, and the other variables are as defined in the present disclosure.

In some embodiments of the present disclosure, the $R_3$ is selected from

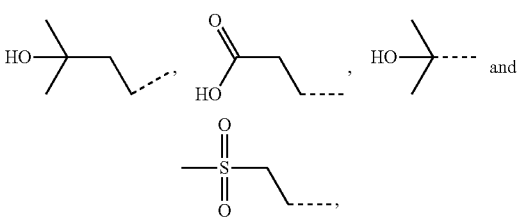

and the other variables are as defined in the present disclosure.

The present disclosure also provides a compound represented by formula (II), an isomer thereof or a pharmaceutically acceptable salt thereof,

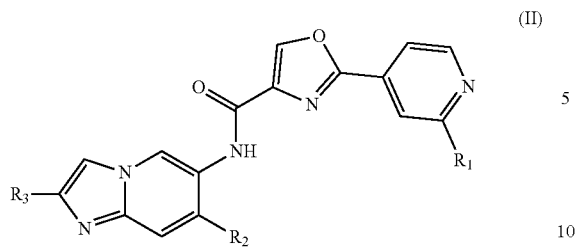

(II)

wherein,

R₁ is selected from H, F, Cl, Br, I, OH, NH₂, CN, $C_{1-6}$ alkyl and cyclopropyl, wherein the $C_{1-6}$ alkyl and cyclopropyl are optionally substituted by 1, 2 or 3 $R_a$;

R₂ is selected from phenyl, pyridyl, cyclopropyl, cyclohexyl and

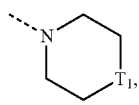

wherein the phenyl, pyridyl, cyclopropyl, cyclohexyl and

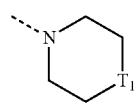

are optionally substituted by 1, 2 or 3 $R_b$;

T₁ is selected from CH₂, NH and O;

R₃ is selected from $C_{1-6}$ alkyl, wherein the $C_{1-6}$ alkyl is optionally substituted by 1, 2 or 3 $R_c$;

$R_a$ is each independently selected from F, OH, NH₂ and CN;

$R_b$ is each independently selected from H, F, OH, NH₂, CN, CH₃, —C(=O)—$C_{1-3}$ alkyl and —C(=O)—O—$C_{1-3}$ alkyl, wherein the CH₃, —C(=O)—$C_{1-3}$ alkyl and —C(=O)—O—$C_{1-3}$ alkyl are optionally substituted by 1, 2 or 3 R;

$R_c$ is each independently selected from F, OH, NH₂, CN, CH₃ and C(=O);

R is each independently selected from F, OH and NH₂.

In some embodiments of the present disclosure, the R₁ is selected from H, F, Cl, Br, I, OH, NH₂, CN, $C_{1-3}$ alkyl and cyclopropyl, wherein the $C_{1-3}$ alkyl and cyclopropyl are optionally substituted by 1, 2 or 3 $R_a$, and the other variables are as defined in the present disclosure.

In some embodiments of the present disclosure, the R₁ is selected from CN, CH₃, CF₃,

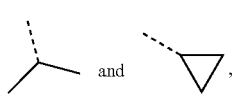

and the other variables are as defined in the present disclosure.

In some embodiments of the present disclosure, the $R_b$ is independently each selected from H, F, Cl, Br, I, OH, NH₂, CN, CH₃,

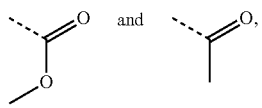

wherein the CH₃,

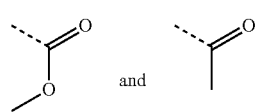

are optionally substituted by R, and the other variables are as defined in the present disclosure.

In some embodiments of the present disclosure, the $R_b$ is each independently selected from H, F, OH, CN, CH₃, CH₂OH, CH₂NH₂,

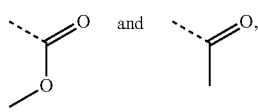

and the other variables are as defined in the present disclosure.

In some embodiments of the present disclosure, the R₂ is selected from phenyl, pyridyl, cyclopropyl, cyclohexyl,

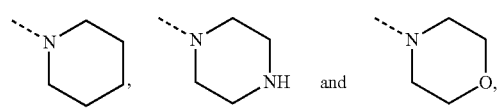

wherein the phenyl, pyridyl, cyclopropyl, cyclohexyl,

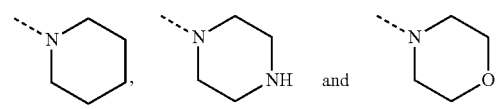

are optionally substituted by 1, 2 or 3 $R_b$, and the other variables are as defined in the present disclosure.

In some embodiments of the present disclosure, the R₂ is selected from

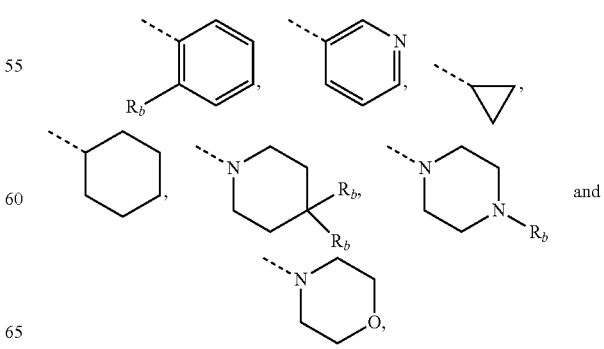

and the other variables are as defined in the present disclosure.

In some embodiments of the present disclosure, the $R_2$ is selected from

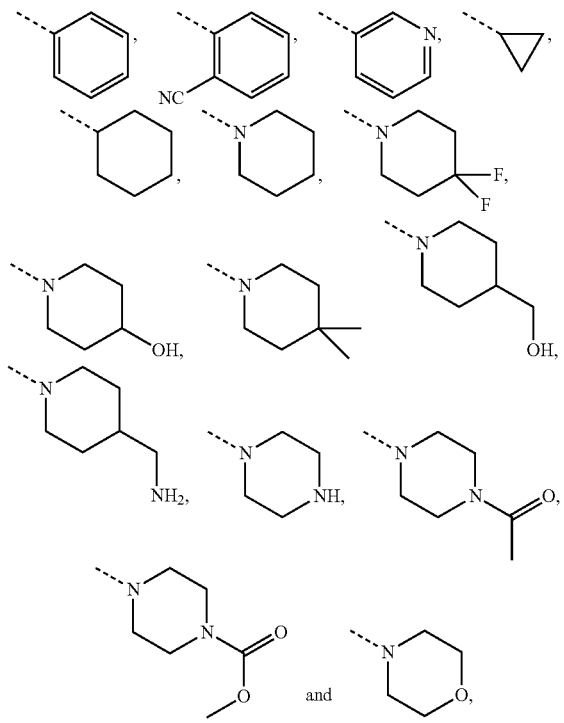

and the other variables are as defined in the present disclosure.

In some embodiments of the present disclosure, the $R_3$ is selected from $C_{2-5}$ alkyl, wherein the $C_{2-5}$ alkyl is optionally substituted by 1, 2 or 3 $R_c$, and the other variables are as defined in the present disclosure.

In some embodiments of the present disclosure, the $R_3$ is selected from

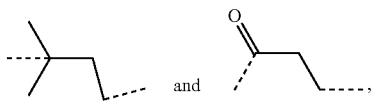

and the other variables are as defined in the present disclosure.

The present disclosure also provides a compound represented by formula (I), an isomer thereof or a pharmaceutically acceptable salt thereof,

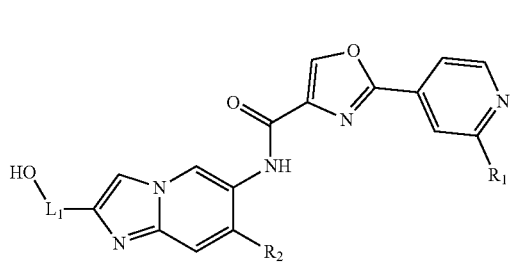

wherein, $R_1$ is selected from H, F, Cl, Br, I, OH, $NH_2$, CN and $C_{1-6}$ alkyl, wherein the $C_{1-6}$ alkyl is optionally substituted by 1, 2 or 3 $R_a$;

$R_2$ is selected from $C_{3-8}$ cycloalkyl and 3-8 membered heterocycloalkyl, wherein the $C_{3-8}$ cycloalkyl and 3-8 membered heterocycloalkyl are optionally substituted by 1, 2 or 3 $R_b$;

$L_1$ is selected from $C_{1-6}$ alkyl, wherein the $C_{1-6}$ alkyl is optionally substituted by 1, 2 or 3 $R_c$;

$R_a$ is each independently selected from F, Cl, Br, I, OH, $NH_2$ and CN;

$R_b$ is each independently selected from H, F, Cl, Br, I, OH, $NH_2$, CN, $CH_3$, —C(=O)—$C_{1-3}$ alkyl and —C(=O)—$C_{1-3}$ alkoxy;

$R_c$ is each independently selected from F, Cl, Br, I, OH, $NH_2$, CN and $CH_3$;

the 3-8 membered heterocycloalkyl contains 1, 2 or 3 heteroatoms or heteroatom groups independently selected from —NH—, N and O.

In some embodiments of the present disclosure, the $R_1$ is selected from H, F, Cl, Br, I, OH, $NH_2$, CN and $C_{1-3}$ alkyl, wherein the $C_{1-3}$ alkyl is optionally substituted by 1, 2 or 3 $R_a$, and the other variables are as defined in the present disclosure.

In some embodiments of the present disclosure, the $R_1$ is $CH_3$, and the other variables are as defined in the present disclosure.

In some embodiments of the present disclosure, the $R_b$ is selected from H, F, Cl, Br, I, OH, $NH_2$, CN, $CH_3$,

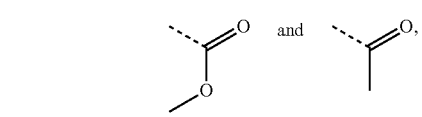

and the other variables are as defined in the present disclosure.

In some embodiments of the present disclosure, the $R_2$ is selected from $C_{3-6}$ cycloalkyl and 4-6 membered heterocycloalkyl, wherein the $C_{3-6}$ cycloalkyl and 4-6 membered heterocycloalkyl are optionally substituted by 1, 2 or 3 $R_b$, and the other variables are as defined in the present disclosure.

In some embodiments of the present disclosure, the $R_2$ is selected from morpholinyl, piperidinyl, piperazinyl, tetrahydropyranyl and cyclopropyl, wherein the morpholinyl, piperidinyl, piperazinyl, tetrahydropyranyl and cyclopropyl are optionally substituted by 1, 2 or 3 $R_b$, and the other variables are as defined in the present disclosure.

In some embodiments of the present disclosure, the $R_2$ is selected from

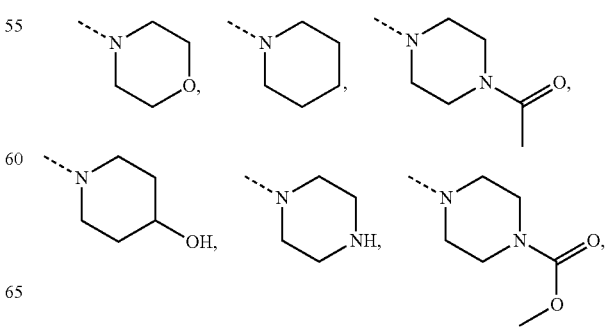

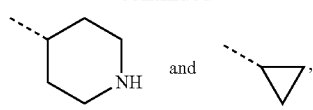 and and the other variables are as defined in the present disclosure.

In some embodiments of the present disclosure, the Li is selected from $C_{3-5}$ alkyl, wherein the $C_{3-5}$ alkyl is optionally substituted by 1, 2 or 3 $R_c$, and the other variables are as defined in the present disclosure.

In some embodiments of the present disclosure, the $L_1$ is

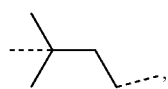

and the other variables are as defined in the present disclosure.

In some embodiments of the present disclosure, the compound, the isomer or the pharmaceutically acceptable salt thereof, and the compound is selected from:

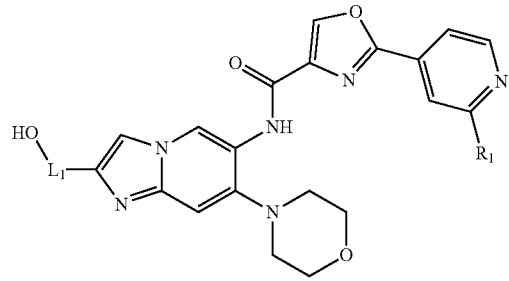
(I-2)

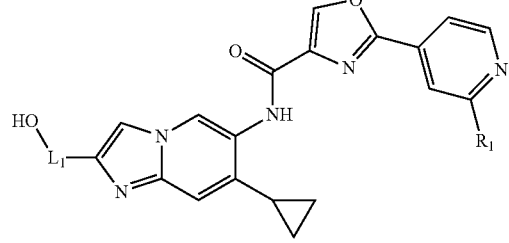
(I-3)

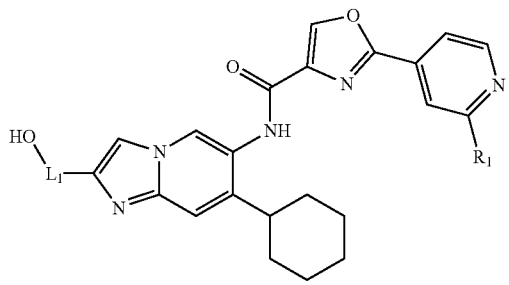
(II-1)

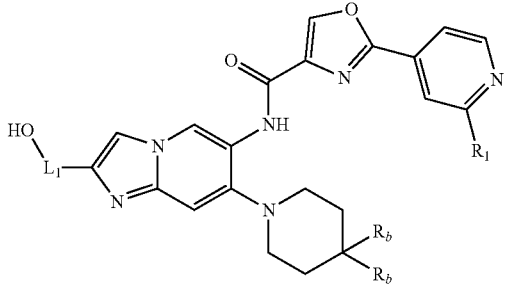
(II-2)

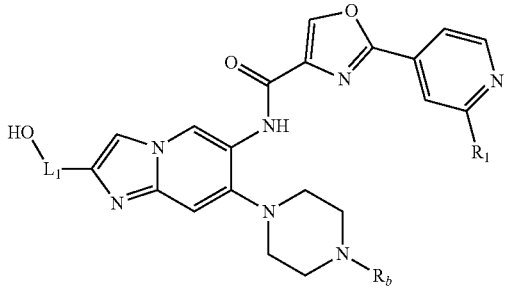
(II-3)

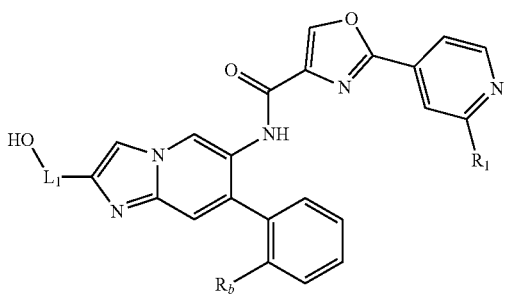
(II-4)

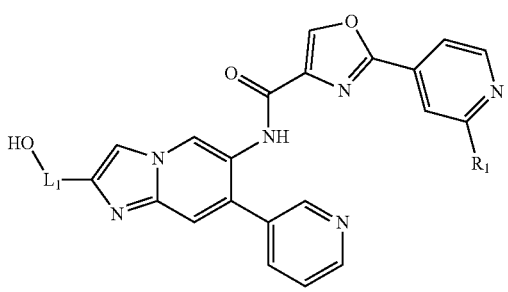
(II-5)

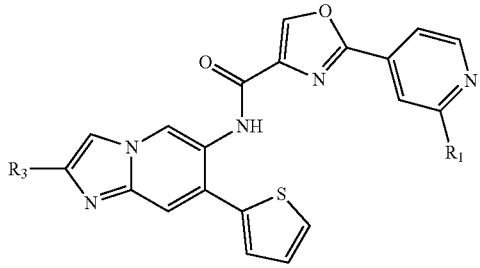
(III-1)

-continued

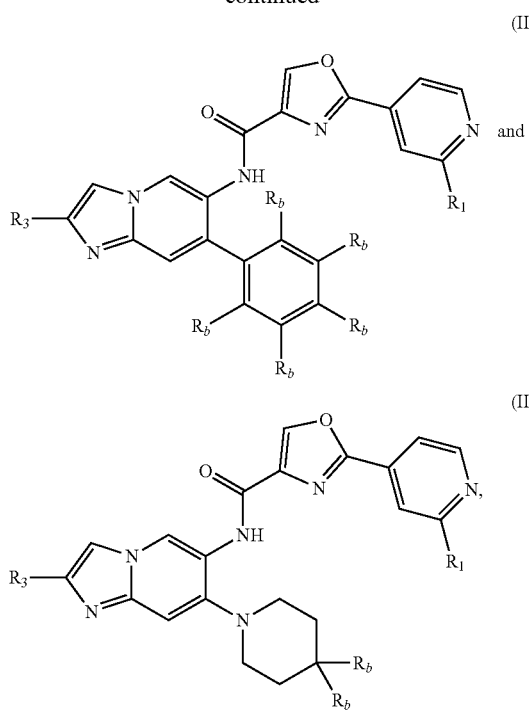

wherein, $L_1$ is selected from $C_{2-5}$ alkyl, and $R_1$, $R_3$ and $R_b$ are as defined in the present disclosure.

There are also some embodiments of the present disclosure obtained by an arbitrary combination of the above variables.

The present disclosure also provides a compound represented by the following formula, an isomer thereof or a pharmaceutically acceptable salt thereof,

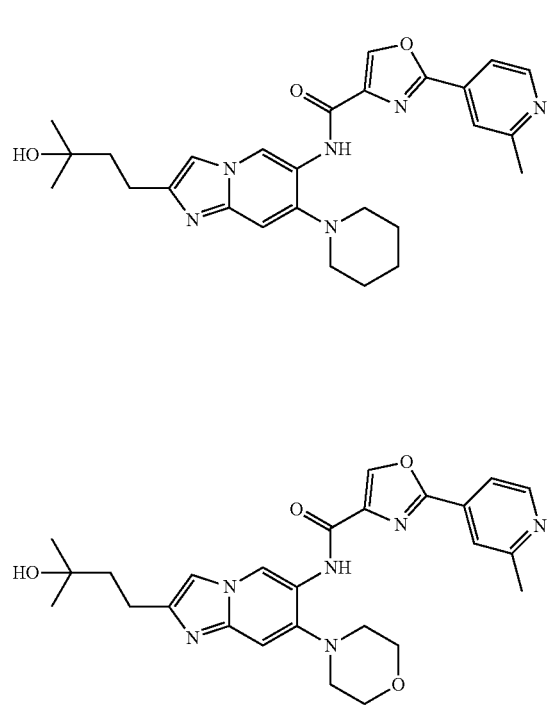

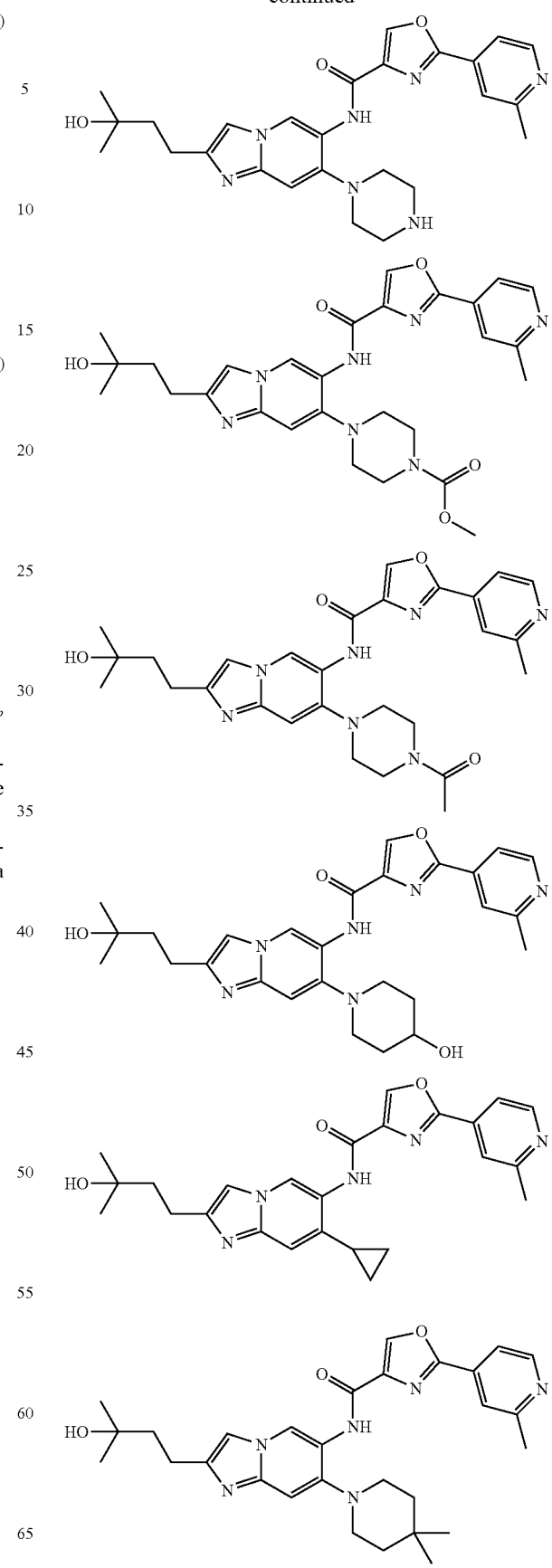

17
-continued
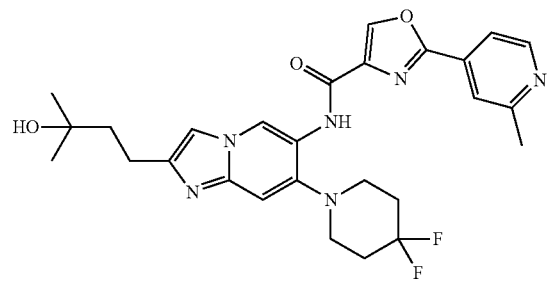
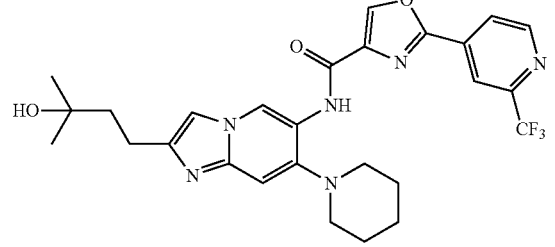
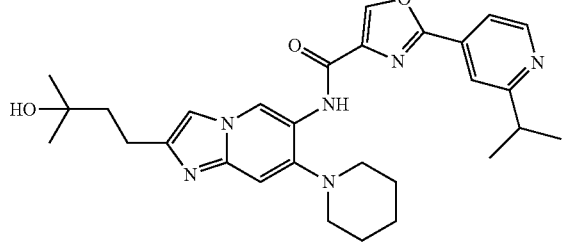
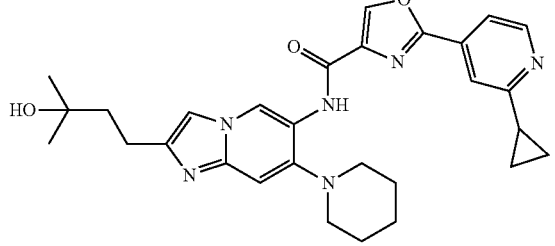
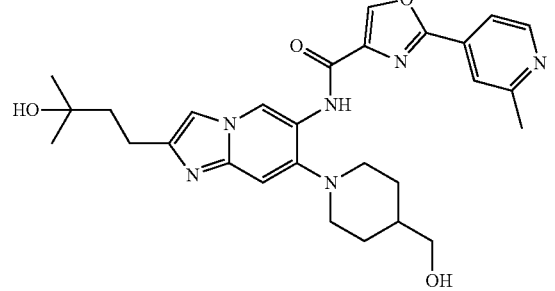
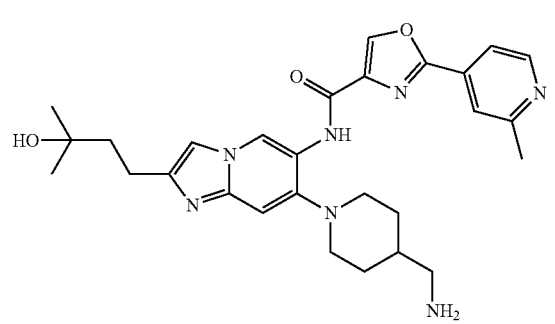
18
-continued
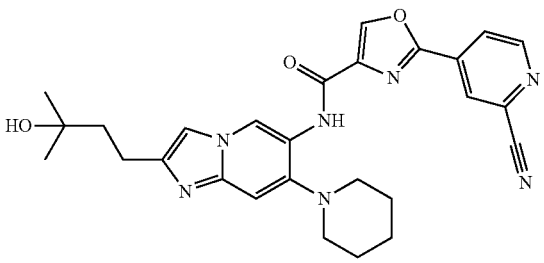
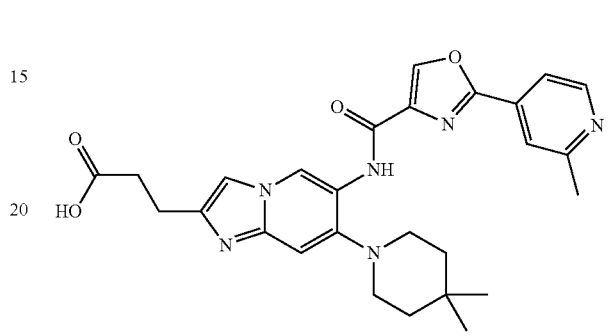
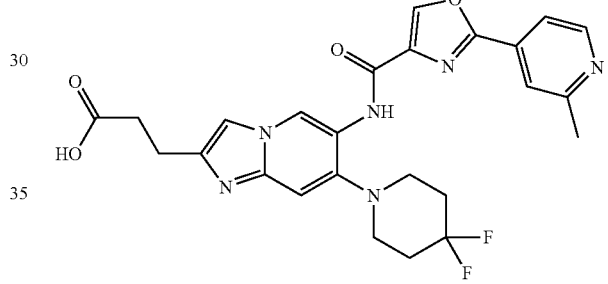
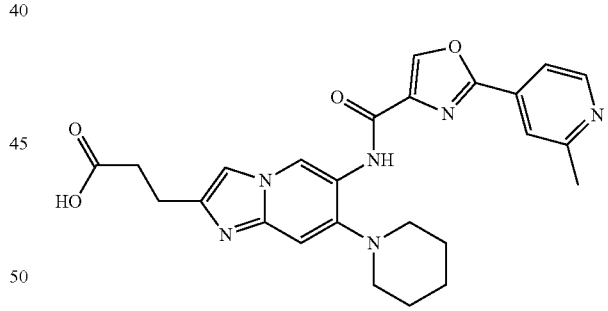
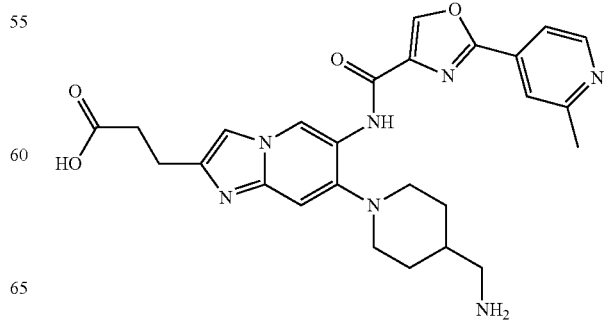

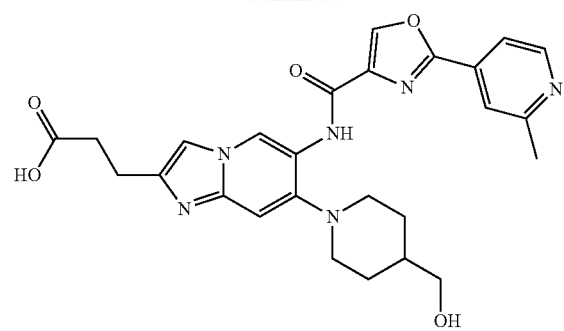
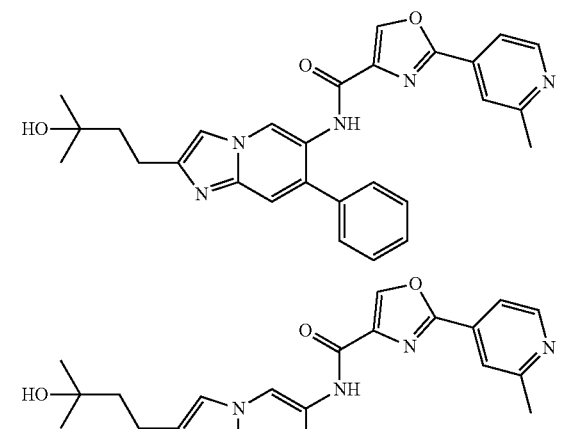
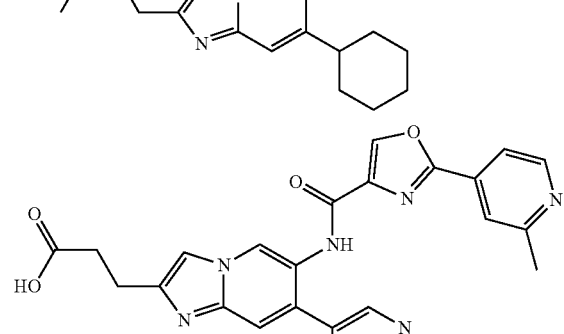
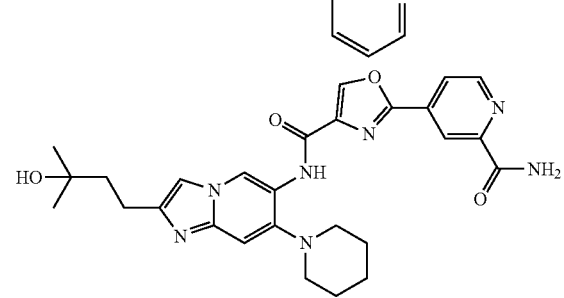
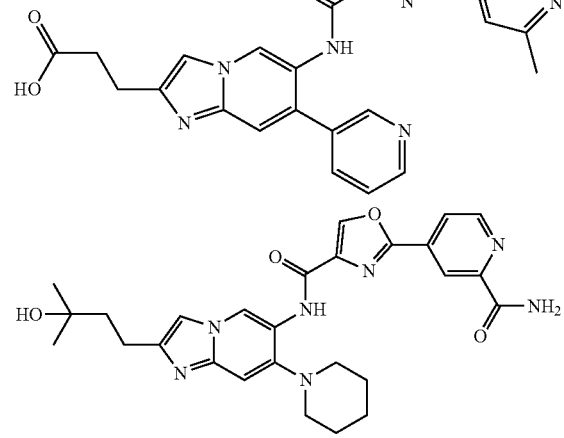
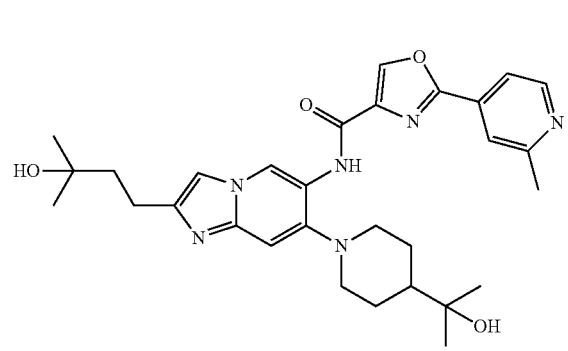
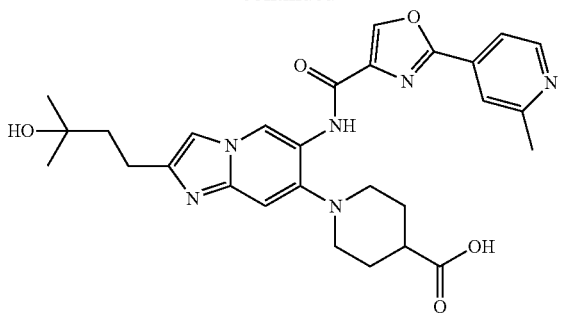
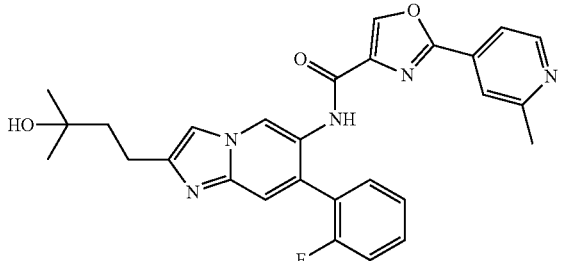
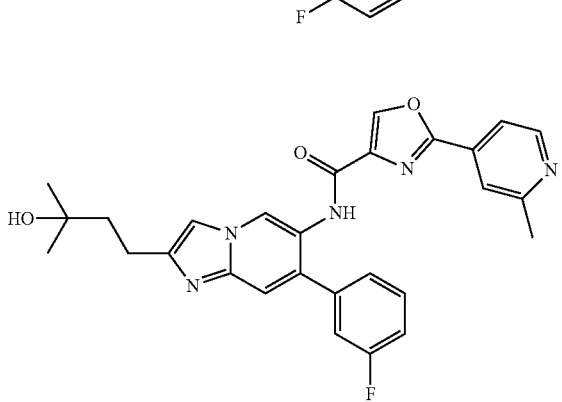
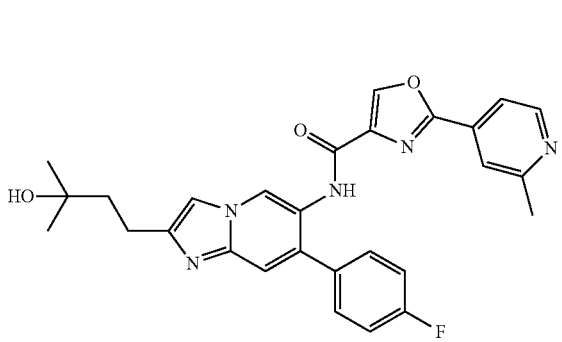
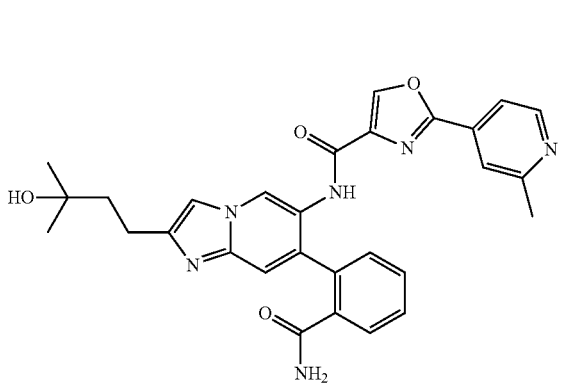

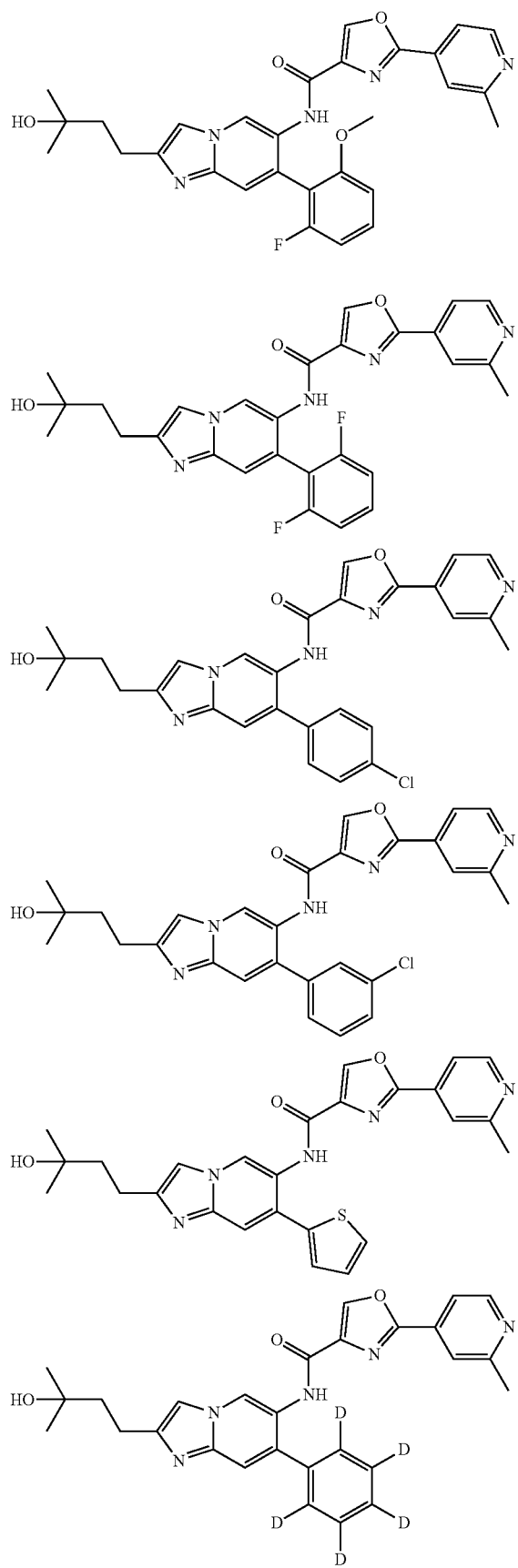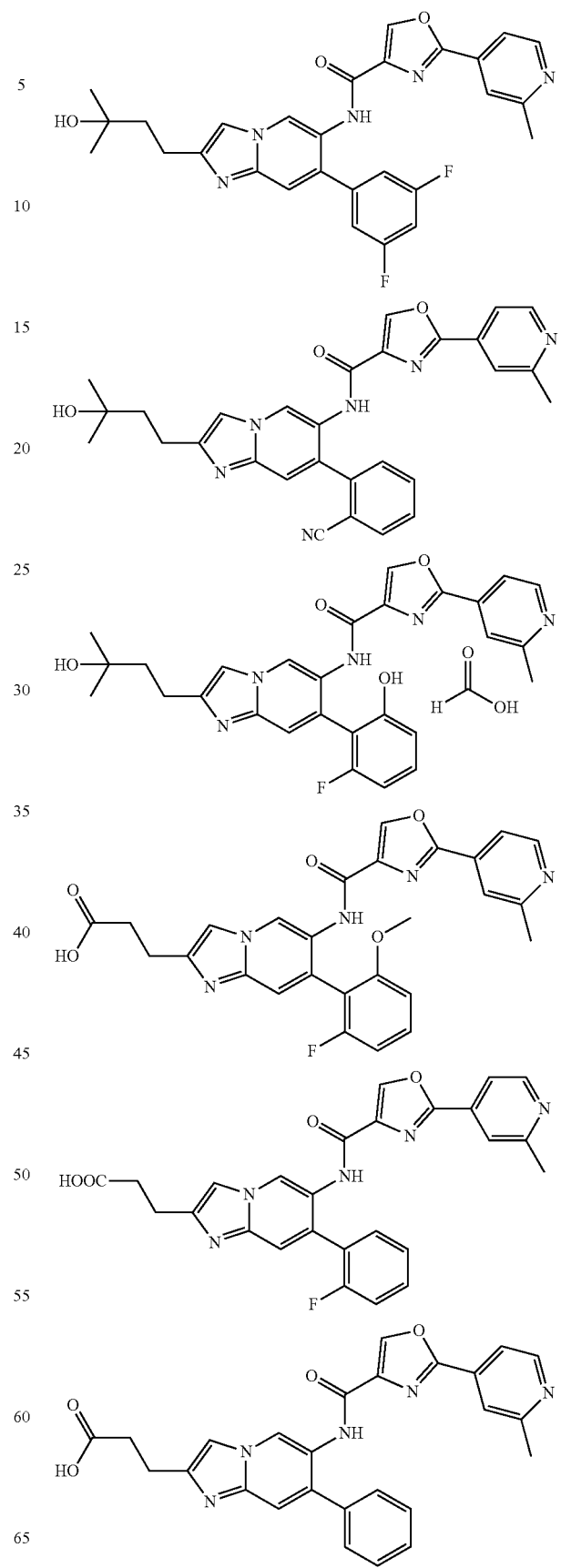

-continued

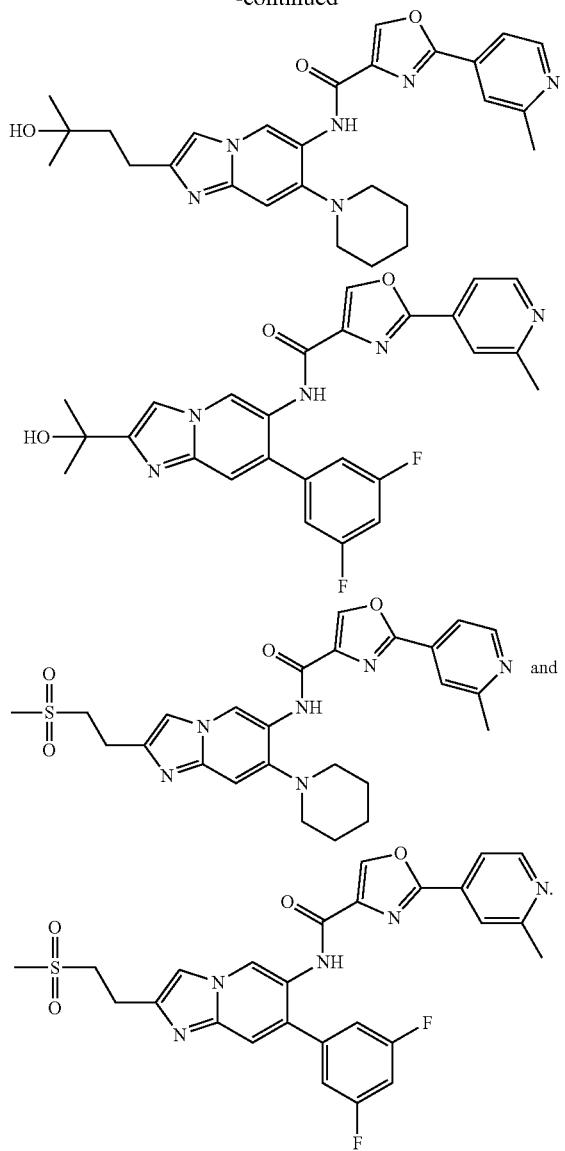

and

The present disclosure also provides a pharmaceutical composition, comprising a therapeutically effective amount of the compound described above, the isomer thereof or the pharmaceutically acceptable salt thereof as an active ingredient and a pharmaceutically acceptable carrier.

The present disclosure also provides a use of the compound described above, the isomer thereof or the pharmaceutically acceptable salt thereof, or the pharmaceutical composition described above in the preparation of a medicament for treating diseases related to IRAK4 and BTK.

Technical Effect

The compound of the present disclosure generally exhibits good inhibitory activity against IRAK4 and BTK. The compound of the present disclosure generally exhibits a good activity of inhibiting cell TNF-α production in THP-1 cells, a good activity of inhibiting cell proliferation in OCI-LY10, OCI-LY3 and TMD-8 cells, and a good in vivo efficacy in subcutaneous xenograft tumor model of human B-cell lymphoma OCI-LY10 cells.

Definition and Description

Unless otherwise specified, the following terms and phrases when used herein have the following meanings. A specific term or phrase should not be considered indefinite or unclear in the absence of a particular definition, but should be understood in the ordinary sense. When a trading name appears herein, it is intended to refer to its corresponding commodity or active ingredient thereof.

The term "pharmaceutically acceptable" is used herein in terms of those compounds, materials, compositions, and/or dosage forms, which are suitable for use in contact with human and animal tissues within the scope of reliable medical judgment, with no excessive toxicity, irritation, an allergic reaction or other problems or complications, commensurate with a reasonable benefit/risk ratio.

The term "pharmaceutically acceptable salt" refers to a salt of the compound of the present disclosure that is prepared by reacting the compound having a specific substituent of the present disclosure with a relatively non-toxic acid or base. When the compound of the present disclosure contains a relatively acidic functional group, a base addition salt can be obtained by bringing the neutral form of the compound into contact with a sufficient amount of base in a pure solution or a suitable inert solvent. The pharmaceutically acceptable base addition salt includes a salt of sodium, potassium, calcium, ammonium, organic amine or magnesium, or similar salts. When the compound of the present disclosure contains a relatively basic functional group, an acid addition salt can be obtained by bringing the neutral form of the compound into contact with a sufficient amount of acid in a pure solution or a suitable inert solvent. Examples of the pharmaceutically acceptable acid addition salt include an inorganic acid salt, wherein the inorganic acid includes, for example, hydrochloric acid, hydrobromic acid, nitric acid, carbonic acid, bicarbonate, phosphoric acid, monohydrogen phosphate, dihydrogen phosphate, sulfuric acid, hydrogen sulfate, hydroiodic acid, phosphorous acid, and the like; and an organic acid salt, wherein the organic acid includes, for example, acetic acid, propionic acid, isobutyric acid, maleic acid, malonic acid, benzoic acid, succinic acid, suberic acid, fumaric acid, lactic acid, mandelic acid, phthalic acid, benzenesulfonic acid, p-toluenesulfonic acid, citric acid, tartaric acid, and methanesulfonic acid, and the like; and salts of amino acid (such as arginine and the like), and a salt of an organic acid such as glucuronic acid and the like. Certain specific compounds of the present disclosure contain both basic and acidic functional groups, thus can be converted to any base or acid addition salt.

The pharmaceutically acceptable salt of the present disclosure can be prepared from the parent compound that contains an acidic or basic moiety by conventional chemical method. Generally, such salt can be prepared by reacting the free acid or base form of the compound with a stoichiometric amount of an appropriate base or acid in water or an organic solvent or a mixture thereof.

The compounds of the present disclosure may exist in specific geometric or stereoisomeric forms. The present disclosure contemplates all such compounds, including cis and trans isomers, (−)- and (+)-enantiomers, (R)- and (S)-enantiomers, diastereomers isomers, (D)-isomers, (L)-isomers, and racemic and other mixtures thereof, such as enantiomers or diastereomeric enriched mixtures, all of which are within the scope of the present disclosure. Additional asymmetric carbon atoms may be present in substituents such as alkyl. All these isomers and their mixtures are included within the scope of the present disclosure.

Unless otherwise specified, D in the present disclosure represents deuterium ($^2$H).

Unless otherwise specified, the term "enantiomer" or "optical isomer" refers to stereoisomers that are mirror images of each other.

Unless otherwise specified, the term "cis-trans isomer" or "geometric isomer" is caused by the inability to rotate freely of double bonds or single bonds of ring-forming carbon atoms.

Unless otherwise specified, the term "diastereomer" refers to a stereoisomer in which a molecule has two or more chiral centers and the relationship between the molecules is not mirror images.

Unless otherwise specified, "(+)" refers to dextrorotation, "(−)" refers to levorotation, and or "(±)" refers to racemic.

Unless otherwise specified, the absolute configuration of a stereogenic center is represented by a wedged solid bond (⟋) and a wedged dashed bond (⟍), and the relative configuration of a stereogenic center is represented by a straight solid bond (⟋) and a straight dashed bond (⟍), a wave line (∿) is used to represent a wedged dashed bond (⟋) or a wedged dashed bond (⟍), or the wave line (∿) is used to represent a straight solid bond (⟋) and a straight dashed bond (⟍).

Unless otherwise specified, when double bond structure, such as carbon-carbon double bond, carbon-nitrogen double bond, and nitrogen-nitrogen double bond, exists in the compound, and each of the atoms on the double bond is connected to two different substituents (including the condition where a double bond contains a nitrogen atom, the lone pair of electrons attached on the nitrogen atom is regarded as a substituent connected), if the atom on the double bond in the compound is connected to its substituent by a wave line (∿), this refers to the (Z) isomer, (E) isomer or a mixture of two isomers of the compound. For example, the following formula (A) means that the compound exists as a single isomer of formula (A-1) or formula (A-2) or as a mixture of two isomers of formula (A-1) and formula (A-2); the following formula (B) means that the compound exists in the form of a single isomer of formula (B-1) or formula (B-2) or in the form of a mixture of two isomers of formula (B-1) and formula (B-2). The following formula (C) means that the compound exists as a single isomer of formula (C-1) or formula (C-2) or as two a mixture of two isomers of formula (C-1) and formula (C-2).

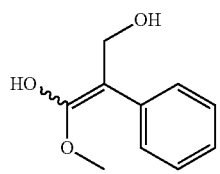

(A)

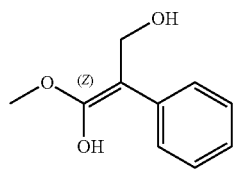

(A-1)

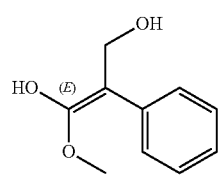

(A-2)

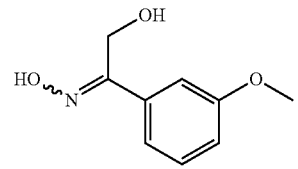

(B)

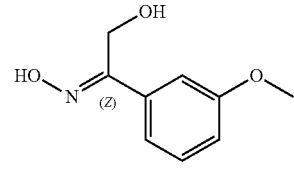

(B-1)

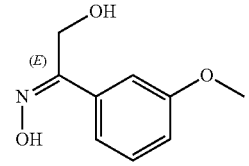

(B-2)

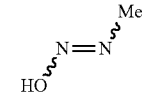

(C)

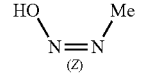

(C-1)

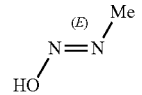

(C-2)

Unless otherwise specified, the term "tautomer" or "tautomeric form" means that at room temperature, the isomers of different functional groups are in dynamic equilibrium and can be transformed into each other quickly. If tautomers possibly exist (such as in solution), the chemical equilibrium of tautomers can be reached. For example, proton tautomer (also called prototropic tautomer) includes interconversion through proton migration, such as keto-enol isomerization and imine-enamine isomerization. Valence tautomer includes some recombination of bonding electrons for mutual transformation. A specific example of keto-enol tautomerization is the tautomerism between two tautomers of pentane-2, 4-dione and 4-hydroxypent-3-en-2-one.

Unless otherwise specified, the terms "enriched in one isomer", "enriched in isomers", "enriched in one enantiomer" or "enriched in enantiomers" refer to the content of one of the isomers or enantiomers is less than 100%, and the content of the isomer or enantiomer is greater than or equal to 60%, or greater than or equal to 70%, or greater than or equal to 80%, or greater than or equal to 90%, or greater than or equal to 95%, or greater than or equal to 96%, or greater than or equal to 97%, or greater than or equal to 98%, or greater than or equal to 99%, or greater than or equal to 99.5%, or greater than or equal to 99.6%, or greater than or equal to 99.7%, or greater than or equal to 99.8%, or greater than or equal to 99.9%.

Unless otherwise specified, the term "isomer excess" or "enantiomeric excess" refers to the difference between the relative percentages of two isomers or two enantiomers. For example, if the content of one isomer or enantiomer is 90%, and the content of the other isomer or enantiomer is 10%, the isomer or enantiomer excess (ee value) is 80%.

Optically active (R)- and (S)-isomer, or D and L isomer can be prepared using chiral synthesis or chiral reagents or other conventional techniques. If one kind of enantiomer of certain compound of the present disclosure is to be obtained, the pure desired enantiomer can be obtained by asymmetric synthesis or derivative action of chiral auxiliary followed by separating the resulting diastereomeric mixture and cleaving the auxiliary group. Alternatively, when the molecule contains a basic functional group (such as amino) or an acidic functional group (such as carboxyl), the compound reacts with an appropriate optically active acid or base to form a salt of the diastereomeric isomer which is then subjected to diastereomeric resolution through the conventional method in the art to obtain the pure enantiomer. In addition, the enantiomer and the diastereoisomer are generally isolated through chromatography which uses a chiral stationary phase and optionally combines with a chemical derivative method (such as carbamate generated from amine).

The compound of the present disclosure may contain an unnatural proportion of atomic isotope at one or more than one atom(s) that constitute the compound. For example, the compound can be radiolabeled with a radioactive isotope, such as tritium ($^3$H), iodine-125 ($^{125}$I) or C-14 ($^{14}$C). For another example, deuterated drugs can be formed by replacing hydrogen with heavy hydrogen, and the bond formed by deuterium and carbon is stronger than that of ordinary hydrogen and carbon; compared with non-deuterated drugs, deuterated drugs have the advantages of reduced toxic and side effects, increased drug stability, enhanced efficacy, extended biological half-life of drugs, etc. All isotopic variations of the compound of the present disclosure, whether radioactive or not, are encompassed within the scope of the present disclosure.

The term "optional" or "optionally" means that the subsequent event or condition may occur but not requisite, that the term includes the instance in which the event or condition occurs and the instance in which the event or condition does not occur.

The term "substituted" means one or more than one hydrogen atom (s) on a specific atom are substituted with the substituent, including deuterium and hydrogen variables, as long as the valence of the specific atom is normal and the substituted compound is stable. When the substituent is an oxygen (i.e., =O), it means two hydrogen atoms are substituted. Positions on an aromatic ring cannot be substituted with a ketone. The term "optionally substituted" means an atom can be substituted with a substituent or not, unless otherwise specified, the type and number of the substituent may be arbitrary as long as being chemically achievable.

When any variable (such as R) occurs in the constitution or structure of the compound more than once, the definition of the variable at each occurrence is independent. Thus, for example, if a group is substituted with 0-2 R, the group can be optionally substituted with up to two R, wherein the definition of R at each occurrence is independent. Moreover, a combination of the substituent and/or the variant thereof is allowed only when the combination results in a stable compound.

When the number of a linking group is 0, such as —(CRR)$_0$—, it means that the linking group is a single bond.

When a substituent is vacant, it means that the substituent does not exist, for example, when X is vacant in A-X, the structure of A-X is actually A. When the enumerative substituent does not indicate by which atom it is linked to the group to be substituted, such substituent can be bonded by any atom thereof. For example, when pyridyl acts as a substituent, it can be linked to the group to be substituted by any carbon atom on the pyridine ring.

When the enumerative linking group does not indicate the direction for linking, the direction for linking is arbitrary, for example, the linking group L contained in

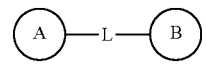

is -M-W—, then -M-W— can link ring A and ring B to form

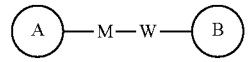

in the direction same as left-to-right reading order, and form

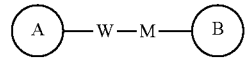

in the direction contrary to left-to-right reading order. A combination of the linking groups, substituents and/or variables thereof is allowed only when such combination can result in a stable compound.

Unless otherwise specified, when a group has one or more linkable sites, any one or more sites of the group can be linked to other groups through chemical bonds. When the linking site of the chemical bond is not positioned, and there is H atom at the linkable site, then the number of H atom at the site will decrease correspondingly with the number of chemical bond linking thereto so as to meet the corresponding valence. The chemical bond between the site and other groups can be represented by a straight solid bond ( ╱ ), a straight dashed bond ( ╱ ) or a wavy line

For example, the straight solid bond in —OCH$_3$ means that it is linked to other groups through the oxygen atom in the group; the straight dashed bonds in

means that it is linked to other groups through the two ends of nitrogen atom in the group; the wave lines in

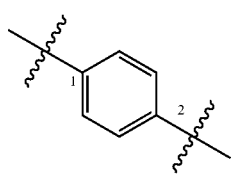 [SMILES: *c1ccc(*)cc1]

means that the phenyl group is linked to other groups through carbon atoms at position 1 and position 2;

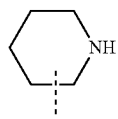

means that it can be linked to other groups through any linkable sites on the piperidinyl by one chemical bond, including at least four types of linkage, including

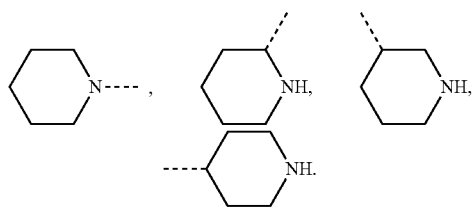

Even though the H atom is drawn on the —N—,

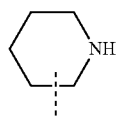

still includes the linkage of

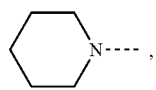

merely when one chemical bond was connected, the H of this site will be reduced by one to the corresponding monovalent piperidinyl.

Unless otherwise specified, the term "$C_{1-6}$ alkyl" refers to a linear or branched saturated hydrocarbon group consisting of 1 to 6 carbon atoms. The $C_{1-6}$ alkyl includes $C_{1-5}$, $C_{1-4}$, $C_{1-3}$, $C_{1-2}$, $C_{2-6}$, $C_{2-4}$, $C_6$ and $C_5$ alkyl and the like. It can be monovalent (such as methyl), divalent (such as methylene) or multivalent (such as methine). Examples of $C_{1-6}$ alkyl include but are not limited to methyl (Me), ethyl (Et), propyl (including n-propyl and isopropyl), butyl (including n-butyl, isobutyl, s-butyl, and t-butyl), pentyl (including n-pentyl, isopentyl and neopentyl), hexyl and the like.

Unless otherwise specified, the term "$C_{2-5}$ alkyl" refers to a linear or branched saturated hydrocarbon group consisting of 2 to 5 carbon atoms. The $C_{2-5}$ alkyl includes $C_{2-5}$, $C_{2-4}$, $C_{2-3}$, $C_2$, $C_3$, $C_4$ and $C_5$ alkyl and the like. Examples of $C_{2-5}$ alkyl include but are not limited to ethyl (Et), propyl (including n-propyl and isopropyl), butyl (including n-butyl, isobutyl, s-butyl, and t-butyl), pentyl (including n-pentyl, isopentyl and neopentyl) and the like.

Unless otherwise specified, the term "$C_{1-3}$ alkyl" refers to a linear or branched saturated hydrocarbon group consisting of 1 to 3 carbon atoms. The $C_{1-3}$ alkyl group includes $C_{1-2}$ and $C_{2-3}$ alkyl and the like; it can be monovalent (such as methyl), divalent (such as methylene) or multivalent (such as methine). Examples of $C_{1-3}$ alkyl include but are not limited to methyl (Me), ethyl (Et), propyl (including n-propyl and isopropyl), etc.

Unless otherwise specified, the term "$C_{1-3}$ alkoxy" refers to an alkyl containing 1 to 3 carbon atoms that are connected to the rest of the molecule through an oxygen atom. The $C_{1-3}$ alkoxy includes $C_{1-2}$, $C_{2-3}$, $C_1$, $C_2$ and $C_3$ alkoxy and the like. Examples of $C_{1-3}$ alkoxy include, but are not limited to, methoxy, ethoxy, propoxy (including n-propoxy and isopropoxy), etc.

Unless otherwise specified, "$C_{3-8}$ cycloalkyl" refers to a saturated cyclic hydrocarbon group consisting of 3 to 8 carbon atoms, including monocyclic and bicyclic systems, wherein the bicyclic systems include spiro ring, fused ring and bridged ring. The $C_{3-8}$ cycloalkyl includes $C_{3-6}$, $C_{3-5}$, $C_{4-8}$, $C_{4-6}$, $C_{4-5}$, $C_{5-8}$ or $C_{5-6}$ cycloalkyl and the like, the $C_{3-8}$ cycloalkyl can be monovalent, divalent or multivalent. Examples of $C_{3-8}$ cycloalkyl include, but are not limited to, cyclopropyl, cyclobutyl, cyclopentyl, cyclohexyl, cycloheptyl, norbornyl, [2.2.2] dicyclooctyl and the like.

Unless otherwise specified, the term "3-8 membered heterocycloalkyl" by itself or in combination with other terms refers to a saturated cyclic group consisting of 3 to 8 ring atoms, wherein 1, 2, 3 or 4 ring atoms are heteroatoms independently selected from O, S and N, and the rest are carbon atoms, wherein nitrogen atoms are optionally quaternized, and nitrogen and sulfur heteroatoms can be optionally oxidized (i.e., NO and $S(O)_p$, p is 1 or 2). The 3-8 membered heterocycloalkyl includes monocyclic and bicyclic systems, wherein the bicyclic systems include spiro ring, fused ring and bridged ring. In addition, with regard to the "3-8 membered heterocycloalkyl", a heteroatom may occupy the connection position of the heterocycloalkyl with the rest of the molecule. The 3-8 membered heterocycloalkyl includes 3-6 membered, 3-5 membered, 4-6 membered, 5-6 membered, 4-membered, 5-membered, and 6-membered heterocycloalkyl and the like. Examples of 3-8 membered heterocycloalkyl include, but are not limited to, azetidinyl, oxetanyl, thietanyl, pyrrolidinyl, pyrazolidinyl, imidazolidinyl, tetrahydrothienyl (including tetrahydrothiophen-2-yl and tetrahydrothiophen-3-yl and the like), tetrahydrofuranyl (including tetrahydrofuran-2-yl and the like), tetrahydropyranyl, piperidinyl (including 1-piperidinyl, 2-piperidinyl and 3-piperidinyl and the like), piperazinyl (including 1-piperazinyl and 2-piperazinyl and the like), morpholinyl (including 3-morpholinyl and 4-morpholinyl and the like), dioxinyl, dithianyl, isoxazolidinyl, isothiazolidinyl, 1,2-oxazinyl, 1,2-thiazinyl, hexahydropyridazinyl, homopiperazinyl, homopiperidinyl or dioxacycloheptyl and the like.

The term "leaving group" refers to a functional group or atom which can be replaced by another functional group or atom through a substitution reaction (such as affinity substitution reaction). For example, representative leaving groups include triflate; chlorine, bromine, and iodine; sulfonate group, such as mesylate, tosylate, p-bromobenzenesulfonate, p-toluenesulfonates and the like; acyloxy, such as acetoxy, trifluoroacetoxy and the like.

The term "protecting group" includes, but is not limited to "amino protecting group", "hydroxy protecting group" or "thio protecting group". The term "amino protecting group" refers to a protecting group suitable for blocking the side reaction on the nitrogen of an amino. Representative amino protecting groups include, but are not limited to: formyl; acyl, such as alkanoyl (e.g., acetyl, trichloroacetyl or trifluoroacetyl); alkoxycarbonyl, such as tert-butoxycarbonyl (Boc); arylmethoxycarbonyl such as benzyloxycarbonyl (Cbz) and 9-fluorenylmethoxycarbonyl (Fmoc); arylmethyl, such as benzyl (Bn), trityl (Tr), 1,1-bis-(4'-methoxyphenyl)methyl; silyl, such as trimethylsilyl (TMS) and tert-butyldimethylsilyl (TBS) and the like. The term "hydroxy protecting group" refers to a protecting group suitable for blocking the side reaction on hydroxy. Representative hydroxy protecting groups include, but are not limited to: alkyl, such as methyl, ethyl, and tert-butyl; acyl, such as chain alkanoyl (e.g., acetyl); arylmethyl, such as benzyl (Bn), p-methoxybenzyl (PMB), 9-fluorenylmethyl (Fm), and diphenylmethyl (benzhydryl, DPM); silyl, such as trimethylsilyl (TMS) and tert-butyl dimethyl silyl (TBS) and the like.

The compounds of the present disclosure can be prepared by a variety of synthetic methods known to those skilled in the art, including the specific embodiments listed below, the embodiments formed by their combination with other chemical synthesis methods, and equivalent alternatives known to those skilled in the art, preferred implementations include but are not limited to the embodiments of the present disclosure.

The solvent used in the present disclosure is commercially available. The following abbreviations are used in the present disclosure: DMSO refers to dimethyl sulfoxide; EtOH refers to ethanol; MeOH refers to methanol; M refers to mol/L; N/A refers to not tested; $MgCl_2$ refers to magnesium chloride; EGTA refers to ethylenebis(oxyethylenenitrilo)tetraacetic acid; and $Na_3VO_4$ refers to sodium vanadate.

The compounds of the present disclosure are named according to the conventional naming principles in the art or by ChemDraw® software, and the commercially available compounds use the supplier catalog names.

DETAILED DESCRIPTION OF THE PREFERRED EMBODIMENTS

Figure 1:
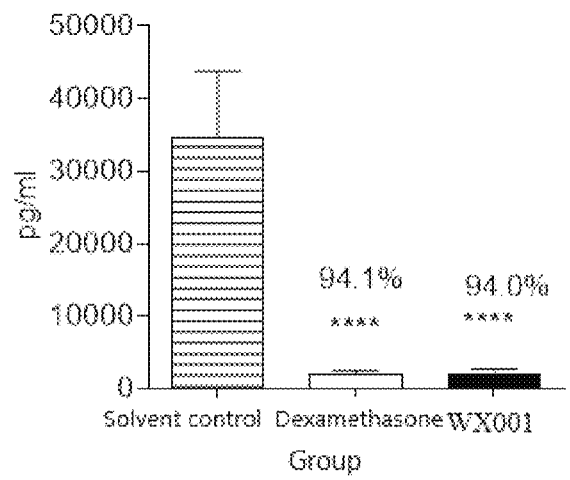
FIG. 1 shows a graph of plasma TNF-α concentration.

The following embodiment further illustrates the present disclosure, but the present disclosure is not limited thereto. The present disclosure has been described in detail herein, and its specific embodiments have also been disclosed; for one skilled in the art, it is obvious to make various modifications and improvements to the embodiments of the present disclosure without departing from the spirit and scope of the present disclosure.

Reference Embodiment 1: Synthesis of Intermediate A1

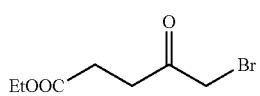

Synthetic Route:

Step 1: Synthesis of Compound A1

Ethyl succinyl chloride (50.0 g) was added to acetonitrile (500.0 mL) and the mixture was stirred evenly; (trimethylsilyl)diazomethane (2 M, 227.8 mL) was added dropwise to the reaction system and the mixture was stirred at 25° C. for 0.5 hours. Then, hydrobromic acid acetic acid solution (93.1 g, 33% content) was added dropwise to the reaction system at 0° C., and the mixture was stirred at 25° C. for 0.5 hours. The reaction mixture was concentrated under reduced pressure to remove acetonitrile; the residue was poured into ethyl acetate (500.0 mL), and washed with saturated sodium bicarbonate aqueous solution (100 mL×3). The organic phase was separated and dried over an appropriate amount of anhydrous sodium sulfate. The desiccant was removed by filtration, and the filtrate was concentrated to dryness under reduced pressure to obtain a crude product. The crude product was purified by column chromatography (eluent: petroleum ether-petroleum ether:ethyl acetate=10:1) to obtain compound A1.

Reference Embodiment 2: Synthesis of Intermediate A2

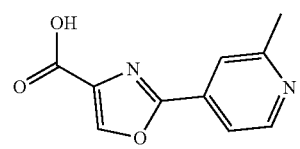

Synthetic Route:

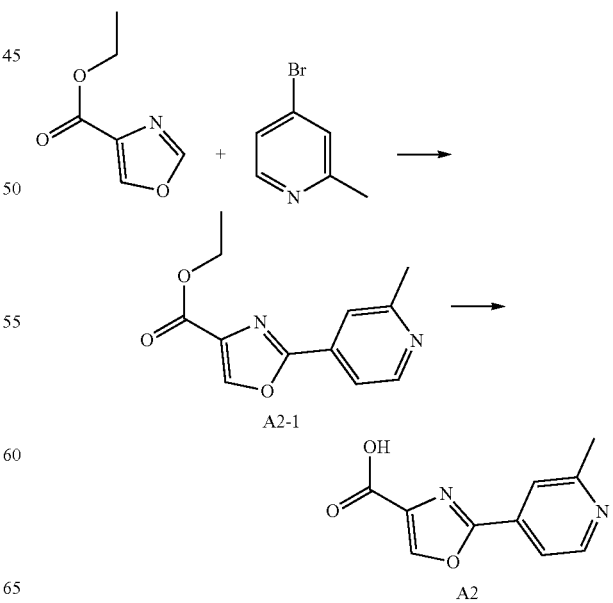

Step 1: Synthesis of Compound A2-1

Palladium acetate (2.2 g), cesium carbonate (32.3 g) and tri-o-tolylphosphine (6.0 g) were added to a mixed solution of 4-bromo-2-methylpyridine (8.5 g), ethyl oxazole-4-carboxylate (7.0 g) and N,N-dimethylformamide (70.0 mL). The mixture was replaced with nitrogen three times, and stirred at 100° C. for 16 hours. Then the reaction mixture was cooled to room temperature, and filtered by celite. The filtrate was concentrated to dryness under reduced pressure to obtain a crude product. The crude product was purified by column chromatography (eluent: petroleum ether:ethyl acetate=10:1-0:1) to obtain compound A2-1.

Step 2: Synthesis of Compound A2

Compound A2-1 (6.5 g) was dissolved in methanol (35.0 mL) and water (35.0 mL) and the mixture was stirred evenly; sodium hydroxide (2.2 g) was added to the reaction system and the mixture was stirred at 15° C. for 2 hours. Methanol was removed by concentration under reduced pressure, and the aqueous phase was extracted with tert-butyl methyl ether (10.0 mL×1). The aqueous phase was separated, and the pH value was adjusted to 3 with 1 M hydrochloric acid. The aqueous phase was concentrated to dryness under reduced pressure, and toluene (10.0 mL) was added to the residue and stirred evenly. The mixture was filtered, and the filtrate was concentrated to dryness under reduced pressure to obtain compound A2. LCMS (ESI) m/z=205.2 [M+H]$^+$. $^1$H NMR (400 MHz, MeOH-d$_4$) δ=8.87-8.86 (m, 2H), 8.53 (s, 1H), 8.45 (d, J=6.0 Hz, 1H), 2.89 (s, 3H).

Each fragment compound in Table 1 below was synthesized with reference to the synthesis steps of compound A2.

TABLE 1

| Number | Structure | NMR | MS m/z [M + H]$^+$ |
|---|---|---|---|
| A3 | (structure) | $^1$H NMR (400 MHz, CD$_3$OD) δ = 8.91 (d, J = 5.2 Hz, 1H), 8.73 (s, 1H), 8.41 (s, 1H), 8.26 (d, J = 5.2 Hz, 1H). | 259.1 |
| A4 | (structure) | $^1$H NMR (400 MHz, CD$_3$OD) δ = 8.93 (s, 1H), 8.88 (d, J = 6.8 Hz, 1H), 8.56 (s, 1H), 8.46 (m, 1H), 3.47 (m, 1H), 1.52 (d, J = 7.2 Hz, 6H). | 233.2 |
| A5 | (structure) | $^1$H NMR (400 MHz, CD$_3$OD) δ = 8.84 (s, 1H), 8.74 (d, J = 6.0 Hz, 1H), 8.21 (d, J = 6.0 Hz, 1H), 8.19 (s, 1H), 2.48 (m, 1H), 1.53 (m, 2H), 1.37 (m, 2H). | 231.1 |
| A6 | (structure) | N/A | 216.0 |
| A7 | (structure) | N/A | 234.1 |

Each intermediate in Table 2 below was a commercially available reagent.

TABLE 2

| Number | Structure | CAS |
|---|---|---|
| B1 | (structure) | 50606-31-0 |
| B2 | (structure) | 13889-98-0 |

TABLE 2-continued

| Number | Structure | CAS |
|---|---|---|
| B3 | morpholine | 110-91-8 |
| B4 | piperidine | 110-89-4 |
| B5 | 4-hydroxypiperidine | 5382-16-1 |
| B6 | N-Boc-piperazine | 57260-71-6 |
| B7 | cyclopropylboronic acid | 411235-57-9 |
| B8 | 4,4-dimethylpiperidine HCl | 38646-68-3 |
| B9 | 4,4-difluoropiperidine | 21987-29-1 |
| B10 | phenylboronic acid | 98-80-6 |
| B11 | 4-(hydroxymethyl)piperidine | 6457-49-4 |
| B12 | 4-(aminomethyl)piperidine | 7144-05-0 |
| B13 | pyridin-3-ylboronic acid | 1692-25-7 |
| B14 | cyclohex-1-en-1-ylboronic acid | 89490-05-1 |
| B15 | methyl piperidine-4-carboxylate | 2971-79-1 |
| B16 | (2-fluorophenyl)boronic acid | 1993-03-9 |
| B17 | (3-fluorophenyl)boronic acid | 768-35-4 |
| B18 | (2-cyanophenyl)boronic acid | 138642-62-3 |
| B19 | (2-fluoro-6-methoxyphenyl)boronic acid | 78495-63-3 |
| B20 | (2,6-difluorophenyl)boronic acid | 162101-25-9 |
| B21 | (4-chlorophenyl)boronic acid | 1679-18-1 |

TABLE 2-continued

| Number | Structure | CAS |
|---|---|---|
| B22 | 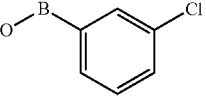 | 63503-60-6 |
| B23 | 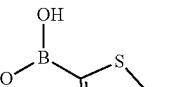 | 6165-68-0 |
| B24 | 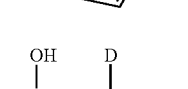 | 215527-70-1 |
| B25 | 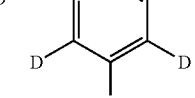 | 156545-07-2 |
| B26 | 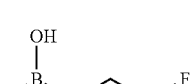 | 1256345-60-4 |
| B27 | 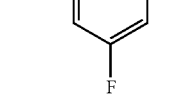 | 1765-93-1 |

Embodiment 1: Synthesis of Compound WX001

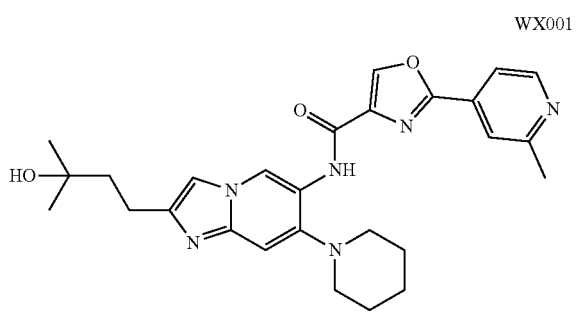 [SMILES: Cc1cc(-c2nc(C(=O)Nc3cn4cc(CCC(C)(C)O)nc4cc3N3CCCCC3)co2)ccn1]

WX001

Synthetic Route:

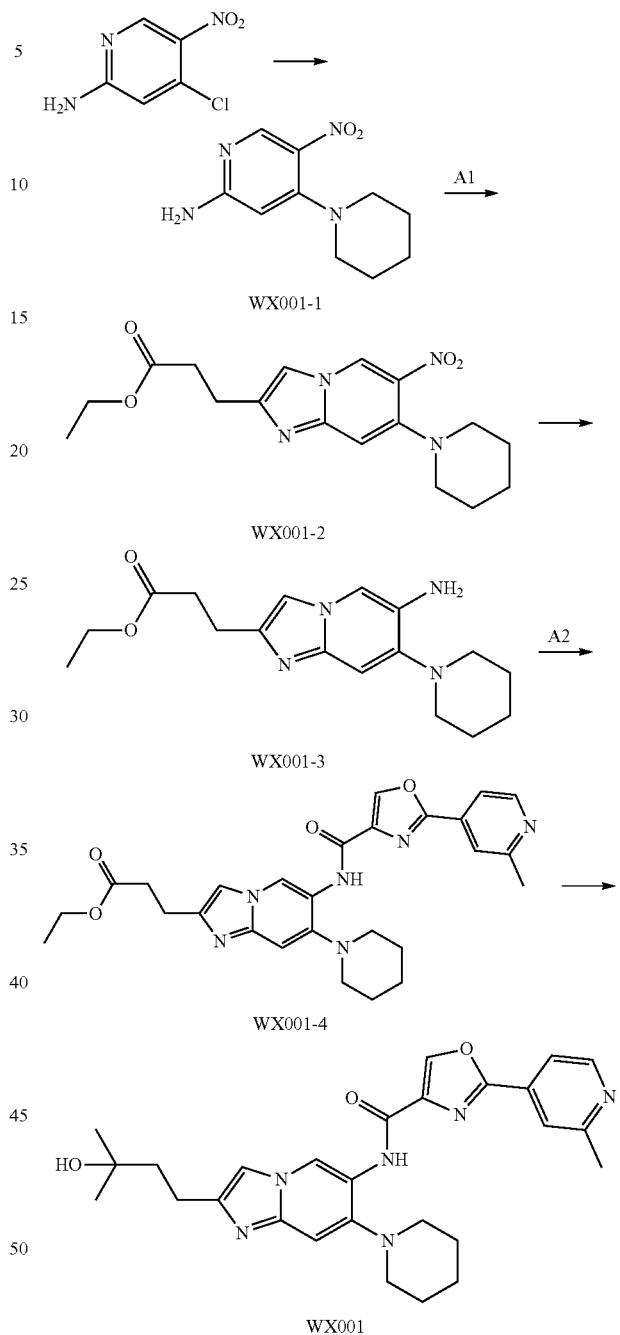

Step 1: Synthesis of Compound WX001-1

4-Chloro-5-nitro-pyridin-2-amine (25.0 g) was dissolved in tetrahydrofuran (200.0 mL) and then piperidine (61.3 g) was added. The mixture was stirred at 10° C. for 12 hours, the reaction mixture was concentrated to dryness under reduced pressure; ethyl acetate (100.0 mL) was added to the residue and the mixture was slurried. Then the mixture was filtered, and the filtrate was collected. The filtrate was concentrated to dryness under reduced pressure to obtain a crude product, then the crude product was purified by column chromatography (petroleum ether:ethyl acetate=5: 1-0:1) to obtain compound WX001-1.

Step 2: Synthesis of Compound WX001-2

A mixture of compound WX001-1 (5.0 g) and intermediate A1 (5.0 g) was replaced with nitrogen three times, and then stirred at 100° C. for 12 hours. The reaction mixture was cooled to room temperature, then poured into water (200.0 mL), and dichloromethane (200.0 mL×3) was added for extraction. The organic phases were combined and dried over an appropriate amount of anhydrous sodium sulfate. The desiccant was removed by filtration, and the filtrate was concentrated to dryness under reduced pressure to obtain a crude product. The crude product was purified by column chromatography (eluent: dichloromethane:methanol=100:1-10:1) to obtain compound WX001-2.

Step 3: Synthesis of Compound WX001-3

Raney nickel (3.0 g) was added to a solution of WX001-2 (3.0 g) in EtOH (50.0 mL) and the mixture was stirred under $H_2$ (50 Psi) at 30° C. for 1 hour. The mixture was filtered to remove the catalyst, and the filtrate was concentrated to dryness under reduced pressure to obtain compound WX001-3.

Step 4: Synthesis of Compound WX001-4

Compound WX001-3 (3.0 g), A2 (2.9 g), O-(7-azabenzotriazol-1-yl)-N,N,N',N'-tetramethyluronium hexafluorophosphate (6.5 g) and N,N-diisopropylethylamine (3.7 g) were added to dichloromethane (50.0 mL) and the mixture was stirred at 20° C. for 12 hours. When the reaction was completed, the reaction mixture was poured into saturated sodium bicarbonate aqueous solution (50.0 mL) and the mixture was stirred evenly. The organic phase was separated and dried over an appropriate amount of anhydrous sodium sulfate. The desiccant was removed by filtration, and the filtrate was concentrated to dryness under reduced pressure to obtain a crude product. The crude product was purified by column chromatography (pure petroleum ether, petroleum ether:ethyl acetate=1:1, ethyl acetate:methanol=10:1) to obtain compound WX001-4.

Step 5: Synthesis of Compound WX001

Compound WX001-4 (3.3 g) was dissolved in anhydrous tetrahydrofuran (70.0 mL) and the reaction mixture was cooled to 10° C. A solution of magnesium methyl bromide (3 M, 15.4 mL) in ether was added dropwise to the reaction system and the mixture was stirred at 15° C. for 20 minutes. The reaction mixture was poured into saturated ammonium chloride aqueous solution (30.0 mL), and the mixture was extracted with ethyl acetate (20.0 mL×3). The organic phases were combined and dried over an appropriate amount of anhydrous sodium sulfate. The desiccant was removed by filtration, and the filtrate was concentrated to dryness under reduced pressure to obtain a crude product. The crude product was purified by column chromatography (pure petroleum ether, petroleum ether:ethyl acetate=1:1, ethyl acetate:methanol=10:1), and purified by machine purification (column: Welch Xtimate C18 250*50 mm*10 μm; mobile phase: A: aqueous solution containing 10 mM $NH_4HCO_3$, B: acetonitrile; gradient: B %: 30%-55%, 10 minutes) to obtain compound WX001. LCMS (ESI) m/z=489.3 [M+H]$^+$. $^1$H NMR (400 MHz, DMSO-$d_6$) δ=9.25 (s, 1H), 8.70 (s, 1H), 8.63 (d, J=4.8 Hz, 1H), 7.93 (s, 1H), 7.83 (d, J=4.8 Hz, 1H), 7.50 (s, 1H), 7.31 (s, 1H), 7.14 (s, 1H), 4.14-4.12 (m, 1H), 2.99-2.97 (m, 4H), 2.81-2.77 (m, 2H), 2.64 (s, 3H), 1.99-1.96 (m, 4H), 1.91-1.89 (m, 2H), 1.87 (br s, 2H), 1.27 (s, 6H).

Each of the embodiment in the following Table 3 was synthesized with reference to the synthesis step of Embodiment 1, except that the B4 (piperidine ring) of Step 1 in Embodiment 1 was replaced by the corresponding B fragment of the corresponding Fragment 1, and the synthesis step may undergo conventional operations such as removal of Boc, hydrolysis, formation of tertiary alcohols with esters using methyl Grignard reagents or Suzuki coupling, etc.

TABLE 3

| Embodiments | Fragment 1 | Compound | Product structure | NMR | MS m/z [M + H]$^+$ |
| --- | --- | --- | --- | --- | --- |
| 2 | B3 | WX002 | | $^1$H NMR (400 MHz, DMSO-$d_6$) δ = 9.81 (s, 1H), 9.32 (s, 1H), 9.10 (s, 1H), 8.74 (d, J = 5.6 Hz, 1H), 7.86 (s, 1H), 7.78 (d, J = 5.2 Hz, 1H), 7.72 (s, 1H), 7.28 (s, 1H), 4.36 (s, 1H), 3.94-3.89 (m, 4H), 2.95-2.99 (m, 4H), 2.69-2.67 (m, 2H), 2.60 (s, 3H), 1.77-1.73 (m, 2H), 1.15 (s, 6H). | 491.1 |
| 3 | B6 | WX003 | | $^1$H NMR (400 MHz, CD$_3$OD) δ = 9.44 (s, 1H), 8.90 (s, 1H), 8.81 (d, J = 6.0 Hz, 1H), 8.40 (s, 2H), 7.83 (s, 1H), 7.44 (s, 1H), 3.53 (s, 4H), 3.42 (s, 4H), 3.08-2.94 (m, 1H), 2.91-2.83 (m, 1H), 2.81 (s, 3H), 1.86-1.82 (m, 2H), 1.21 (s, 6H). | 490.2 |

TABLE 3-continued

| Embodiments | Fragment 1 | Compound | Product structure | NMR | MS m/z [M + H]+ |
|---|---|---|---|---|---|
| 4 | B1 | WX004 | 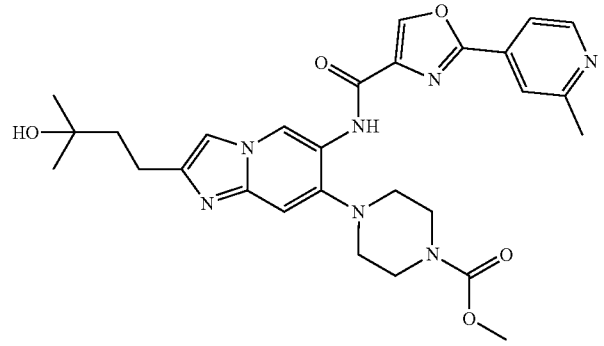 | ¹H NMR (400 MHz, CD₃OD) δ = 9.61 (s, 1H), 8.94 (s, 1H), 8.80 (d, J = 6.0 Hz, 1H), 8.26 (s, 1H), 8.18 (d, J = 4.8 Hz, 1H), 7.92 (s, 1H), 7.46 (s, 1H), 3.89 (s, 4H), 3.78 (s, 3H), 3.24 (s, 4H), 2.99-2.95 (m, 2H), 2.79 (s, 3H), 1.97-1.92 (m, 2H), 1.32 (s, 6H). | 548.4 |
| 5 | B2 | WX005 | 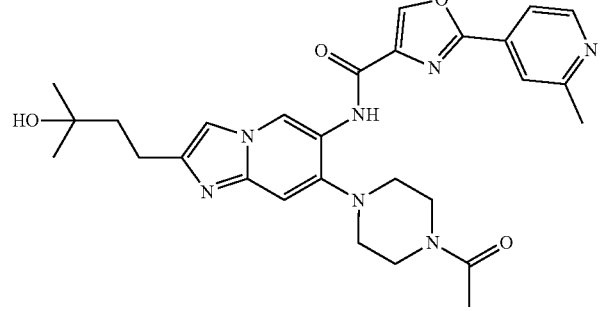 | ¹H NMR (400 MHz, CD₃OD) δ = 9.41 (s, 1H), 8.77 (s, 1H), 8.64 (d, J = 4.8 Hz, 1H), 7.89 (s, 1H), 7.82 (d, J = 4.0 Hz, 1H), 7.66 (s, 1H), 7.29 (s, 1H), 3.96-3.92 (m, 4H), 3.18-3.10 (m, 4H), 2.87-2.83 (m, 2H), 2.63 (s, 3H), 2.23 (s, 3H), 1.93-1.88 (m, 2H), 1.30 (s, 6H). | 532.1 |
| 6 | B5 | WX006 | 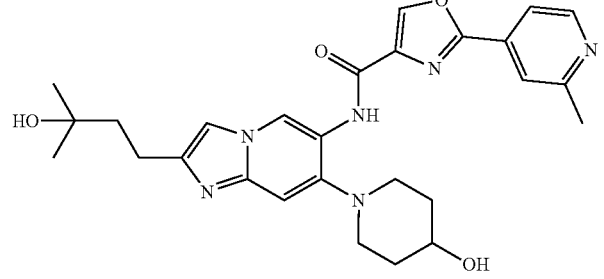 | ¹H NMR (400 MHz, CD₃OD) δ = 9.60 (m, 1H), 8.95 (s, 1H), 8.87-8.71 (m, 1H), 8.49-8.25 (m, 2H), 7.98-7.81 (m, 1H), 7.40 (s, 1H), 3.96-3.90 (m, 1H), 3.38-3.45 (m, 2H), 3.03-2.94 (m, 2H), 2.92-2.84 (m, 5H), 2.20-2.18 (m, 2H), 2.10-1.98 (m, 2H), 1.92-1.85 (m, 2H), 1.30 (s, 6H). | 505.2 |
| 7 | B7 | WX007 | 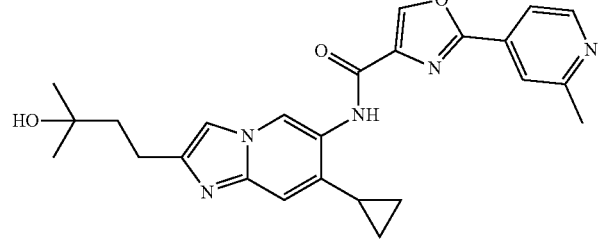 | ¹H NMR (400 MHz, CD₃OD) δ = 9.25 (s, 1H), 8.78 (s, 1H), 8.64 (s, 1H), 7.98 (s, 1H), 7.91 (d, J = 5.2 Hz, 1H), 7.83 (s, 1H), 7.42 (s, 1H), 2.93-2.90 (m, 2H), 2.66 (s, 3H), 2.21-2.17 (m, 2H), 1.94-1.90 (m, 1H), 1.29 (s, 8H), 0.94-0.88 (m, 2H). | 446..3 |
| 8 | B8 | WX008 | 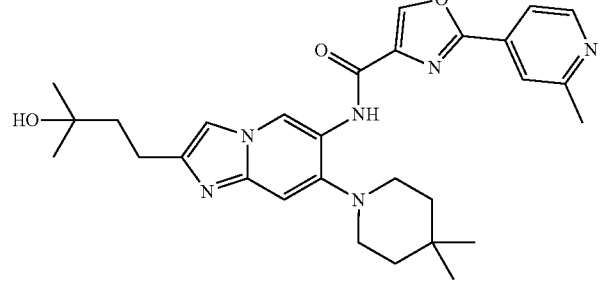 | ¹H NMR (400 MHz, DMSO-d₆) δ = 14.15-14.08 (m, 1H), 9.65-9.61 (m, 2H), 9.21 (s, 1H), 8.76-8.73 (m, 1H), 8.13 (s, 1H), 7.95-7.83 (m, 2H), 7.45 (s, 1H), 3.10-3.08 (m, 4H), 2.85-2.84 (m, 2H), 2.82-2.62 (m, 3H), 1.80-1.76 (m, 6H), 1.72 (s, 6H), 1.17-1.10 (m, 6H). | 517.3 |

TABLE 3-continued

| Embodiments | Fragment 1 | Compound | Product structure | NMR | MS m/z [M + H]+ |
|---|---|---|---|---|---|
| 9 | B9 | WX009 | | $^1$H NMR (400 MHz, CD$_3$OD) δ = 9.62-9.61 (m, 1H), 8.95 (s, 1H), 8.81-8.80 (m, 1H), 8.26 (s, 1H), 8.18 (s, 1H), 7.92 (s, 1H), 7.47 (s, 1H), 3.35-3.40 (m, 4H), 2.98-2.94 (m, 2H), 2.79 (s, 3H), 2.46 (m, 4H), 1.94-1.90 (m, 2H), 1.31 (s, 6H). | 525.2 |
| 10 | A3 | WX010 | | $^1$HNMR (400 MHz, DMSO-d$_6$) δ = 9.92 (s, 1H), 9.34 (s, 1H), 9.18 (s, 1H), 9.06 (d, J = 5.2 Hz, 1H),, 8.36 (s, 1H), 8.26 (d, J = 5.2 Hz, 1H), 7.70 (s, 1H), 7.22 (s, 1H), 4.25-4.20 (m, 1H), 2.93-2.90 (m, 4H), 2.69-2.65 (m, 2H), 1.92-1.86 (m, 4H), 1.77-1.73 (m, 2H), 1.66-1.65 (m, 2H), 1.15 (s, 6H) | 543.2 |
| 11 | A4 | WX011 | | $^1$H NMR (400 MHz, DMSO-d$_6$) δ = 9.86 (s, 1H), 9.34 (s, 1H), 9.08 (s, 1H), 8.75 (d, J = 5.2 Hz, 1H), 7.87 (s, 1H), 7.76-7.75 (m, 1H), 7.69 (s, 1H), 7.20 (s, 1H), 4.36-4.33 (m, 1H), 3.21-3.18 (m, 1H), 2.93-2.91 (m, 4H), 2.69-2.65 (m, 2H), 1.90-1.87 (m, 4H), 1.77-1.69 (m, 2H), 1.75-1.58 (m, 2H), 1.36-1.25 (m, 6H), 1.14 (s, 6H). | 517.3 |
| 12 | A5 | WX012 | | $^1$H NMR (400 MHz, DMSO-d$_6$) δ = 9.87 (s, 1H), 9.35 (s, 1H), 9.09 (s, 1H), 8.67 (d, J = 4.8 Hz, 1H), 7.83 (s, 1H), 7.70-7.68 (m, 2H), 7.21 (s, 1H), 4.36-4.33 (m, 1H), 2.93-2.92 (m, 4H), 2.90 (m, 1H) 1.92-1.87 (m, 4H), 1.77-1.74 (m, 4H), 1.23 (s, 2H), 1.15 (s, 6H), 1.08-1.06 (m, 2H), 0.99-0.97 (m, 2H). | 515.3 |
| 13 | B11 | WX013 | | $^1$H NMR (400 MHz, DMSO-d$_6$) δ = 9.81 (s, 1H), 9.37 (s, 1H), 9.09 (d, J = 5.2 Hz, 1H), 8.70-8.69 (d, J = 9.2 Hz, 1H), 7.83-7.81 (m, 2H), 7.74 (s, 1H), 7.25 (s, 1H), 4.67 (m, 1H), 3.36-3.31 (m, 4H), 3.15-3.13 (m, 2H), 2.90-2.86 (m, 3H), 2.76 (m, 4H), 2.64-2.61 (m, 5H), 1.90-1.88 (m, 4H), 1.64 (m, 3H). | 519.2 |

TABLE 3-continued

| Embodiments | Fragment 1 | Compound | Product structure | NMR | MS m/z [M + H]+ |
|---|---|---|---|---|---|
| 14 | B12 | WX014 | | N/A | 518.2 |
| 15 | A6 | WX015 | | ¹H NMR (400 MHz, DMSO-d₆) δ = 9.88 (s, 1H), 9.33 (s, 1H), 9.21 (s, 1H), 9.05 (s, 1H), 8.51 (s, 1H), 8.26-8.23 (m, 1H), 7.71 (s, 1H), 7.23 (s, 1H), 4.35 (s, 1H), 2.94-2.93 (m, 7H), 2.90 (s, 3H), 2.71-2.69 (m, 2H), 2.34 (s, 1H), 1.89-1.74 (m, 2H), 1.66-1.69 (m, 2H), 1.25 (s, 3H) | 500.3 |
| 44 | A7 | WX044 | | ¹H NMR (400 MHz, DMSO-d₆) = 9.95 (s, 1H), 9.35 (s, 1H), 9.14 (s, 1H), 8.91 (s, 1H), 8.70 (s, 1H), 8.26 (s, 1H), 8.13-8.11 (m, 1H), 7.81 (s, 1H), 7.71 (s, 1H), 7.22 (s, 1H), 5.76 (s, 1H), 4.34 (s, 1H), 4.10 (s, 1H), 3.18-3.17 (m, 2H), 2.93-2.91 (m, 3H), 1.92-1.90 (m, 3H), 1.78-1.74 (m, 4H), 1.16 (s, 6H) | 518.4 |
| 45 | B15 | WX045 | | N/A | 547.3 |

TABLE 3-continued

| Embodiments | Fragment 1 | Compound | Product structure | NMR | MS m/z [M + H]⁺ |
|---|---|---|---|---|---|
| 46 | B15 | WX046 | 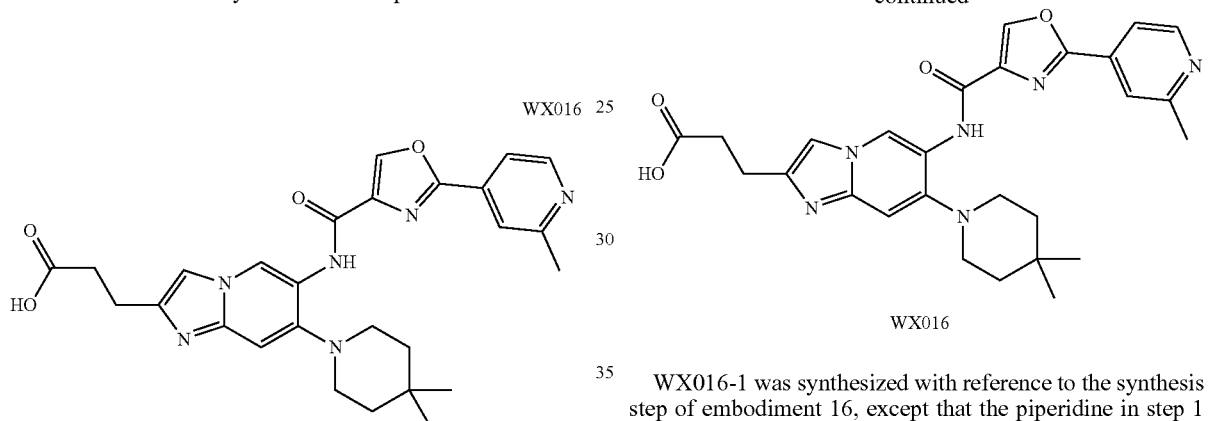 | $^1$H NMR (400 MHz, DMSO-$d_6$) = 9.83 (s, 1H), 9.37 (s, 1H), 9.10 (s, 1H), 8.70 (s, 1H), 7.86-7.83 (m, 2H), 7.72 (s, 1H), 7.22 (s, 1H), 3.17-3.14 (m, 3H), 2.85-2.78 (m, 4H), 2.62 (s, 5H), 2.08-2.03 (m, 4H), 1.78-1.74 (m, 2H), 1.16 (s, 6H). | 533.2 |

Embodiment 16: Synthesis of Compound WX016

Synthetic Route:

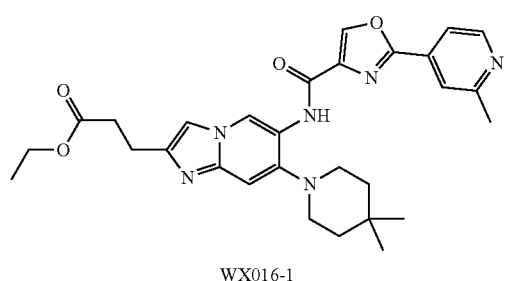

WX016-1 was synthesized with reference to the synthesis step of embodiment 16, except that the piperidine in step 1 was replaced with 4,4-dimethylpiperidine.

Step 1: Synthesis of Compound 16

Compound WX016-1 (15.0 mg) was dissolved in a solution of sodium hydroxide (2.3 mg) in water (1.0 mL), then methanol (1.0 mL) was added and the reaction was carried out at 25° C. for 2 hours. The pH value of the reaction mixture was adjusted to 6-7 with 1.0 M hydrochloric acid, and then the mixture was extracted with ethyl acetate (30.0 mL×4), and the organic phases were combined, dried over anhydrous sodium sulfate, filtered and concentrated under reduced pressure. Then the residue was purified by machine purification (column: Welch Xtimate C18 150*25 mm*5 μm; mobile phase: [aqueous solution containing (10.0 mM) NH$_4$HCO$_3$)-acetonitrile]; gradient: B %: 15%-50%, 10.5 min) to obtain compound WX016. LCMS (ESI) m/z: 503.3 [M+H]⁺. $^1$H NMR (400 MHz, DMSO-$d_6$) δ=9.74 (s, 1H), 9.35 (s, 1H), 9.06 (s, 1H), 8.67 (d, J=5.2 Hz, 1H), 7.83 (s, 1H), 7.76 (d, J=5.2 Hz, 1H), 7.70-7.68 (m, 1H), 7.29 (s, 1H), 2.92-2.89 (m, 4H), 2.87-2.83 (m, 4H), 2.65-2.55 (m, 4H), 1.68 (s, 4H), 1.07 (s, 6H).

Each of the embodiments in the following Table 4 was synthesized with reference to the synthesis step of embodiment 16, except that the 4,4-dimethylpiperidine in step 1 was replaced with Fragment 1.

TABLE 4

| Embodi-ments | Fragment 1 | Compound | Product structure | NMR | MS m/z [M + H]+ |
|---|---|---|---|---|---|
| 17 | B9 | WX017 | | ¹H NMR (400 MHz, DMSO-d₆) δ = 9.86 (s, 1H), 9.34 (s, 1H), 9.13 (s, 1 H), 8.71-8.69 (d, J = 8 Hz, 1H), 7.83 (s, 1H), 7.77-7.75 (m, 2H), 7.38 (s, 1H), 3.12 (m, 4H), 2.91-2.87 (m, 2H), 2.68-2.67 (m, 2H), 2.65-2.61 (m, 2H), 2.59 (s, 3H), 2.34 (m, 3H). | 511.2 |
| 18 | B4 | WX018 | | ¹H NMR (400 MHz, DMSO-d₆) δ = 9.88 (s, 1H), 9.34 (s, 1H), 9.10 (s, 1H), 8.73-8.72 (d, J = 5.2 Hz, 1H), 7.85 (s, 1H), 7.75-7.73 (m, 2H), 7.23 (s, 1H), 2.92-2.85 (m, 6H), 2.64-2.60 (m, 6H), 1.88 (m, 4H), 1.67 (m, 2H). | 475.2 |
| 19 | B12 | WX019 | | N/A | 504.2 |
| 20 | B11 | WX020 | | ¹H NMR (400 MHz, DMSO-d₆) δ = 9.81 (s, 1H), 9.37 (s, 1H), 9.09 (m, 1H), 8.70-8.69 (d, J = 8.0 Hz, 1H), 7.83-7.81 (m, 2H), 7.74 (s, 1H), 7.25 (s, 1H), 4.67 (m, 1H), 3.15-3.13 (m, 1H), 2.90-2.86 (m, 3H), 2.76 (m, 4H), 2.64-2.61 (m, 6H), 1.90-1.88 (m, 2H), 1.64 (m, 3H). | 505.2 |

Embodiment 21: Synthesis of Compound WX021

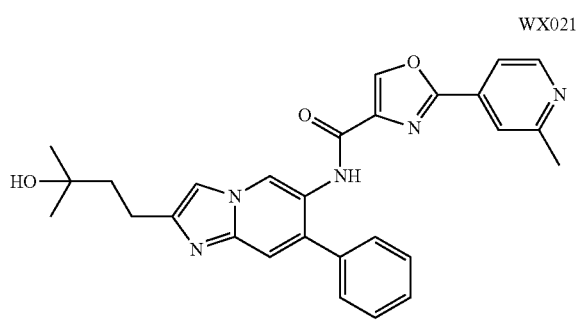

WX021

Synthetic Route:

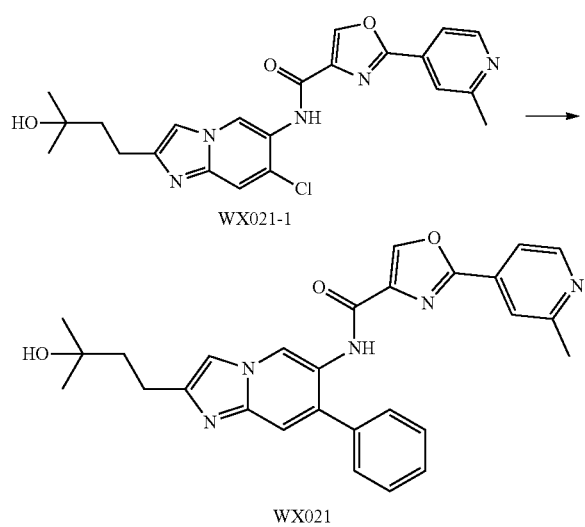

WX021-1 was synthesized with reference to the similar synthesis step of Embodiment 1, except that in the step 1 of Embodiment 1, piperidine was not used to substitute the chlorine atom.

Step 1: Synthesis of Compound WX021

WX020-1 (3.3 mg), B10 (3.33 mg), toluene (1.0 mL), ethanol (0.5 mL) and water (0.3 mL) were added to a reaction flask, then sodium bicarbonate (5.7 mg) and tetrakis(triphenylphosphine)palladium (5.3 mg) were added thereto. The mixture was replaced with nitrogen three times, and stirred at 80° C. for 12 hours. Then the mixture was filtered, and the filtrate was collected, then concentrated to dryness under reduced pressure. The crude product was purified by silica gel plate (eluent: dichloromethane:methanol=10:1) to obtain compound WX021. LCMS (ESI) m/z: 482.3[M+H]$^+$. $^1$H NMR (400 MHz, DMSO-d$_6$) δ=9.70 (s, 1H), 8.99 (s, 1H), 8.93 (s, 1H), 8.68-8.67 (d, J=4 Hz, 1H), 7.80 (s, 1H), 7.72 (s, 1H), 7.65-7.64 (d, J=4 Hz, 1H), 7.57-7.45 (m, 6H), 4.34 (s, 1H), 2.78-2.74 (m, 2H), 2.59 (s, 3H), 1.82-1.78 (m, 2H), 1.17 (s, 6H).

Each of the embodiment in the following Table 5 was synthesized with reference to the synthesis step of Embodiment 21, except that the B10 (phenylboronic acid) in the steps of Embodiment 21 was replaced by the corresponding B fragment of the corresponding Fragment 1, and the synthesis steps may undergo simple operations such as hydrogenation and cyanohydrolysis to amide.

TABLE 5

| Embodiments | Fragment 1 | Compound | Product structure | NMR | MS m/z [M + H]$^+$ |
|---|---|---|---|---|---|
| 22 | B14 | WX022 | | $^1$H NMR (400 MHz, DMSO-d$_6$) δ = 8.72 (s, 1H), 8.65-8.64 (d, J = 4.0 Hz 1H), 8.59 (s, 1H), 8.02 (s, 1H), 7.94-7.92 (d, J = 8.0 Hz 1H), 7.59 (s, 1H), 7.37 (s, 1H), 2.87-2.79 (m, 3H), 2.67 (s, 3H), 2.00-1.90 (m, 6H), 1.80-1.77 (m, 2H), 1.54-1.37 (m, 6H), 1.28 (s, 6H). | 488.2 |
| 23 | B13 | WX023 | | $^1$H NMR (400 MHz, DMSO-d$_6$) δ = 10.03 (s, 1H), 8.88 (s, 1H), 8.82 (s, 1H), 8.72 (s, 1H), 8.68-8.66 (d, J = 8.0 Hz 1H), 8.57-8.56 (d, J = 4.0 Hz 1H), 7.94-7.92 (m, 1H), 7.82 (s, 1H), 7.79 (s, 1H), 7.71-7.69 (m, 1H), 7.47-7.43 (m, 1H), 2.98-2.94 (t, J = 6.0 Hz, 2H), 2.70 (m, 4H), 2.58 (s, 3H). | 469.1 |

TABLE 5-continued

| Embodiments | Fragment 1 | Compound | Product structure | NMR | MS m/z [M + H]+ |
|---|---|---|---|---|---|
| 24 | B16 | WX024 | | N/A | 500.2 |
| 25 | B17 | WX025 | | ¹H NMR (400 MHz, DMSO-d₆) δ = 9.83 (s, 1H), 8.92 (s, 2H), 8.67 (s, 1H), 7.81 (s, 1H), 7.77 (s, 1H), 7.70-7.68 (m, 1H), 7.53-7.51 (m, 2H), 7.56-7.38 (m, 2H), 7.30-7.27 (m, 1H), 4.32 (s, 1H), 2.79-2.73 (m, 2H), 2.60-2.58 (m, 3H), 1.83-1.79 (m, 2H) 1.17-1.16 (s, 6H). | 500.3 |
| 26 | B27 | WX026 | | ¹H NMR (400 MHz, DMSO-d₆) δ = 9.74 (s, 1H), 8.92 (s, 2H), 8.67 (d, J = 5.20 Hz, 1H), 7.79 (s, 1H), 7.75 (s, 1H), 7.70-7.68 (m, 1H), 7.59-7.51 (m, 2H), 7.46 (s, 1H), 7.36-7.40 (m, 2H), 4.32 (s, 1H), 2.79-2.73 (m, 2H), 2.60-2.58 (m, 3H), 1.83-1.79 (m, 2H) 1.17-1.16 (s, 6H). | 500.3 |
| 27 | B18 | WX027 | | N/A | 525.2 |
| 28 | B19 | WX028 | | ¹H NMR (400 MHz, DMSO-d₆) δ = 9.19 (s, 1H), 9.01 (s, 2H), 9.97 (s, 1H), 8.70-8.68 (d, J = 8.0 Hz 1H), 7.88 (s, 1H), 7.65-7.57 (m, 3H), 7.46 (s, 1H), 7.17-7.15 (d, J = 8.0 Hz, 1H), 4.35 (s, 1H), 3.80 (s, 3H), 2.77-2.73 (m, 2H), 2.61 (s, 3H), 1.81-1.77 (m, 2H), 1.16 (s, 6H). | 530.3 |

TABLE 5-continued

| Embodiments | Fragment 1 | Compound | Product structure | NMR | MS m/z [M + H]+ |
|---|---|---|---|---|---|
| 29 | B20 | WX029 | | ¹H NMR (400 MHz, DMSO-d₆) δ = 9.66 (s, 1H), 8.91 (d, J = 5.2 Hz, 2H), 8.67 (d, J = 5.2 Hz, 1H), 7.94-7.92 (m, 1H), 7.82 (s, 1H), 7.79 (s, 1H), 7.71-7.69 (m, 2H), 7.47-7.43 (m, 2H), 4.33 (s, 1H), 2.79-2.75 (m, 2H), 2.58 (s, 3H) 1.82-1.78 (m, 2H), 1.16 (s, 6H) | 518.3 |
| 30 | B21 | WX030 | | ¹H NMR = (400 MHz, DMSO-d₆) δ = 9.76 (s, 1H), 8.91 (s, 2H), 8.67 (s, 1H), 7.79 (s, 1H), 7.75 (s, 1H), 7.69-7.67 (m, 1H), 7.56-7.55 (m, 4H), 7.48 (s, 1H), 4.31 (s, 1H), 2.78-2.74 (m, 2H), 2.60-2.50 (m, 3H), 1.82-1.78 (m, 2H) 1.16-1.15 (m, 6H) | 516.3 |
| 31 | B22 | WX031 | | ¹H NMR (400 MHz, DMSO-d₆) = 9.81 (s, 1H), 8.90 (s, 1H), 8.88 (s, 1H), 8.67 (d, J = 8.0 Hz 1H), 7.79 (s, 1H), 7.76 (s, 1H), 7.70-7.68 (m, 1H), 7.64 (m, 1H), 7.50-7.48 (m, 4H), 4.30 (s, 1H), 2.77-2.73 (m, 2H), 2.58 (s, 3H), 1.81-1.77 (m, 2H), 1.16 (s, 6H). | 516.3 |
| 32 | B23 | WX032 | | N/A | 488.3 |
| 33 | B24 | WX033 | | ¹H NMR (400 MHz, DMSO-d₆) = 9.68 (s, 1H), 8.99 (s, 1H), 8.92 (s, 1H), 8.68 (d, J = 4.0 Hz 1H), 7.80 (s, 1H), 7.72 (s, 1H), 7.65-7.64 (s, 1H), 7.45 (s, 1H), 4.32 (s, 1H), 2.78-2.73 (m, 2H), 2.59 (s, 3H), 1.82-1.78 (m, 2H), 1.17 (s, 6H). | 487.4 |

| Embodiments | Fragment 1 | Compound | Product structure | NMR | MS m/z [M + H]+ |
|---|---|---|---|---|---|
| 34 | B25 | WX034 | | ¹H NMR (400 MHz, DMSO-d₆) = 9.97 (s, 1H), 8.94 (s, 1H), 8.87 (s, 1H), 8.70 (s, 1H), 7.81 (s, 2H), 7.73-7.72 (m, 1H), 7.59 (s, 1H), 7.35-7.31 (m, 3H), 4.34 (s, 1H), 2.80-2.76 (m, 2H), 2.61 (s, 3H), 1.83-1.79 (m, 2H), 1.18-1.16 (m, 6H). | 518.4 |
| 35 | B18 | WX035 | | ¹H NMR (400 MHz, DMSO-d₆) = 9.29 (s, 1H), 9.11 (s, 1H), 8.87-8.83 (m, 2H), 8.70 (d, J = 5.2 Hz 1H), 8.43 (m, 2H), 8.05 (s, 1H), 7.92-7.90 (m, 2H), 7.82 (s, 1H), 7.81-7.75 (m, 1H), 4.38 (s, 1H) 2.88 (t, J = 4.8 Hz, 2H), 2.60 (s, 3H), 1.87 (t, J = 4.4 Hz, 2H), 1.19 (s, 6H) | 507.2 |
| 36 | B26 | WX036 | | ¹H NMR (400 MHz, DMSO-d₆) = 11.00 (s, 2H), 9.22 (s, 2H), 8.99 (s, 1H), 8.69 (d, J = 2.8 Hz 1H), 8.17 (s, 1H), 7.88 (s, 1H), 7.70 (s, 1H), 7.65 (d, J = 5.2 Hz 1H), 7.45-7.41 (m, 3H), 6.99 (d, J = 4.4 Hz 1H), 6.90-6.85 (m, 1H), 2.77-2.73 (m, 2H), 2.61 (s, 3H), 1.82-1.77 (m, 2H), 1.16 (s, 6H). | 516.2 |
Embodiment 37: Synthesis of Compound WX037
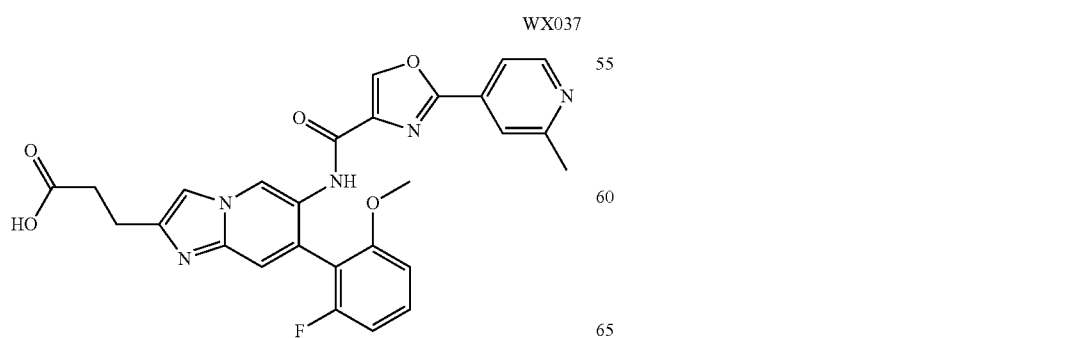
WX037

Synthetic Route:

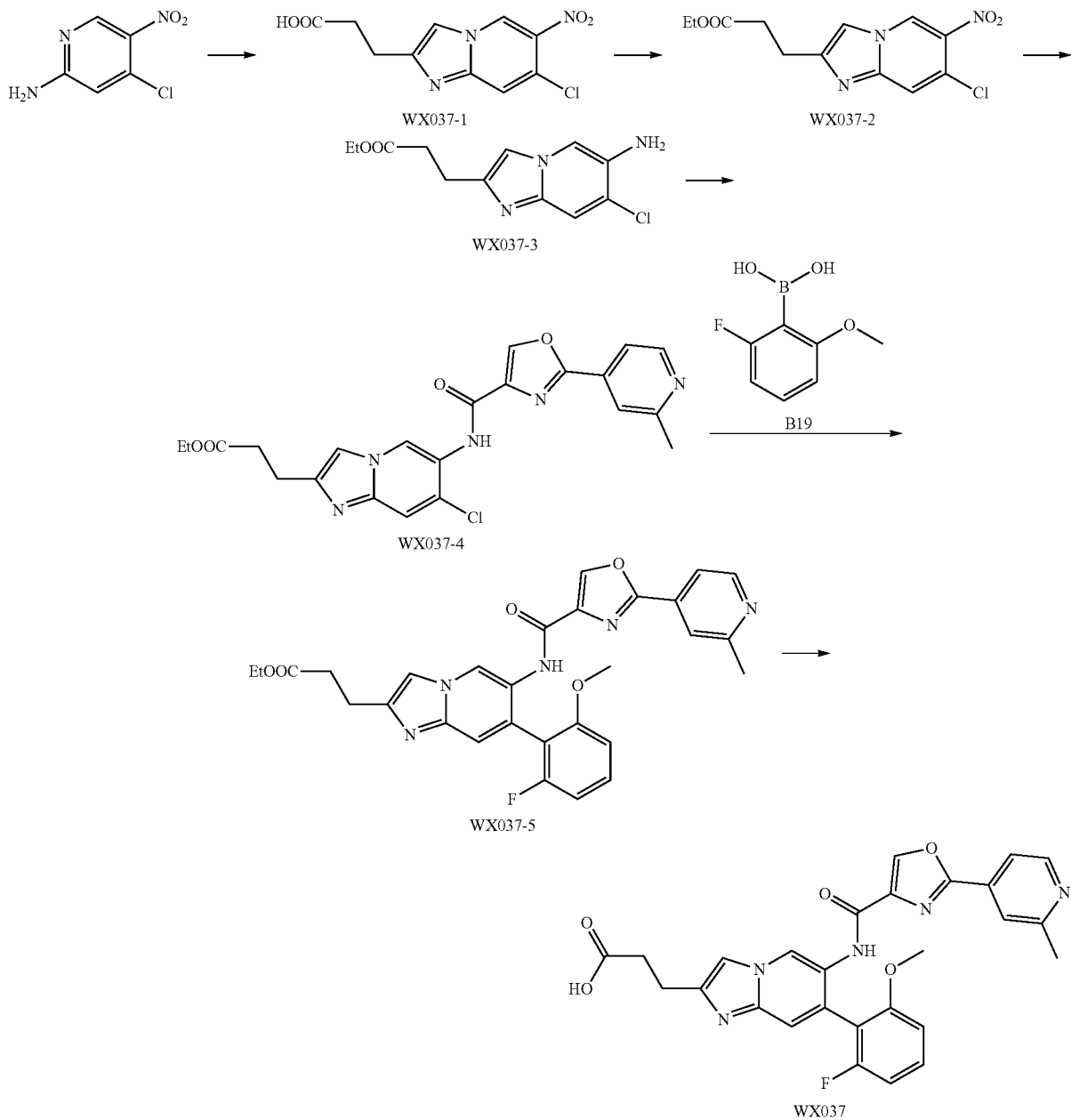

Step 1: Synthesis of Compound WX037-1
2-Amino-4-chloro-5-nitropyridine (10.0 g, 57.62 mmol) and ethyl bromoacetyl pyruvate (21.5 g, 97.95 mmol) were added to a reaction flask, and the mixture was replaced with nitrogen three times, and the reaction was stirred at 110° C. for 16 hours. Ethanol (80 mL) was added to the reaction mixture, and the mixture was stirred for 2 hours, then filtered; the solid was collected, and concentrated under reduced pressure to dryness to obtain compound WX037-1.

Step 2: Synthesis of Compound WX037-2
WX037-1 (10.0 g, 37.1 mmol) and anhydrous ethanol (100.0 mL) were added to a reaction flask, then concentrated sulfuric acid (3.7 g, 37.1 mmol, 2.0 mL, 98% purity) was added thereto, and the reaction mixture was stirred at 80° C. for 12 hours. The reaction mixture was concentrated under reduced pressure. Ethyl acetate (300.0 mL) was added for dissolution, then pH value was adjusted to 8 with saturated sodium carbonate aqueous solution; the phases were separated, and the organic phase was dried over anhydrous sodium sulfate, filtered and concentrated under reduced pressure. The crude product was purified by column chromatography (dichloromethane:methanol=100: 0-10:1) to obtain WX037-2.

Step 3: Synthesis of Compound WX037-3
WX037-2 (7.5 g, 25.2 mmol) and isopropyl acetate (140.0 mL) were added to a reaction flask, then stannic chloride dihydrate (34.1 g, 151.2 mmol) was added thereto. The mixture was stirred at 50° C. for 12 hours. Ethyl acetate (200.0 mL) was added to the reaction mixture, then the pH value was adjusted to 9 by adding ammonia water dropwise, and anhydrous sodium sulfate was added, and the sodium sulfate was stirred into a sand form; the mixture was filtered, and the filtrate was collected and concentrated to dryness under reduced pressure. The crude product was purified by column chromatography (eluent: dichloromethane:methanol=100: 0-10:1) to obtain WX037-3.

Step 4: Synthesis of Compound WX037-4

A mixture of WX037-3 (3 g, 11.21 mmol, 1 eq), A2 (3.0 g, 14.6 mmol), N,N-diisopropylethylamine (5.8 g, 44.8 mmol, 7.8 mL), 50% ethyl acetate solution of tri-n-propyl cyclophosphoric anhydride (21.9 g, 33.6 mmol, 20.0 mL, 50% purity) and THF (50.0 mL) was added to a reaction flask. The mixture was stirred at 50° C. for 12 hours. Ethyl acetate (100.0 mL) was added, then the pH value was adjusted to 8 with saturated sodium carbonate aqueous solution; the phases were separated, and the organic phase was collected and dried over anhydrous sodium sulfate, filtered and concentrated under reduced pressure. The crude product was purified by column chromatography (dichloromethane:methanol=100: 0-10:1) to obtain WX037-4.

Step 5: Synthesis of Compound WX037-5

WX037-4 (1.0 g, 2.2 mmol), B19 (486.8 mg, 2.9 mmol), potassium phosphate (1.4 g, 6.6 mmol) [methanesulfonic acid (2-dicyclohexylphosphine)-3,6-dimethoxy-2,4,6-triisopropyl-1,1-biphenyl)(2-amino-1,1-biphenyl-2-yl) palladium (II) (299.6 mg, 330.5 μmol), tetrahydrofuran (10.0 mL) and water (3.0 mL) were added to a reaction flask, then the mixture was replaced with nitrogen three times, and stirred at 80° C. for 12 hours. Then the mixture was filtered, and the filtrate was collected, then concentrated to dryness under reduced pressure. The crude product was purified by column chromatography (dichloromethane:methanol=100: 0-10:1) to obtain WX037-5.

Step 6: Synthesis of Compound WX037

WX037-5 (0.05 g, 92.9 μmol), sodium hydroxide (2 M, 919.9 μL), methanol (5.0 mL) were added to a reaction flask, and the mixture was replaced with nitrogen three times, then stirred at 25° C. for 2 hours. Methanol was concentrated to dryness under reduced pressure, then the pH was adjusted to 7 with 2N hydrochloric acid, and then the mixture was concentrated to dryness under reduced pressure. Then the crude product was purified by machine purification (column: Phenomenex Gemini NX-C18 (75*30 mm*3 μm); mobile phase: [aqueous solution containing (10.0 mM) $NH_4HCO_3$)-acetonitrile]; gradient: B %: 15%-40%, 8 min) to obtain WX037.

$^1$H NMR (400 MHz, DMSO-$d_6$) δ=11.5 (s, 1H), 9.21 (s, 1H), 9.02 (s, 1H), 8.98 (s, 1H), 8.70-8.69 (d, J=4.0 Hz, 1H), 7.90 (s, 1H), 7.65-7.58 (m, 3H), 7.49 (s, 1H), 7.17-7.15 (d, J=8.0 Hz, 1H), 7.09-7.04 (t, 1H), 3.80 (s, 3H), 2.97-2.93 (t, 2H), 2.69-2.65 (t, 2H), 2.61 (s, 3H).

LCMS (ESI) m/z: 516.1[M+H]$^+$.

Each of the embodiments in the following Table 6 was synthesized with reference to the synthesis step of embodiment 37, except that the B-19 in step 5 was replaced with Fragment 1.

TABLE 6

| Embodiments | Fragment 1 | Compound | Product structure | NMR | MS m/z [M + H]$^+$ |
|---|---|---|---|---|---|
| 38 | B16 | WX038 | 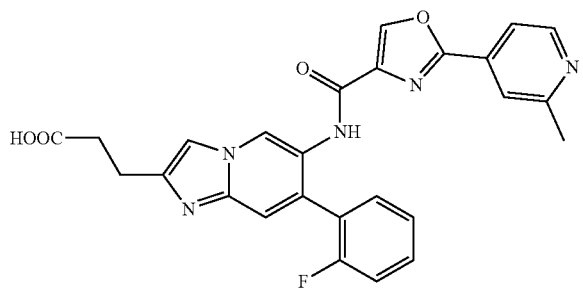 | $^1$H NMR (400 MHz, DMSO-$d_6$) δ = 12.19-11.96 (m, 1H), 9.48 (s, 1H) 9.02 (s, 1H), 8.91 (s, 1H), 8.67 (s, 1H), 7.88 (s, 1H), 7.69-7.62 (m, 1H), 7.55-7.51 (m, 1H), 7.39-7.37 (m, 2H), 7.35 (s, 2H), 2.99-2.95 (m, 2H), 2.70-2.66 (m, 2H), 2.60 (s, 3H) 2.33 (s, 1H). | 486.3 |
| 39 | B10 | WX039 | 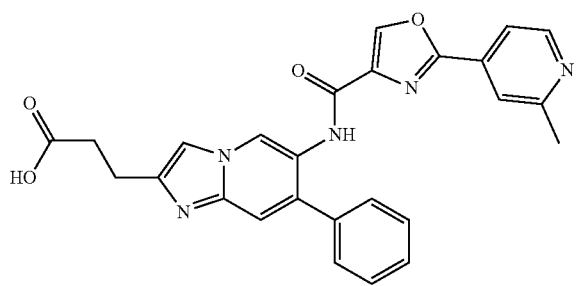 | $^1$H NMR (400 MHz, DMSO-$d_6$) = 11.5 (s, 1H), 9.71 (s, 1H), 9.00 (s, 1H), 8.92 (s, 1H), 8.68-8.67 (d, J = 4.0 Hz, 1H), 7.82 (s, 1H), 7.72 (s, 1H), 7.66-7.64 (m, 1H), 7.56-7.46 (m, 6H), 2.96-2.93 (m, 2H), 2.68-2.64 (m, 2H), 2.59 (s, 3H). | 468.1 |

Embodiment 40: Synthesis of Compound WX040

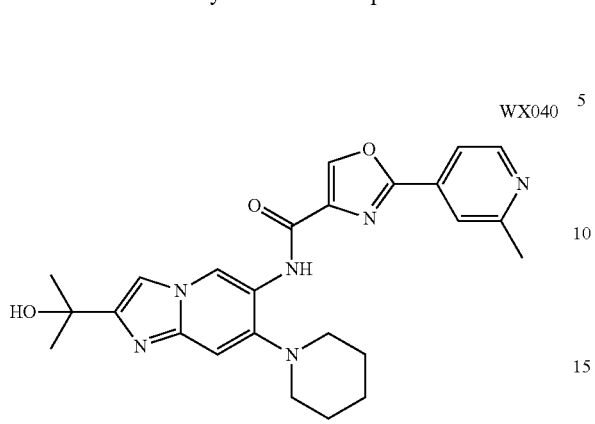

Synthetic Route:

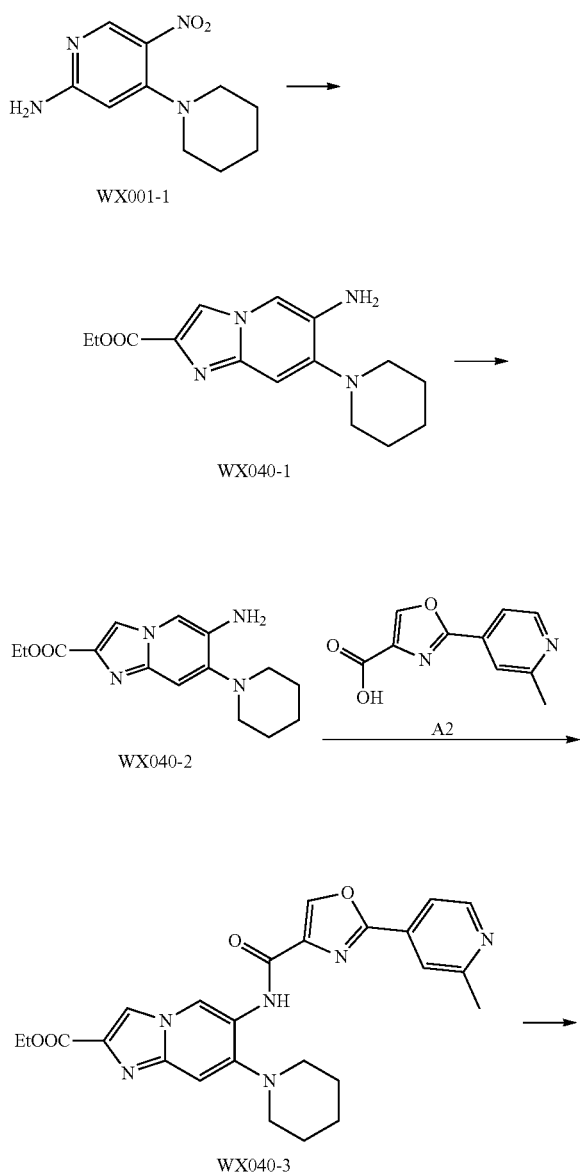

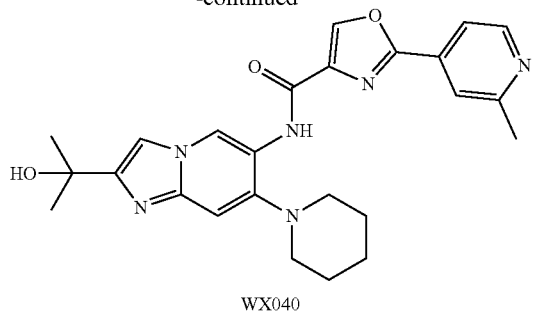

Step 1: Synthesis of Compound WX040-1

WX001-1 (5.4 g, 24.3 mmol) was added to a flask containing ethyl bromopyruvate (47.4 g, 243.0 mmol, 30.4 mL) and the reaction mixture was stirred at 90° C. for 12 hours. The reaction mixture was poured into ethyl acetate (150.0 mL) while hot, then stirred at 15° C. for 15 minutes, filtered under suction, and the filter cake was rinsed with ethyl acetate (20.0 mL×3), and concentrated to dryness under reduced pressure to obtain WX040-1.

Step 2: Synthesis of Compound WX040-2

Raney nickel (942.0 mg) was added to an argon-protected hydrogenation flask, then the flask was wetted with ethanol (30.0 mL), and WX040-1 (1.0 g, 3.1 mmol) was added to the reaction system; the mixture was stirred at 25° C. for 2 hours under 50 Psi hydrogen. The reaction mixture was filtered through celite under suction, and the filtrate was concentrated to dryness under reduced pressure to obtain WX040-2.

Step 3: Synthesis of Compound WX040-3

WX040-2 (200 mg, 693.6 µmol), A2 (170.0 mg, 832.34 µmol), O-(7-azabenzotriazol-1-yl)-N,N,N,N-tetramethyluronium hexafluorophosphate (395.6 mg, 1.0 mmol), N,N-diisopropylethylamine (268.9 mg, 2.1 mmol, 362.4 µL) were added to a flask containing anhydrous dichloromethane (15.0 mL), and the reaction mixture was stirred at 25° C. for 2 hours. The reaction mixture was poured into saturated ammonium chloride solution (20.0 mL); the phases were separated, and the organic phase was dried, filtered and concentrated under reduced pressure. The crude product was eluted by column separation (petroleum ether to petroleum ether:ethyl acetate=1:1 to pure ethyl acetate) to obtain WX040-3.

Step 4: Synthesis of Compound WX040

Methyl magnesium chloride (3.0 mol/L, 4.2 mL) was added to a flask containing anhydrous tetrahydrofuran (15.0 mL) under nitrogen protection, and WX040-3 (100 mg, 210.7 µmol) dissolved in anhydrous tetrahydrofuran (9.0 mL) was added dropwise to the above solution at 20° C., and the reaction was stirred at 20° C. for 0.5 hours. The reaction mixture was quenched by pouring into saturated ammonium chloride solution (20.0 mL), and the mixture was extracted with ethyl acetate (10.0 mL×4); the organic phases were dried, filtered and concentrated under reduced pressure. The crude product was purified by plate separation (ethyl acetate: methanol=10:1) to obtain WX040.

$^1$H NMR (400 MHz, CD$_3$OD-d$_4$) δ=9.41 (s, 1H), 8.75 (s, 1H), 8.66 (d, J=5.2 Hz 1H), 7.99 (s, 1H), 7.90 (d, J=5.6 Hz 1H), 7.66 (s, 1H), 7.20 (s, 1H), 3.15-2.99 (m, 4H), 2.67 (s, 3H), 3.11-1.98 (m, 4H), 1.85-1.64 (m, 2H), 1.62 (s, 6H).

LCMS (ESI) m/z: 461.3 [M+H]$^+$.

Each of the embodiments in the following Table 7 was synthesized with reference to the synthesis step of embodiment 21 and embodiment 40, except that the piperidine at the bottom right was replaced with Fragment 1.

TABLE 7

| Embodiments | Fragment 1 | Compound | Product structure | NMR | MS m/z [M + H]+ |
|---|---|---|---|---|---|
| 41 | B25 | WX041 | 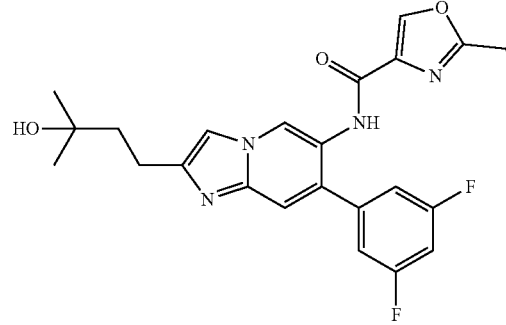 | $^1$H NMR (400 MHz, DMSO-$d_6$) = 10.03 (s, 1H), 8.94 (s, 1H), 8.70 (s, 1H), 8.69 (s, 1H), 7.86 (s, 1H), 7.81 (m, 1H), 7.73-7.72 (s, 1H), 7.62 (s, 1H), 7.34-7.30 (m, 3H), 5.15 (s, 1H), 2.60 (s, 3H), 1.51 (s, 6H). | 490.1 |

Embodiment 42: Synthesis of Compound WX042

Synthetic Route:

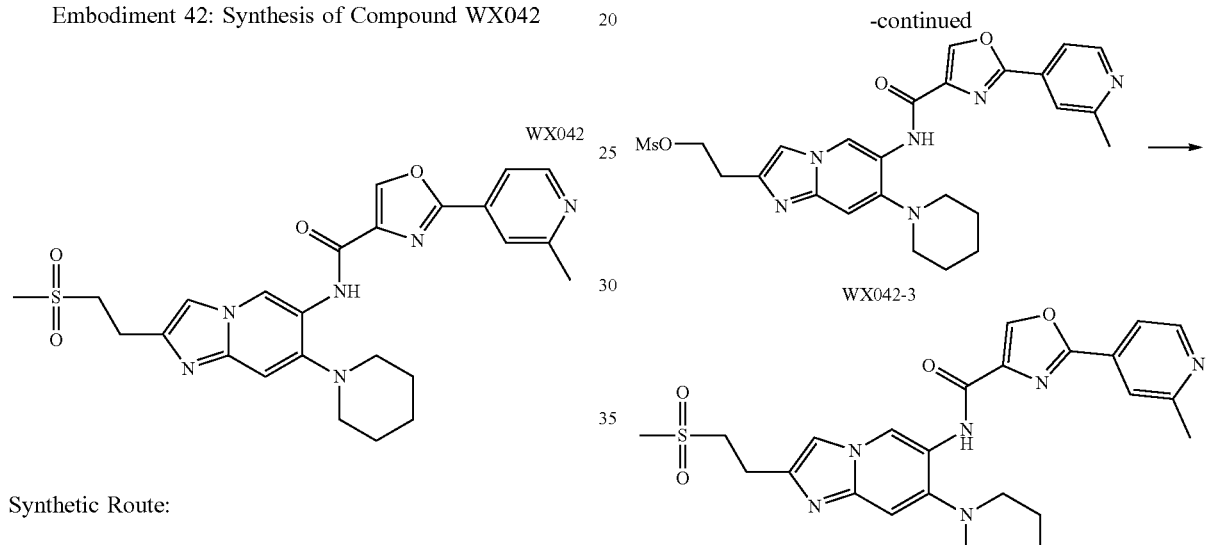

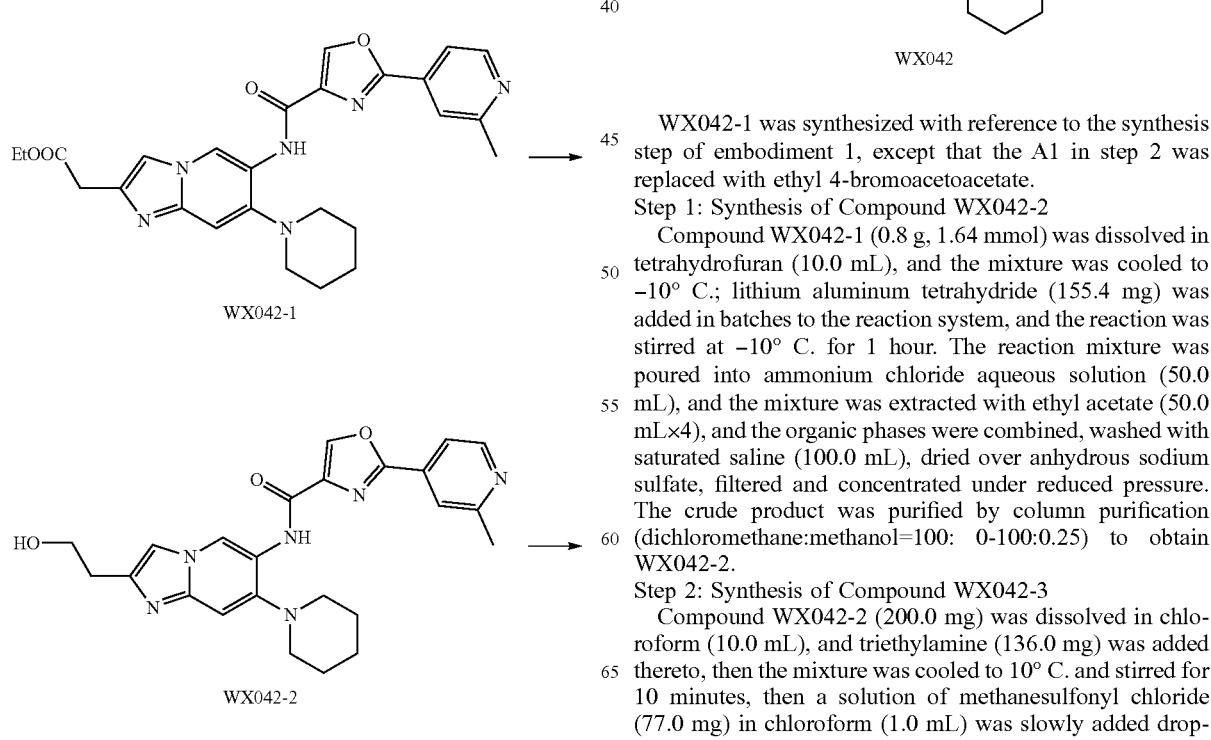

WX042-1 was synthesized with reference to the synthesis step of embodiment 1, except that the A1 in step 2 was replaced with ethyl 4-bromoacetoacetate.

Step 1: Synthesis of Compound WX042-2

Compound WX042-1 (0.8 g, 1.64 mmol) was dissolved in tetrahydrofuran (10.0 mL), and the mixture was cooled to −10° C.; lithium aluminum tetrahydride (155.4 mg) was added in batches to the reaction system, and the reaction was stirred at −10° C. for 1 hour. The reaction mixture was poured into ammonium chloride aqueous solution (50.0 mL), and the mixture was extracted with ethyl acetate (50.0 mL×4), and the organic phases were combined, washed with saturated saline (100.0 mL), dried over anhydrous sodium sulfate, filtered and concentrated under reduced pressure. The crude product was purified by column purification (dichloromethane:methanol=100: 0-100:0.25) to obtain WX042-2.

Step 2: Synthesis of Compound WX042-3

Compound WX042-2 (200.0 mg) was dissolved in chloroform (10.0 mL), and triethylamine (136.0 mg) was added thereto, then the mixture was cooled to 10° C. and stirred for 10 minutes, then a solution of methanesulfonyl chloride (77.0 mg) in chloroform (1.0 mL) was slowly added dropwise. The reaction was slowly heated to 25° C. and stirred for 20 minutes. The reaction mixture was concentrated under reduced pressure to obtain WX042-3.
Step 3: Synthesis of Compound WX042

Compound WX042-3 (0.2 g) and sodium methylsulfinate (70.1 mg, 686.3 µmol) were dissolved in N,N-dimethylformamide (10.0 mL), and potassium iodide (189.8 mg) was added thereto. The reaction was carried out at 80° C. (0 bar) for 1 hour in microwave instrument. The reaction mixture was diluted with 10.0 mL of ethyl acetate, then the mixture was poured into semi-saturated saline (50.0 mL); the phases were separated, and the aqueous phase was extracted with ethyl acetate (50.0 mL×4), and the organic phases were combined, dried over anhydrous sodium sulfate, filtered and concentrated under reduced pressure. Then the crude product was purified by machine purification (column: Welch Xtimate BEH C18 100*30 mm*10 µm; phase: A: aqueous solution containing 10 mM $NH_4HCO_3$, B: acetonitrile; gradient: B %: 30%-50%, 6 minutes) and freeze-dried to obtain WX042.

$^1$H NMR (400 MHz, DMSO-$d_6$) δ=9.87 (s, 1H), 9.35 (s, 1H), 9.09 (s, 1H), 8.71 (s, 1H), 7.83 (s, 2H), 7.73 (s, 1H), 7.23 (s, 1H), 3.48-3.46 (m, 2H), 3.44 (s, 2H), 3.09-2.99 (m, 3H), 2.91-2.90 (m, 4H), 2.60-2.58 (m, 3H), 1.87-1.86 (m, 4H), 1.67 (s, 2H)

LCMS (ESI) m/z: 509.1 [M+H]$^+$.

Each of the embodiments in the following Table 8 was synthesized with reference to the synthesis step of embodiment 42, except that the piperidine at the bottom right was replaced with Fragment 1.

(Echo 550). After incubation for 15 minutes, $^{33}$P-ATP was added to initiate the reaction. The reaction was carried out at room temperature for 120 minutes, and the reaction mixture was spotted on P81 ion exchange filter paper (Whatman #3698-915). The filter paper was washed repeatedly with 0.75% phosphoric acid solution, and the radioactivity of phosphorylated substrate residues on the filter paper was determined. The kinase activity data were expressed by comparing the kinase activity of the group containing the tested compound with the kinase activity of the blank group (only containing DMSO), and the $IC_{50}$ value was obtained by curve fitting by Prism4 software (GraphPad), and the experimental results are shown in Table 9.

TABLE 9

In vitro IRAK4 kinase activity screening test results of the compounds of the present disclosure

| Number of the compound | IRAK4/$IC_{50}$ (nM) |
|---|---|
| WX001 | 1.0 |
| WX002 | 1.2 |
| WX003 | 2.2 |
| WX004 | 1.3 |
| WX005 | 1.1 |
| WX006 | 1.2 |
| WX007 | 2.0 |
| WX008 | 2.1 |
| WX009 | 0.7 |

TABLE 8

| Embodiments | Fragment 1 | Compound | Product structure | NMR | MS m/z [M + H]$^+$ |
|---|---|---|---|---|---|
| 43 | B25 | WX043 | | $^1$H NMR (400 MHz, DMSO-$d_6$) δ = 9.96 (s, 1H), 8.91 (s, 2H), 8.67 (d, J = 5.2 Hz 1H), 7.93 (s, 1H), 7.78 (s, 1H), 7.69 (d, J = 4.0 Hz 1H), 7.61 (s, 1H), 7.33-7.29 (m, 3H), 3.55-3.48 (m, 2H), 3.20-3.15 (m, 2H), 3.01 (s, 3H), 2.61 (s, 3H). | 538.1 |

Test Embodiment 1: Evaluation of IRAK4 Kinase Activity In Vitro

The $IC_{50}$ values were determined using $^{33}$P isotope-labeled kinase activity assay (Reaction Biology Corp) to evaluate the inhibitory ability of the tested compounds on human IRAK4.

Buffer conditions: 20 mM Hepes (pH 7.5), 10 mM $MgCl_2$, 1 mM EGTA, 0.02% Brij35, 0.02 mg/mL BSA, 0.1 mM $Na_3VO_4$, 2 mM DTT, 1% DMSO.

Test procedure: At room temperature, the tested compound was dissolved in DMSO to prepare a 10 mM solution for later use. The substrate was dissolved in a newly prepared buffer solution, and the tested IRAK4 kinase was added thereto and mixed evenly. The DMSO solution dissolved with the tested compound was added to the above reaction mixture mixed evenly using acoustic technique TABLE 9-continued In vitro IRAK4 kinase activity screening test results of the compounds of the present disclosure

| Number of the compound | IRAK4/$IC_{50}$ (nM) |
|---|---|
| WX010 | 2.4 |
| WX011 | 1.5 |
| WX012 | 1.0 |
| WX013 | 0.2 |
| WX014 | 0.9 |
| WX015 | 0.4 |
| WX016 | 0.9 |
| WX017 | 1.6 |
| WX018 | 0.9 |
| WX020 | 0.5 |
| WX021 | 0.5 |

TABLE 9-continued

In vitro IRAK4 kinase activity screening test results of the compounds of the present disclosure

| Number of the compound | IRAK4/IC$_{50}$ (nM) |
|---|---|
| WX022 | 0.7 |
| WX023 | 8.4 |
| WX024 | 0.7 |
| WX025 | 0.7 |
| WX027 | 11 |
| WX033 | 1.6 |
| WX039 | 1 |
| WX040 | 1.2 |
| WX044 | 1.9 |
| WX045 | 3.4 |
| WX046 | 2.5 |

Conclusion: The compound of the present disclosure generally exhibits good inhibitory activity against IRAK4.

Test Embodiment 2: Evaluation of BTK Kinase Activity In Vitro

The IC$_{50}$ values were determined using $^{33}$P isotope-labeled kinase activity assay (Reaction Biology Corp) to evaluate the inhibitory ability of the tested compounds on human BTK.

Buffer conditions: 20 mM Hepes (pH 7.5), 10 mM MgCl$_2$, 1 mM EGTA, 0.02% Brij35, 0.02 mg/mL BSA, 0.1 mM Na$_3$VO$_4$, 2 mM DTT, 1% DMSO.

Test procedure: At room temperature, the tested compound was dissolved in DMSO to prepare a 10 mM solution for later use. The substrate was dissolved in a newly prepared buffer solution, and the tested BTK kinase was added thereto and mixed evenly. The compound dissolved in DMSO was added to the kinase reaction mixture through Echo 550 (Acoustic technology; Nanoliter range). After incubation for 20 minutes at room temperature, $^{33}$P-ATP was added to initiate the reaction. The reaction was carried out at room temperature for 2 hours, and the radioactivity of the reaction liquid point was detected by filtration-binding method with P81 ion exchange filter paper. The kinase activity data were expressed by comparing the kinase activity of the group containing the tested compound with the kinase activity of the blank group (only containing DMSO), and the IC$_{50}$ value was obtained by curve fitting by Prism4 software (GraphPad), the experimental results are shown in Table 10.

TABLE 10

In vitro BTK kinase activity screening test results of the compoundsof the present disclosure

| Number of the compound | BTK/IC$_{50}$ (nM) |
|---|---|
| WX001 | 6.7 |
| WX006 | 47.5 |
| WX008 | 4.6 |
| WX009 | 46 |
| WX011 | 23.6 |
| WX012 | 6.9 |
| WX013 | 1.4 |
| WX014 | 25.7 |
| WX015 | 6.4 |
| WX016 | 8.9 |
| WX018 | 47.5 |
| WX020 | 8.5 |
| WX021 | 13.9 |
| WX022 | 43.1 |
| WX024 | 30.5 |
| WX025 | 21.8 |
| WX026 | 30.7 |
| WX029 | 24.2 |
| WX031 | 39.6 |
| WX032 | 26.5 |
| WX033 | 20.2 |
| WX039 | 29 |
| WX040 | 3.3 |
| WX042 | 3.8 |
| WX045 | 28.6 |
| WX046 | 43.1 |

Conclusion: The compound of the present disclosure generally exhibits good inhibitory activity against BTK.

Test Embodiment 3: Evaluation of THP-1 Cytological Activity In Vitro

THP-1 Cytological TNFa ELISA Assay

1. Experimental Materials:

THP-1 human acute single cell leukemia cells were purchased from ATCC (Cat #TIB-202) and cultured at 37° C. in 5% CO$_2$ incubator. The composition of medium was RPMI1640 (Gibco, Cat #22400-105), and the supplementary compositions were 10% FBS (Gibco, Cat #10091148); 1% PenStrep (Gibco, Cat #15140); 0.05 mM 2-Mercaptoethanol (Sigma, Cat #M6250).

2. Experimental Methods:

TNF-α Elisa kit was used to detect the content of TNF-α in cell culture supernatant samples. TNF-α was produced by stimulating THP-1 cells with 150 ng/mL LPS (Sigma, Cat #L6529).

THP-1 cells cultured normally at logarithmic growth stage were seeded in a 96-well plate (Corning #3599) at a certain concentration (1*10$^5$/100 μL) and then put into a cell incubator for incubation. After two hours, 16.7 μL of different concentrations of the compound to be tested (8*final concentration) were added and incubated in an incubator. After one hour, 16.7 μL of 1200 ng/mL LPS was added and incubated in an incubator. After 18 hours, the culture supernatant samples were collected by centrifugation, and the content of TNF-α could be detected by TNF-α Elisa kit. Finally, OD signals (OD450-OD570) were read on envision board reader.

3. Data Analysis:

The OD450-OD570 signal value was converted into a percentage inhibition rate.

Inhibition rate %=(ZPE−sample)/(ZPE−HPE)*100.

"HPE" refers to the OD450-OD570 signal value of the control well without LPS stimulated cells, and "ZPE" refers to the OD450-OD570 signal value of the control well with LPS stimulated cells. The IC$_{50}$ value of the compound was calculated by XLFit in the excel add-in.

$Y$=Bottom+(Top−Bottom)/(1+(IC$_{50}$/$X$)^HillSlope).  Equation:

A summary of the test results is shown in Table 11.

TABLE 11

In vitro screening test results of the compounds of the present disclosure

| Number of the compound | THP-1/IC$_{50}$ (nM) |
|---|---|
| WX001 | 124 |
| WX003 | 557 |
| WX004 | 77 |
| WX005 | 256 |
| WX006 | 107 |
| WX007 | 240 |
| WX010 | 332 |
| WX011 | 140 |
| WX016 | 170 |
| WX017 | 321 |
| WX018 | 104 |
| WX021 | 15 |
| WX024 | 13 |
| WX025 | 21 |
| WX040 | 38 |

Conclusion: The compound of the present disclosure generally exhibits better activity of inhibiting cell TNF-α generation in THP-1 cell activity experiment.

Test Embodiment 4: Evaluation of OCI-LY10 and TMD-8 Cytological Activity In Vitro 1. Experimental Materials:

OCI-LY10 human B-cell lymphoma cells were cultured in a 37° C., 5% CO$_2$ incubator. The composition of medium was IMDM (GIBCO, Cat #12440053); the supplementary compositions were 20% FBS (Hyclone, Cat #SH30084.03); 1% PenStrep (Thermo, Cat #SV30010).

TMD8 human B-cell lymphoma cells were cultured in a 37° C., 5% CO$_2$ incubator. The composition of medium was RPMI1640 (GIBCO, Cat #22400-089); the supplementary compositions were 10% FBS (Hyclone, Cat #SH30084.03); 1% PenStrep (Thermo, Cat #SV30010).

2. Experimental Methods:

The tumor cell lines OCI-LY10 and TMD8 were used to detect the effect of the compound on inhibiting tumor cell proliferation in vitro. The tumor cell line was cultured in a 37° C., 5% CO$_2$ incubator according to the culture conditions shown, and passaged regularly, then the cells in the logarithmic growth phase were taken, counted, and spread in a 96-well plate (the cells in each well were adjusted to an appropriate concentration, a total of 90 cell suspensions per well was added). After incubating overnight in a 37° C., 5% CO$_2$ incubator, drugs with different concentration gradients (10 μL of drug solution was added) were added and treated for 3 days, then 50 μL of CellTiter-Glo working solution was added to each well, and the cell plate was wrapped with aluminum foil to avoid light. The culture plate was shaken on an orbital shaker for 2 minutes to induce cell lysis, and placed at room temperature for 10 minutes to stabilize the luminescence signal, then the luminescence signal was detected on the 2104 EnVision plate reader.

3. Data Analysis:

The Inhibition rate (IR) of the tested compound was calculated using the following formula:

IR (%)=(1−(RLU compound−RLU blank control)/(RLU solvent control−RLU blank control))*100%.

The inhibition rates of different concentrations of the compounds were calculated in Excel, and then the inhibition curves were made by GraphPad Prism software and the related parameters were calculated, including the minimum inhibition rate, the maximum inhibition rate and IC$_{50}$.

4. Experimental Results

Experimental results are shown in Table 12:

TABLE 12

In vitro screening test results of the compounds of the present disclosure

| Number of the compound | OCI-LY10/IC$_{50}$ (nM) | TMD-8/IC$_{50}$ (nM) |
|---|---|---|
| WX001 | 128 | 300 |
| WX016 | 466 | 221 |
| WX021 | 171 | 215 |
| WX024 | 208 | / |
| WX025 | 94 | / |
| WX026 | 349 | / |
| WX029 | 289 | / |
| WX030 | 209 | / |
| WX031 | 96 | / |
| WX032 | 386 | / |
| WX040 | 87 | / |
| WX045 | 77 | / |

Conclusion: The compounds of the present disclosure generally exhibit good inhibitory activity on cell proliferation in OCI-LY10 and TMD-8 cell lines, respectively.

Note: "/" means not detected.

Test Embodiment 5: Evaluation of OCI-LY3 Cytological Activity In Vitro

1. Experimental Cell Line Information and Cell Culture

The tumor cell line used in this experiment was provided by Nanjing Cobioer Biotechnology Co., Ltd. See Table 13 below for specific information.

TABLE 13

Experimental cell line information

| Cell name | Cell source | Cell culture medium |
|---|---|---|
| OCI-LY3 | Nanjing Cobioer Biotechnology Co., Ltd | IMDM+20% FBS+0.05 1 mM 2-mercaptoethano +1% penicillin/streptomycin |

2. Experimental Methods:

The tumor cell lines OCI-LY3 were used to detect the effect of the compound on inhibiting tumor cell proliferation in vitro. The OCI-LY3 cell line was cultured in the corresponding medium at 37° C. and 5% CO$_2$, and the logarithmic growth phase cells were used in the experimental plating. The cells were collected and centrifuged at 800 rpm for 5 minutes, and the culture medium was re-suspended and spread in a 96-well plate. After incubating overnight in a 37° C., 5% CO$_2$ incubator, the cells with different concentration gradients (10 μL of prepared diluent of the tested compound) were incubated for 72 hours, and the cell culture plates were incubated with CTG reagent at room temperature and away from light for 30 minutes, and then recovered to room temperature. 100 μL/hole of CTG solution was added into the biosafety cabinet away from light, and the plate shaker was shaken and mixed evenly away from light for 2 minutes, and incubated at room temperature away from light for 10 minutes. The luminescence values were read and recorded using the Perkin Elmer Envision 2104 MuLtilabel Reader.

3. Data Processing and Analysis

The results of luminescence values measured at each drug concentration were normalized with the luminescence values of the blank control group, and the ratio of this value to the DMSO group was taken as the cell inhibition rate (%). Using GraphPad software, the logarithm of drug concentration (log drug concentration) versus inhibition rate was plotted, and the software automatically fitted and calculated $IC_{50}$ value and 95% confidence limit value by log (inhibitor) vs. normalized response algorithm of nonlinear regression.

4. Experimental Results

Experimental results are shown in Table 14.

TABLE 14

In vitro screening test results of the compounds of the present disclosure

| Number of the compound | OCI-LY3/ $IC_{50}$ (uM) |
|---|---|
| WX001 | 1.292 |
| WX040 | 0.283 |
| WX045 | 0.270 |

Conclusion: The compound of the disclosure has a significant inhibition effect on cell proliferation in OCI-LY3 cell line.

Test Embodiment 6: In Vivo Pharmacodynamic Study of TNF-α Secretion in SD Rats Induced by Lipopolycollagen (LPS)

1. Modeling and Administration

SD rats were orally given the solvent, the positive drug dexamethasone (DEX, 0.5 mg/kg) and the tested compound, and LPS (1 mg/kg) was intraperitoneally injected 0.5 hours after the administration. Two hours after LPS injection, the animals were euthanized by $CO_2$, and blood samples were collected from the heart and placed in an anticoagulant tube containing EDTA-$K_2$, then partial anticoagulated blood was centrifuged to separate the plasma and the plasma was frozen at −80° C.

2. TNF-α Detection

The plasma was taken out of the refrigerator at −80° C., thawed at room temperature, and the concentration of TNF-α in the plasma was detected according to the ELISA kit instructions.

3. Statistical Processing

The experimental data were expressed by Mean±standard error (Mean±SEM), and the level of TNF-α was expressed by One-way ANOVA, and p<0.05 was considered as a significant difference. The result of in vivo pharmacodynamic study of TNF-α secretion in SD rats induced by lipopolycollagen (LPS) are shown in FIG. 1

4. Experimental Results

The results in FIG. 1 show that the SD rat orally administrated compound WX001 showed a significant inhibitory effect on TNF-α secretion induced by lipopolycollagen (LPS), and the efficacy at a dose of 20 mpk was equivalent to the efficacy of dexamethasone (DEX) at a dose of 0.5 mpk.

Test Embodiment 7: In Vivo Pharmacodynamic Study of WX001 on Human B-Cell Lymphoma OCI-LY10 Cell Subcutaneous Xenograft Tumor Mouse Model 1. Experimental Objectives The objective of the experiment was to study the efficacy of WX001 as the test drug on human B-cell lymphoma OCI-LY10 cell subcutaneous xenograft tumor in CB17 SCID mouse model.

2. Experimental Materials

OCI-LY10 human B-cell lymphoma cells were cultured in a 37° C., 5% $CO_2$ incubator. The composition of medium was IMDM (GIBCO, Cat #12440053); the supplementary compositions were 20% FBS (Hyclone, Cat #SH30084.03); 1% PenStrep (Thermo, Cat #SV30010).

3. Experimental Methods

OCI-LY10 tumor cells were cultured and passaged, and 0.2 mL (1×10$^7$ cells) OCI-LY10 cells were subcutaneously inoculated on the right back of each nude mouse (with Matrigel, volume ratio 1:1), and the group administration was started when the average tumor volume reached 167 mm$^3$. The health status and death of animals were monitored every day, and routine examinations included observing the effects of tumor growth and drug treatment on daily behaviors of animals, such as behavioral activities, food intake and water intake, weight change (weight was measured twice a week), tumor size (tumor volume was measured twice a week), appearance signs or other abnormal conditions.

4. Data Analysis

The experimental index was to investigate whether the tumor growth was inhibited, delayed or cured. Including the measurement of tumor volume (TV), and the calculation of the compound's anti-tumor efficacy using TGI (%) or the relative tumor proliferation rate T/C (%).

TV=0.5a×b$^2$, a and b represented the long diameter and short diameter of the tumor, respectively.

TGI (%)=(1−(average tumor volume at the end of administration in a treatment group−average tumor volume at the beginning of administration in the treatment group))/(average tumor volume at the end of treatment in solvent control group−average tumor volume at the beginning of treatment in solvent control group))×100%.

T/C %=$T_{RTV}$/$C_{RTV}$×100% ($T_{RTV}$: RTV in treatment group; $C_{RTV}$: RTV in negative control group). Relative tumor volume (RTV) was calculated according to the results of tumor measurement, and the calculation formula was RTV=$V_t$/$V_0$, wherein $V_0$ was the average tumor volume measured at the time of group administration (i.e., $d_0$), $V_t$ was the average tumor volume at a certain measurement, and $T_{RTV}$ and $C_{RTV}$ were the data taken at the same day.

5. Experimental Results 5.1. Mortality, Morbidity and Weight Changes

The body weight of experimental animals was used as a reference index for indirect determination of drug toxicity. After 18 days of administration (PG-D1-D18), all mice in the experimental group showed no abnormality and showed good drug tolerance.

Figure 2:
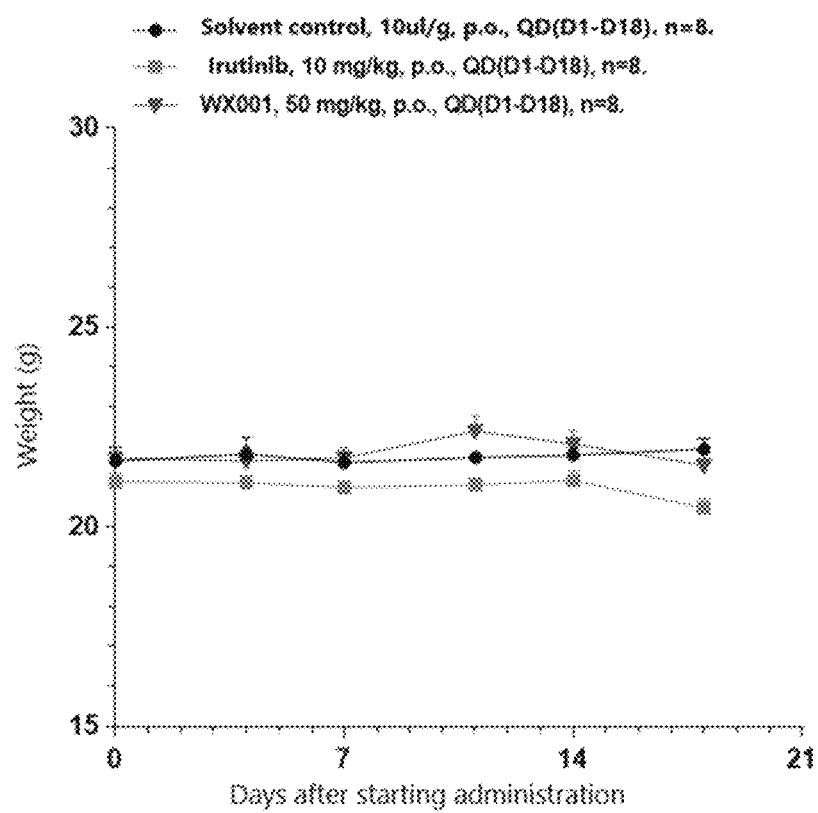
FIG. 2 is a graph showing the weight change of mice in different groups.
Figure 3:
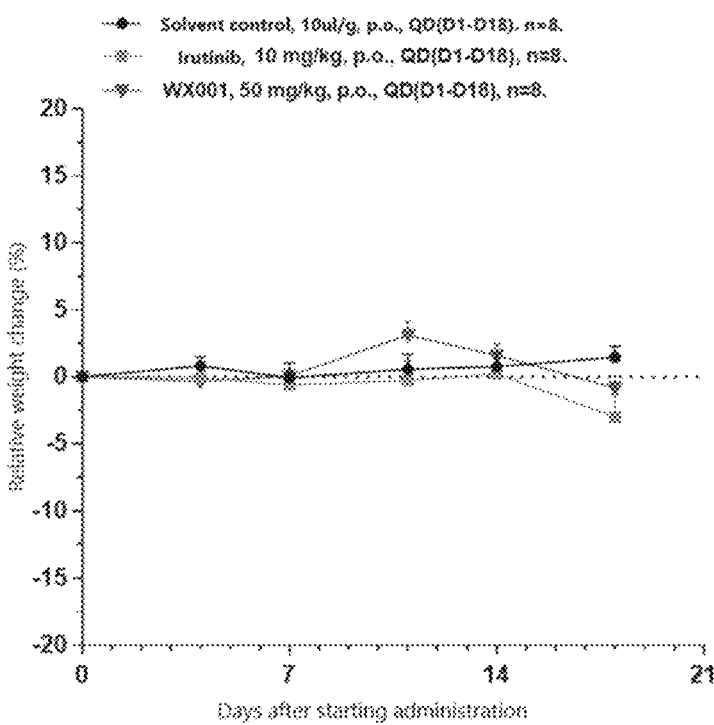
FIG. 3 is a graph of relative weight change (%).

The effect of WX001 compound on the body weight of female CB17 SCID mouse model bearing human B-cell lymphoma OCI-LY10 cell subcutaneous xenograft tumor is shown in FIG. 2 and FIG. 3. FIG. 2 shows the weight changes of mouse model bearing human B-cell lymphoma OCI-LY10 cell subcutaneous xenograft tumor after administration of WX compound. The data points represent the average body weight in the group, and the error lines represent the standard error (SEM). The relative weight change shown in FIG. 3 was calculated based on the animal weight at the beginning of administration. The data points represent the average body weight change percentage in the group, and the error lines represent the standard error (SEM).

5.2. Tumor Growth Curve

Figure 4:
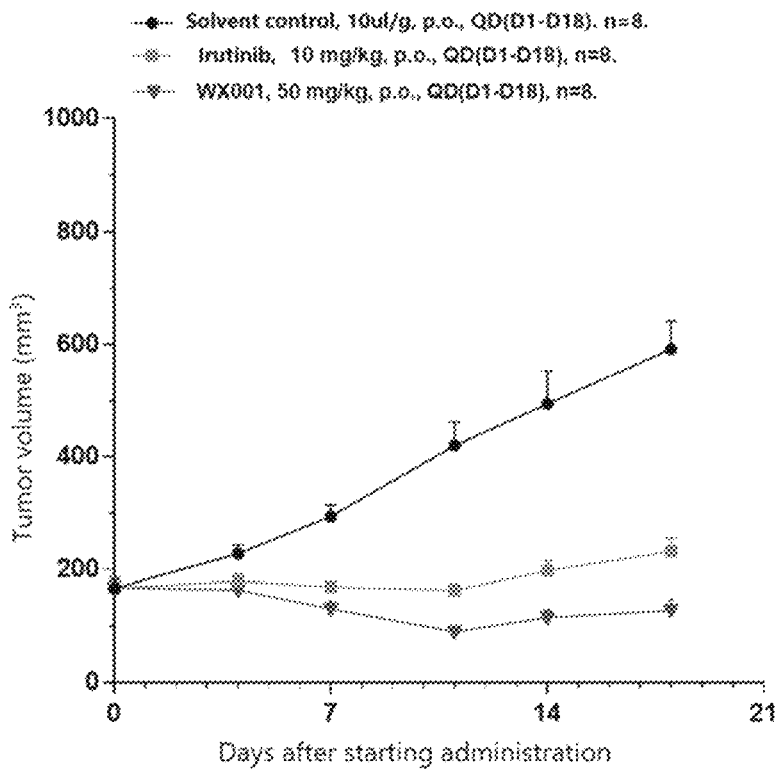
FIG. 4 is a graph of the tumor growth curve.

FIG. 4 shows the tumor growth curve of mouse model bearing human B-cell lymphoma OCI-LY10 cell subcutaneous xenograft tumor after administration of WX001 compound. The data points represent the average tumor volume in the group, and the error lines represent the standard error (SEM).

6. Experimental Results and Discussion

In this study, we evaluated the in vivo efficacy of WX001 compound in human B-cell lymphoma OCI-LY10 cell subcutaneous xenograft tumor model. The tumor volume of each group at different time points is shown in FIG. 4.

18 days after the start of administration, the T/C value of the Ibrutinib (10 mpk) group was 39%, and the TGI value was 85%, and the p value was <0.001. The WX001 (50 mpk) group had a T/C value of 22%, a TGI value of 109%, and p<0.001; compared with the solvent control group, the WX001 (50 mpk) group had a significant anti-tumor effect and was significantly better than the Ibrutinib (10 mpk) group.

The OCI-LY10 cell line is an ABC-DLBCL cell line that is highly dependent on both MyD88-L265P and BCR (CD79A/B) double mutations. IRAK4 and BTK dual-target inhibitor WX001 (50 mpk) shows the significant anti-tumor effect as a single agent (TGI=109%), which is significantly better than the single-agent efficacy of Ibrutinib (10 mpk) (TGI=85%), shows significant simultaneous IRAK4/BTK pathway inhibition, and it is well tolerated by animals.

The invention claimed is:

1. A compound represented by formula (II) or a pharmaceutically acceptable salt thereof,

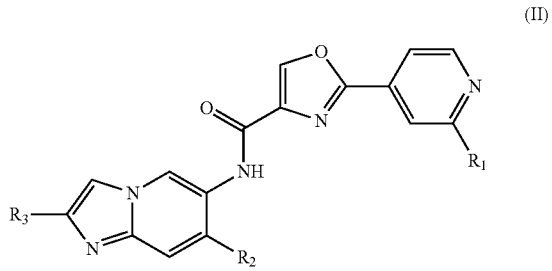

(II)

wherein, $R_1$ is selected from H, F, Cl, Br, I, OH, $NH_2$, CN, $C_{1-6}$ alkyl, cyclopropyl and —C(=O)—$NH_2$, wherein the $C_{1-6}$ alkyl, cyclopropyl and —C(=O)—$NH_2$ are optionally substituted by 1, 2 or 3 $R_a$;

$R_2$ is selected from thienyl, phenyl, pyridyl, cyclopropyl, cyclohexyl and

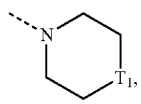

wherein the thienyl, phenyl, pyridyl, cyclopropyl, cyclohexyl and

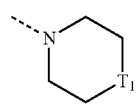

are optionally substituted by 1, 2, 3, 4 or 5 $R_b$;

$T_1$ is selected from $CH_2$, NH and O;

$R_3$ is selected from $C_{1-6}$ alkyl, wherein the $C_{1-6}$ alkyl is optionally substituted by 1, 2 or 3 $R_c$;

$R_a$ is each independently selected from F, OH, $NH_2$ and CN;

$R_b$ is each independently selected from H, D, F, Cl, Br, I, OH, $NH_2$, CN, $C_{1-3}$ alkyl, COOH, —C(=O)—$C_{1-3}$ alkyl, —C(=O)—O—$C_{1-3}$ alkyl and —C(=O)—$NH_2$, wherein the OH, $NH_2$, $C_{1-3}$ alkyl, COOH, —C(=O)—$C_{1-3}$ alkyl, —C(=O)—O—$C_{1-3}$ alkyl and —C(=O)—$NH_2$ are optionally substituted by 1, 2 or 3 R;

$R_c$ is each independently selected from F, OH, $NH_2$, CN, $CH_3$, COOH and —$SO_2CH_3$;

R is each independently selected from F, OH, $NH_2$ and $CH_3$.

2. The compound as defined in claim 1 or the pharmaceutically acceptable salt thereof, wherein, $R_1$ is selected from H, F, Cl, Br, I, OH, $NH_2$, CN, $C_{1-3}$ alkyl, cyclopropyl and —C(=O)—$NH_2$, wherein the $C_{1-3}$ alkyl, cyclopropyl and —C(=O)—$NH_2$ are optionally substituted by 1, 2 or 3 $R_a$.

3. The compound as defined in claim 2, the isomer thereof or the pharmaceutically acceptable salt thereof, wherein, $R_1$ is selected from CN, $CH_3$, $CF_3$,

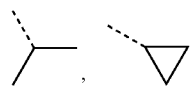

and —C(=O)—$NH_2$.

4. The compound as defined in claim 1 or the pharmaceutically acceptable salt thereof, wherein, $R_b$ is each independently selected from H, D, F, Cl, Br, I, OH, $NH_2$, CN, $CH_3$, $CH_2CH_3$, $CH_2CH_2CH_3$, $CH(CH_3)_2$, COOH,

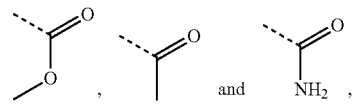

wherein the OH, $NH_2$, $CH_3$, $CH_2CH_3$, $CH_2CH_2CH_3$, $CH(CH_3)_2$,

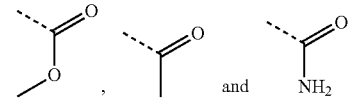

are optionally substituted by 1, 2 or 3 R.

5. The compound as defined in claim 4 or the pharmaceutically acceptable salt thereof, wherein, $R_b$ is each independently selected from H, D, F, Cl, OH, $OCH_3$, CN, $CH_3$, $CH_2OH$, $CH_2NH_2$, COOH,

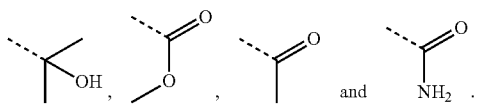

6. The compound as defined in claim 1 or the pharmaceutically acceptable salt thereof, wherein, $R_2$ is selected from thienyl, phenyl, cyclopropyl, cyclohexyl,

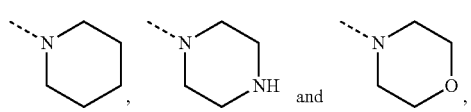

wherein the thienyl, phenyl, cyclopropyl, cyclohexyl,

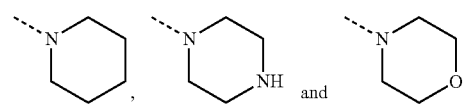

are optionally substituted by 1, 2, 3, 4 or 5 $R_b$.

7. The compound as defined in claim 1 or the pharmaceutically acceptable salt thereof, wherein, $R_2$ is selected from

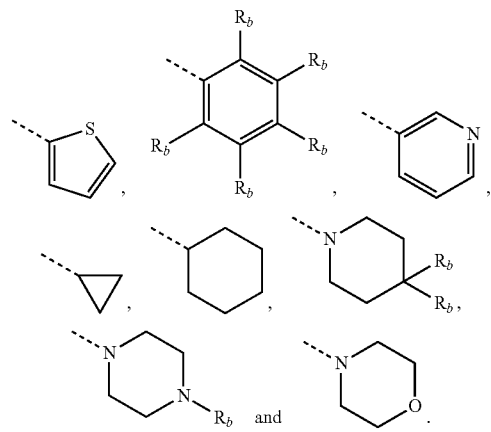

8. The compound as defined in claim 1 or the pharmaceutically acceptable salt thereof, wherein, $R_2$ is selected from

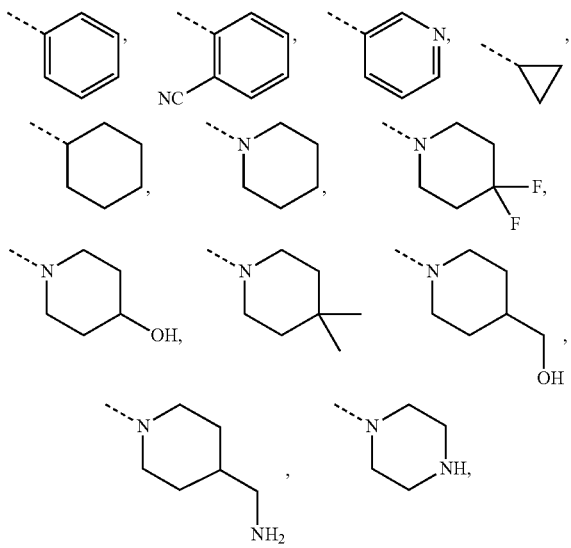

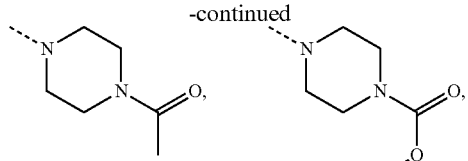

-continued

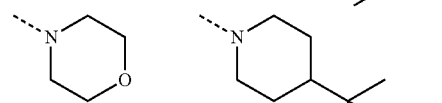

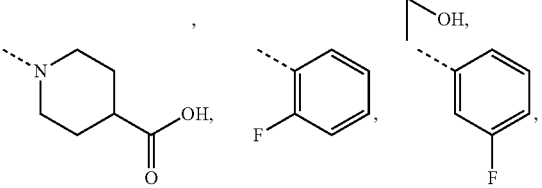

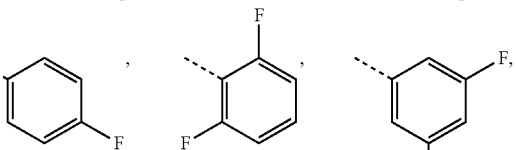

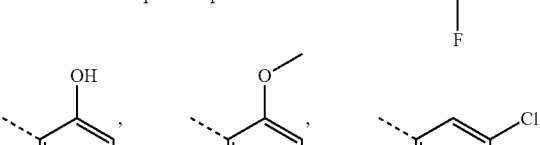

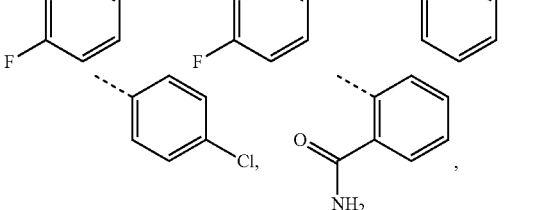

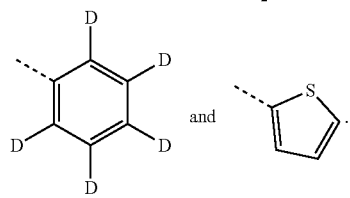

9. The compound as defined in claim 1 or the pharmaceutically acceptable salt thereof, wherein, $R_3$ is selected from $C_{2-5}$ alkyl, wherein the $C_{2-5}$ alkyl is optionally substituted by 1, 2 or 3 $R_c$.

10. The compound as defined in claim 9 or the pharmaceutically acceptable salt thereof, wherein, $R_3$ is selected from $CH_2CH_3$, $CH_2CH_2CH_3$, $CH(CH_3)_2$, $CH_2CH_2CH_2CH_3$, $CH_2CH(CH_3)_2$ and $CH_2CH_2CH(CH_3)_2$, wherein the $CH_2CH_3$, $CH_2CH_2CH_3$, $CH(CH_3)_2$, $CH_2CH_2CH_2CH_3$, $CH_2CH(CH_3)_2$ and $CH_2CH_2CH(CH_3)_2$ are optionally substituted by 1, 2 or 3 $R_c$.

11. The compound as defined in claim 10 or the pharmaceutically acceptable salt thereof, wherein, $R_3$ is selected from

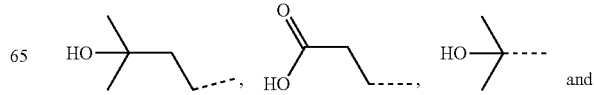

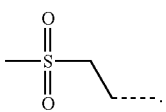
12. The compound as defined in claim 1 or the pharmaceutically acceptable salt thereof, the compound is selected from,
(I-2)
(I-3)
(II-1)
(II-3)
(III-1)
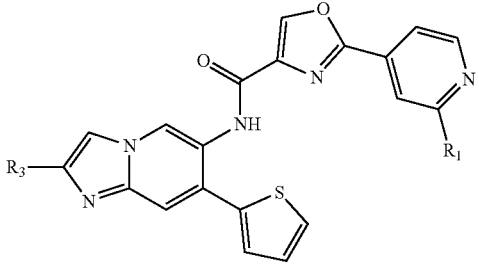
(III-2)
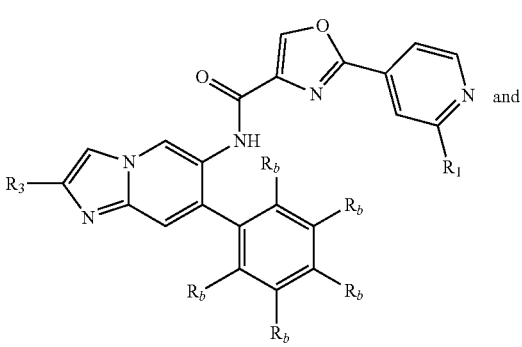
and
(III-3)
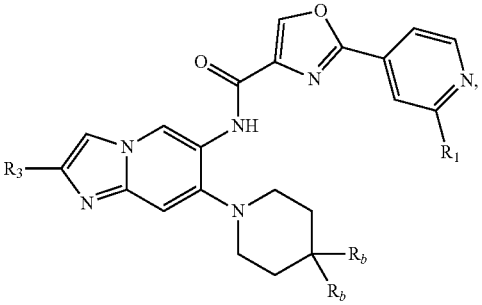
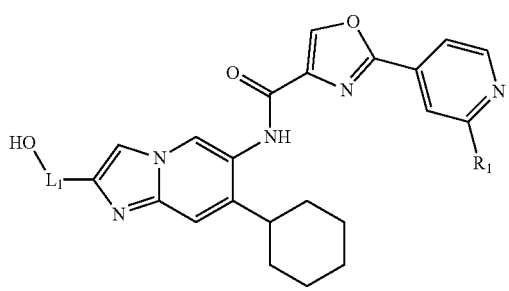
wherein, $L_1$ is selected from $C_{2-5}$ alkyl, and $R_1$, $R_3$ and $R_b$ are as defined in claim 1.
13. A compound represented by the following formula or a pharmaceutically acceptable salt thereof,
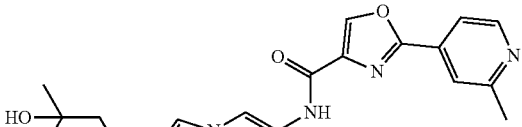
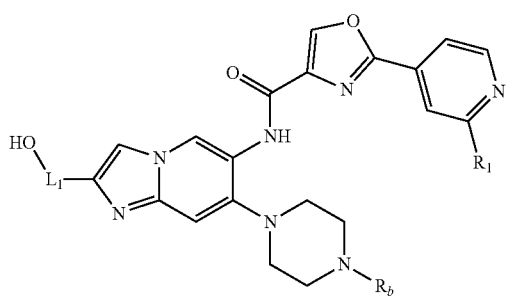
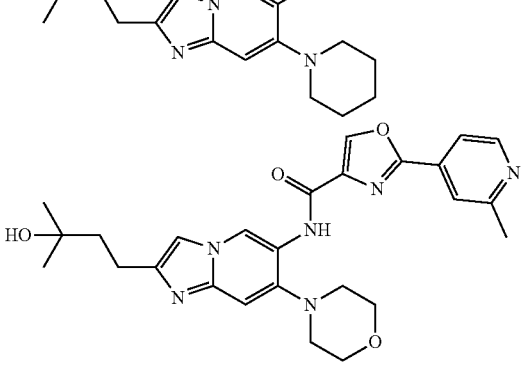

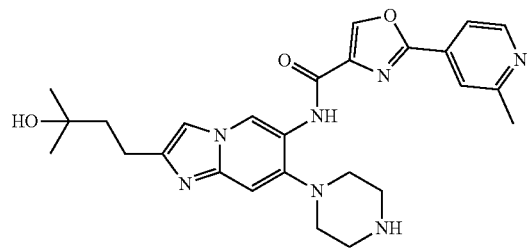 [SMILES: Cc1cc(-c2nc(C(=O)Nc3cn4cc(CCC(C)(C)O)nc4cc3N3CCNCC3)co2)ccn1]
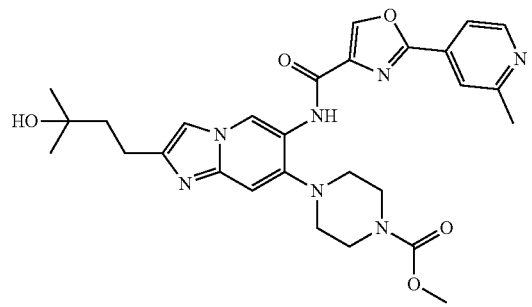 [SMILES: COC(=O)N1CCN(c2cc3nc(CCC(C)(C)O)cn3cc2NC(=O)c2coc(-c3ccnc(C)c3)n2)CC1]
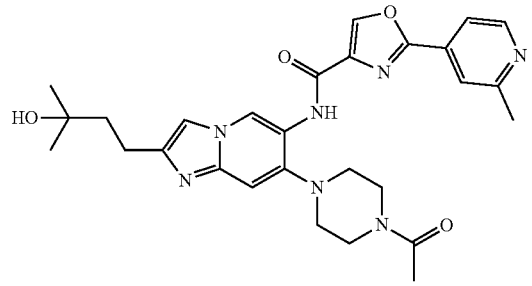 [SMILES: CC(=O)N1CCN(c2cc3nc(CCC(C)(C)O)cn3cc2NC(=O)c2coc(-c3ccnc(C)c3)n2)CC1]
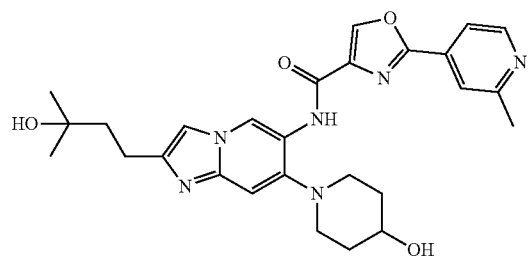 [SMILES: Cc1cc(-c2nc(C(=O)Nc3cn4cc(CCC(C)(C)O)nc4cc3N3CCC(O)CC3)co2)ccn1]
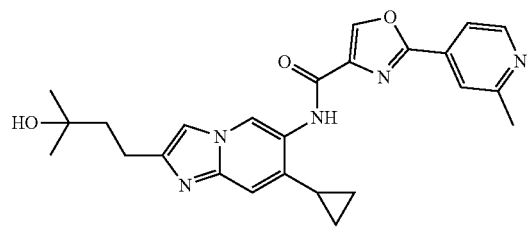 [SMILES: Cc1cc(-c2nc(C(=O)Nc3cn4cc(CCC(C)(C)O)nc4cc3C3CC3)co2)ccn1]
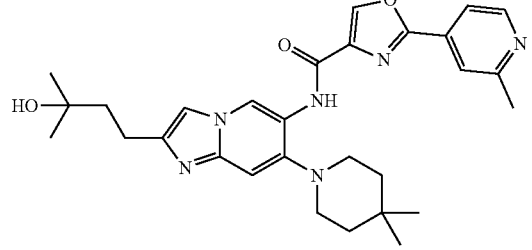
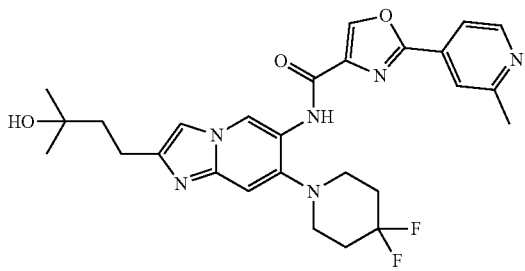 [SMILES: Cc1cc(-c2nc(C(=O)Nc3cn4cc(CCC(C)(C)O)nc4cc3N3CCC(F)(F)CC3)co2)ccn1]
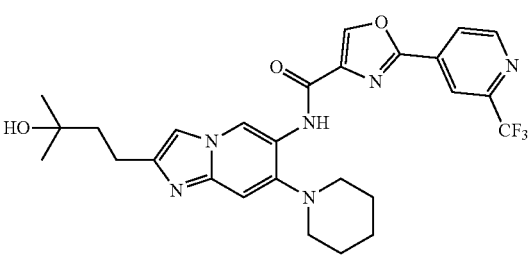 [SMILES: CC(C)(O)CCc1cn2cc(NC(=O)c3coc(-c4ccnc(C(F)(F)F)c4)n3)c(N3CCCCC3)cc2n1]
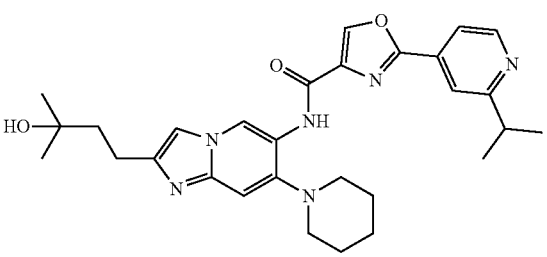 [SMILES: CC(C)c1cc(-c2nc(C(=O)Nc3cn4cc(CCC(C)(C)O)nc4cc3N3CCCCC3)co2)ccn1]
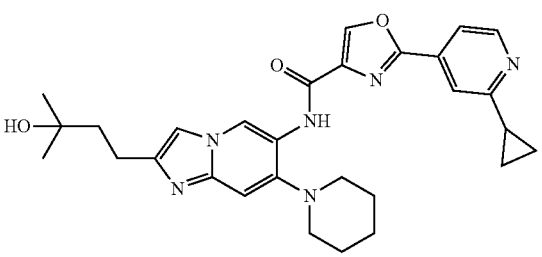 [SMILES: CC(C)(O)CCc1cn2cc(NC(=O)c3coc(-c4ccnc(C5CC5)c4)n3)c(N3CCCCC3)cc2n1]
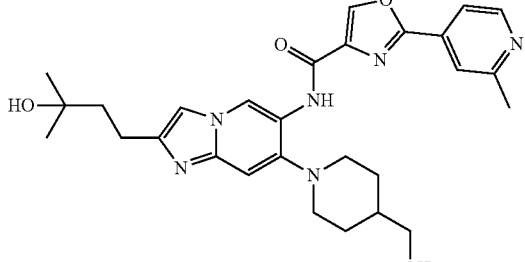
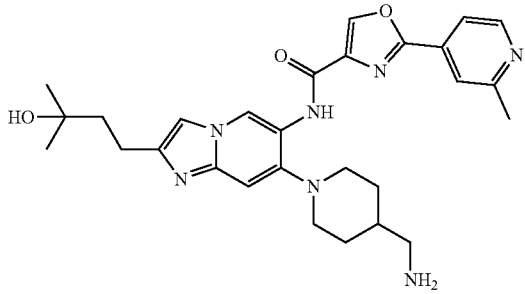 [SMILES: Cc1cc(-c2nc(C(=O)Nc3cn4cc(CCC(C)(C)O)nc4cc3N3CCC(CN)CC3)co2)ccn1]

83
-continued
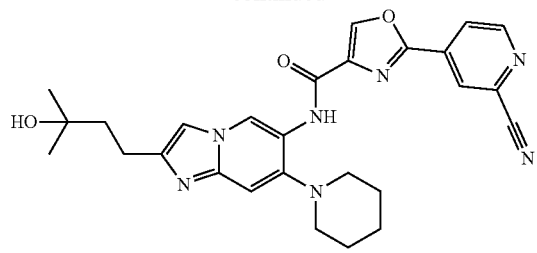
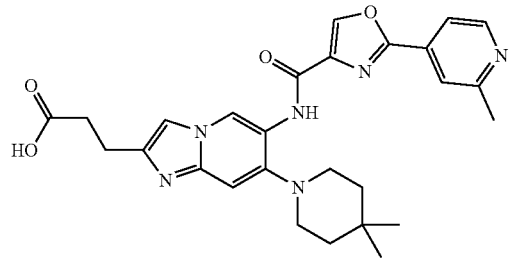
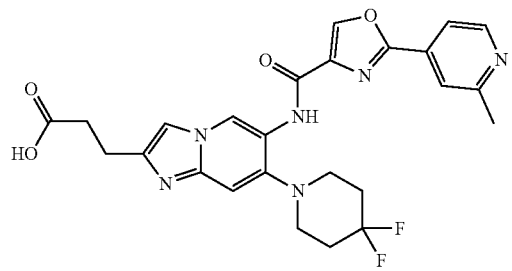 [SMILES: Cc1cc(-c2nc(C(=O)Nc3cn4cc(CCC(=O)O)nc4cc3N3CCC(F)(F)CC3)co2)ccn1]
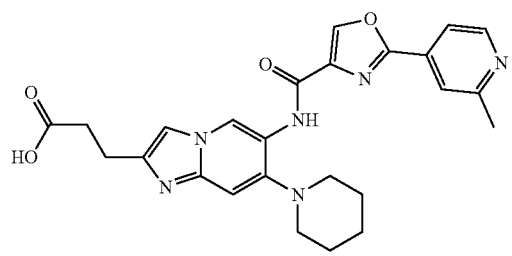 [SMILES: Cc1cc(-c2nc(C(=O)Nc3cn4cc(CCC(=O)O)nc4cc3N3CCCCC3)co2)ccn1]
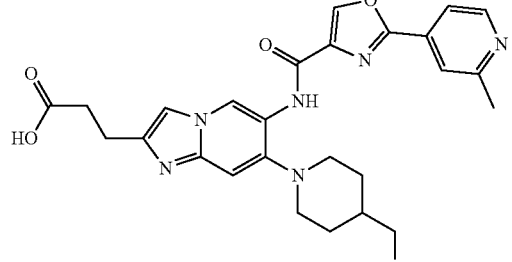
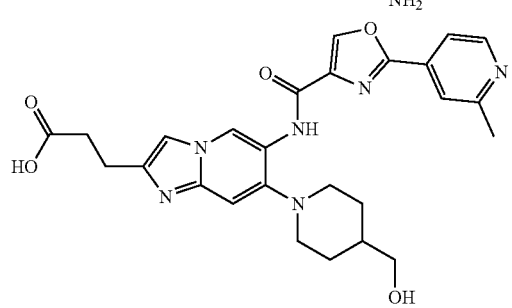
84
-continued
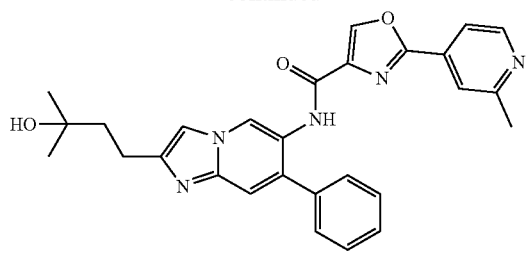
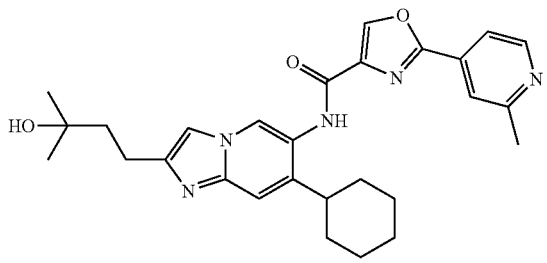
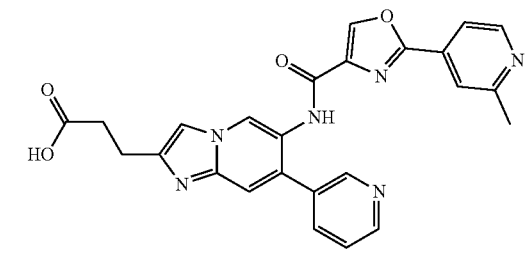 [SMILES: Cc1cc(-c2nc(C(=O)Nc3cn4cc(CCC(=O)O)nc4cc3-c3cccnc3)co2)ccn1]
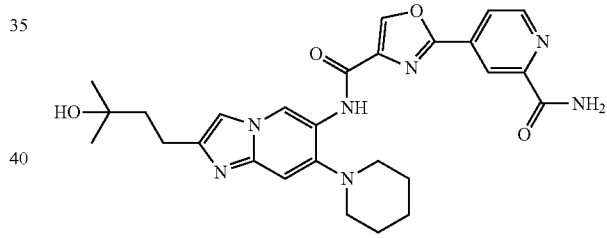
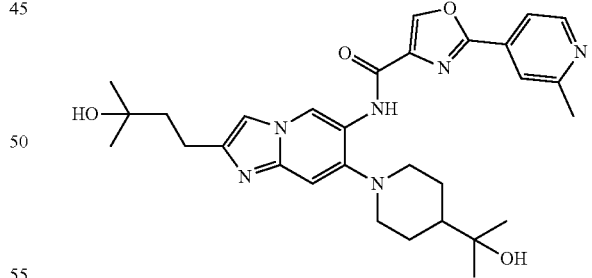
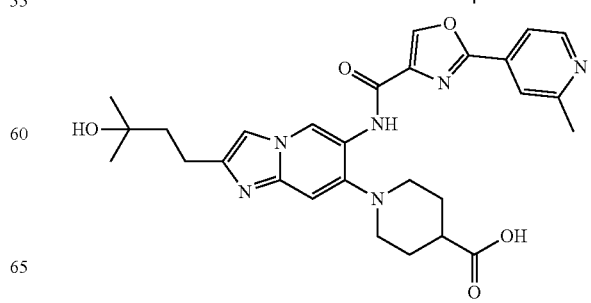

85
-continued
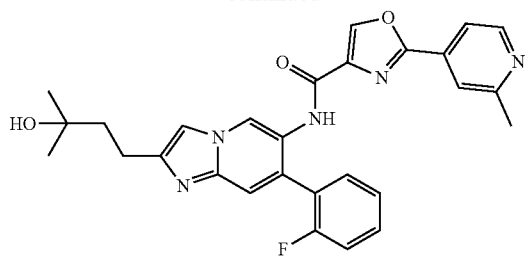 [SMILES: Cc1cc(-c2nc(C(=O)Nc3cn4cc(CCC(C)(C)O)nc4cc3-c3ccccc3F)co2)ccn1]
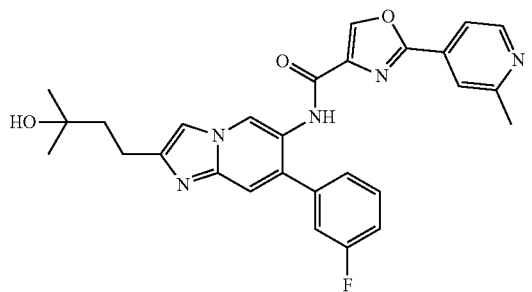 [SMILES: Cc1cc(-c2nc(C(=O)Nc3cn4cc(CCC(C)(C)O)nc4cc3-c3cccc(F)c3)co2)ccn1]
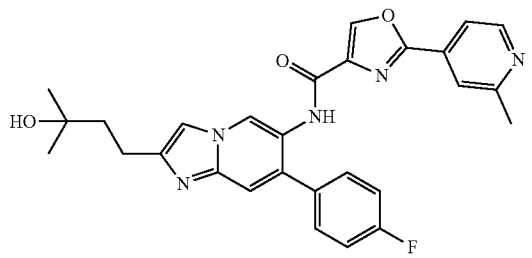 [SMILES: Cc1cc(-c2nc(C(=O)Nc3cn4cc(CCC(C)(C)O)nc4cc3-c3ccc(F)cc3)co2)ccn1]
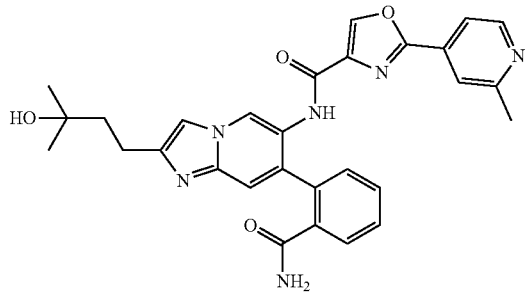 [SMILES: Cc1cc(-c2nc(C(=O)Nc3cn4cc(CCC(C)(C)O)nc4cc3-c3ccccc3C(N)=O)co2)ccn1]
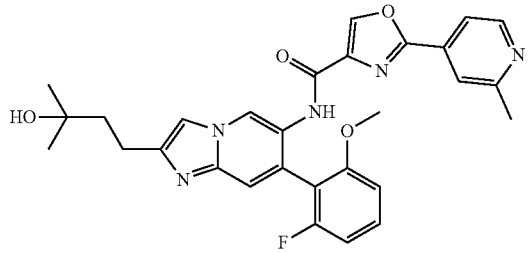 [SMILES: COc1cccc(F)c1-c1cc2nc(CCC(C)(C)O)cn2cc1NC(=O)c1coc(-c2ccnc(C)c2)n1]
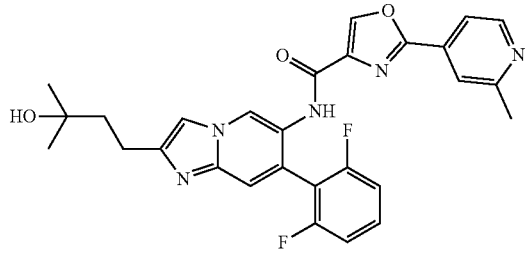 [SMILES: Cc1cc(-c2nc(C(=O)Nc3cn4cc(CCC(C)(C)O)nc4cc3-c3c(F)cccc3F)co2)ccn1]
86
-continued
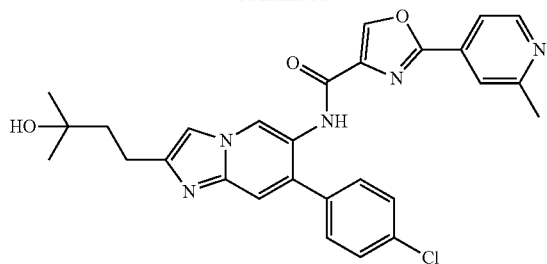
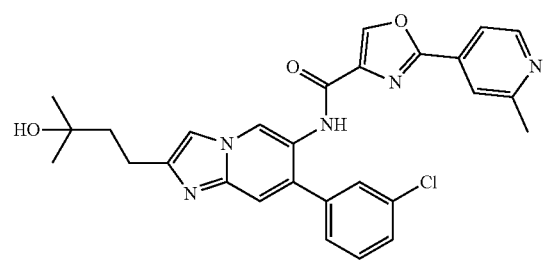 [SMILES: Cc1cc(-c2nc(C(=O)Nc3cn4cc(CCC(C)(C)O)nc4cc3-c3cccc(Cl)c3)co2)ccn1]
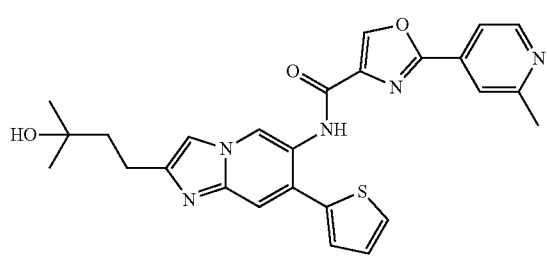
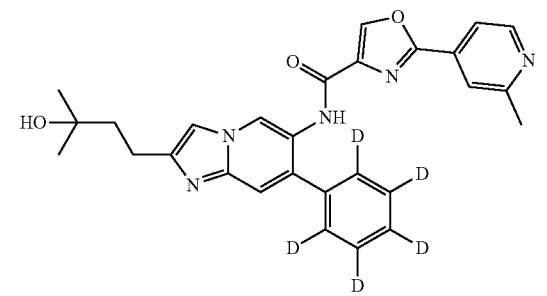 [SMILES: [2H]c1c([2H])c([2H])c(-c2cc3nc(CCC(C)(C)O)cn3cc2NC(=O)c2coc(-c3ccnc(C)c3)n2)c([2H])c1[2H]]
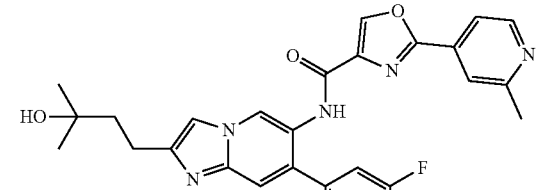
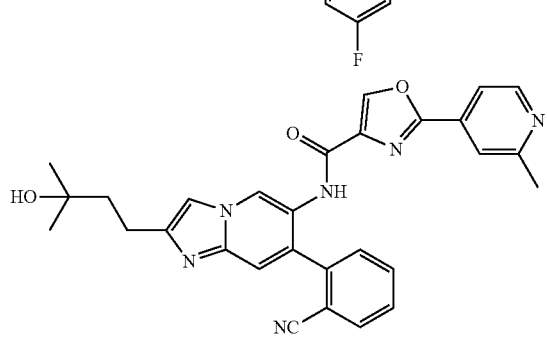

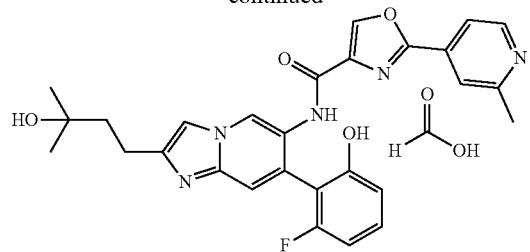

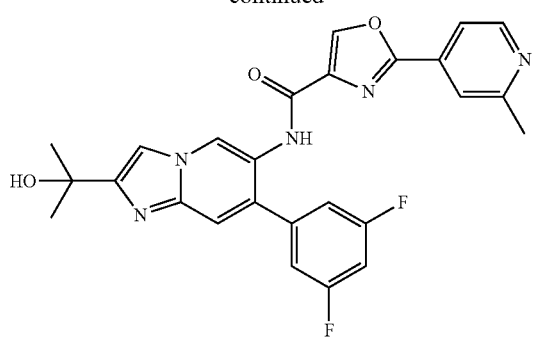

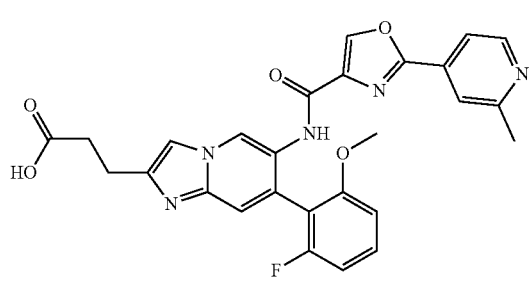

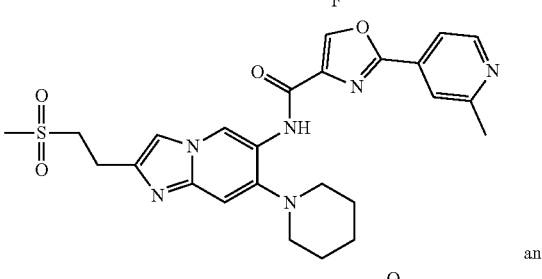

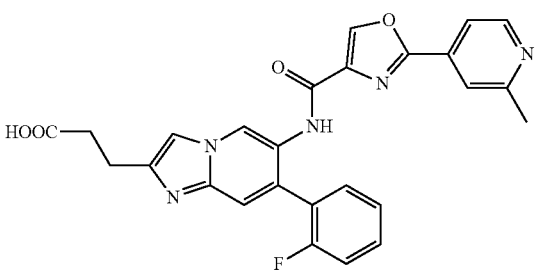

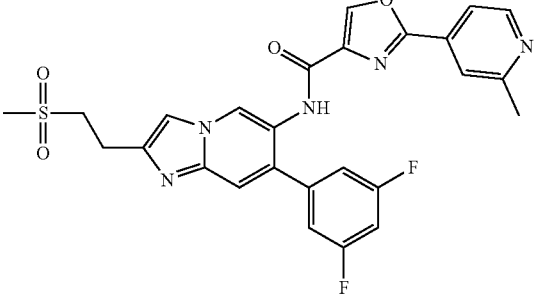

and

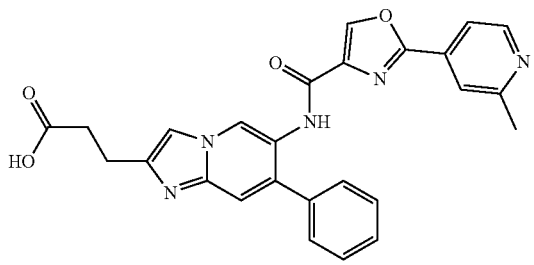 [SMILES: Cc1cc(-c2nc(C(=O)Nc3cn4cc(CCC(=O)O)nc4cc3-c3ccccc3)co2)ccn1]

14. A pharmaceutical composition, comprising a therapeutically effective amount of the compound as defined in claim 1 or the pharmaceutically acceptable salt thereof as active ingredient and a pharmaceutically acceptable carrier.

15. A method for treating diseases related to IRAK4 and BTK in a subject in need thereof, comprising administering an effective amount of the compound as defined in claim 1 or the pharmaceutically acceptable salt thereof to the subject.

16. A method for treating diseases related to IRAK4 and BTK in a subject in need thereof, comprising administering an effective amount of the pharmaceutical composition as defined in claim 14 to the subject.

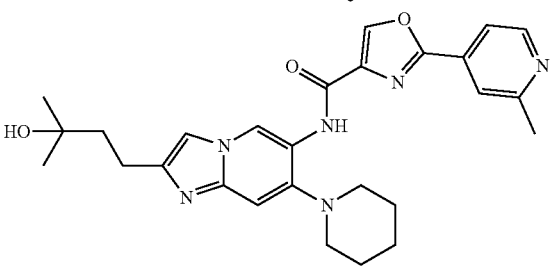

17. A method for inhibiting IRAK4 and/or BTK in a subject in need thereof, comprising administering an effective amount of the compound as defined in claim 1 or the pharmaceutically acceptable salt thereof to the subject.

18. A method for inhibiting IRAK4 and/or BTK in a subject in need thereof, comprising administering an effective amount of the pharmaceutical composition as defined in claim 14 to the subject.

* * * * *